340-870.15 SR

XR 3,804,986

United States Patent [19]

Wakamatsu et al.

[11] 3,804,986

[45] Apr. 16, 1974

[54] ELECTRICAL WIRING SYSTEM

[75] Inventors: Hisato Wakamatsu, Kariya; Masami Amaki, Okazaki, both of Japan

[73] Assignees: Nippondenso Co., Ltd., Aichi-ken; Toyota Jidosha Kogyo Kabushiki Kaisha, Toyota-shi, both of, Japan

[22] Filed: Oct. 29, 1971

[21] Appl. No.: 193,900

[30] Foreign Application Priority Data

| | | |
|---|---|---|
| Oct. 31, 1970 | Japan | 45-96107 |
| Feb. 6, 1971 | Japan | 46-4835 |
| Feb. 27, 1971 | Japan | 46-10208 |
| Mar. 30, 1971 | Japan | 46-18996 |

[52] U.S. Cl. ........ 179/15 A, 179/15 BY, 340/18 Y, 179/15 AL

[51] Int. Cl. ........ H04j 3/00

[58] Field of Search .......... 179/15 AL, 15 A, 15 BS, 179/15 BY; 340/183, 184

[56] References Cited

UNITED STATES PATENTS

| | | | |
|---|---|---|---|
| 2,592,737 | 4/1952 | Reynolds | 179/15 BS |
| 3,651,454 | 3/1972 | Venema | 340/184 |
| 3,588,709 | 6/1971 | Hoyler | 179/15 BS |

*Primary Examiner*—Ralph D. Blakeslee
*Attorney, Agent, or Firm*—Cushman, Darby and Cushman

[57] ABSTRACT

An electrical wiring system in which control signals generated from an instruction signal generator are transmitted from a transmitter by means of multiplex communication to a receiver for controlling a plurality of loads and three conductors are required at most thereby simplifying the wiring arrangement and improving the reliability. The transmitter includes means for producing a time division pulse signal, and a first logic circuit having means for assigning respective channels to a plurality of signals to be transmitted in response to the application of the time division pulse signal, discriminating the occurrence within channels of the signals generated by the instruction signal generator and delivering from a single output terminal a signal including a series of the signals separated from each other in respect of time. The receiver includes a second logic circuit having means for assigning channels to a plurality of signals in response to the application of the time division pulse signal transmitted by way of one of the conductors and discriminating the signals corresponding to the channels in the signal transmitted from the output terminal of the first logic circuit by way of another conductor so as to drive the loads by the signals thus discriminated.

6 Claims, 112 Drawing Figures

3804986

INVENTORS

Wakamatsu, Hisato

Amaki, Masami

BY Cushman, Darby + Cushman

ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby & Cushman
ATTORNEYS

INVENTORS

Wakamatsu, Hisato

Amaki, Masami

BY Cushman, Darby + Cushman

ATTORNEYS

PATENTED APR 16 1974 3,804,986

SHEET 05 OF 36

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby & Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby & Cushman
ATTORNEYS

INVENTORS
Wakamatsu, Hisato
Amaki, Masami
BY Cushman, Darby + Cushman
ATTORNEYS

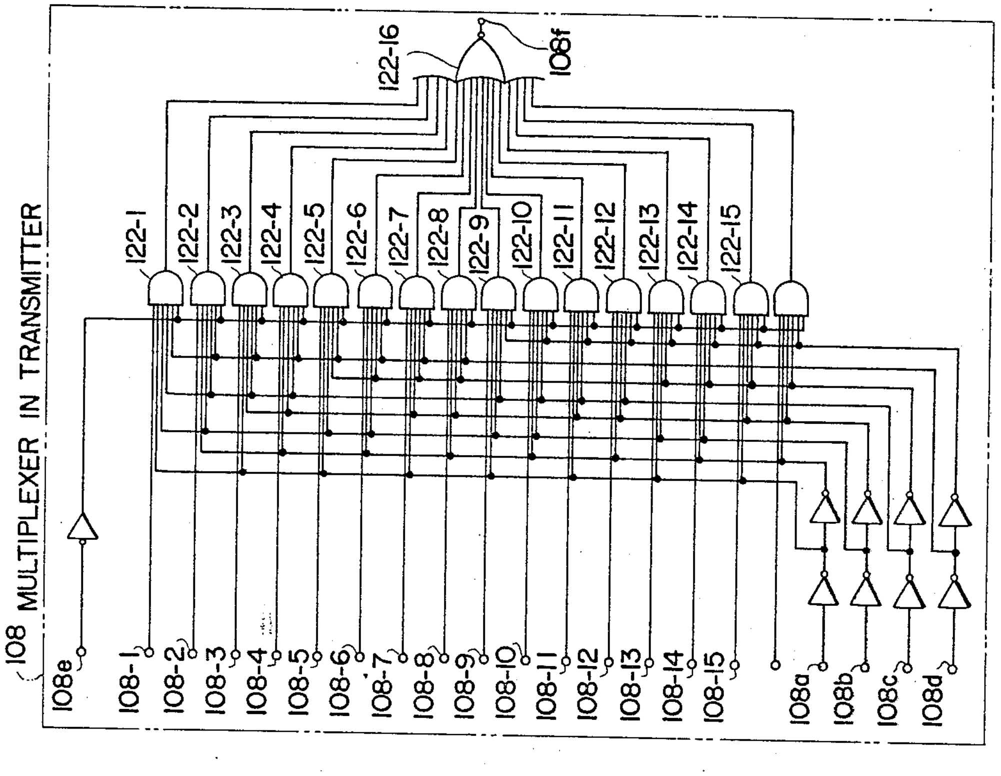
FIG. 21 MULTIPLEXER IN TRANSMITTER
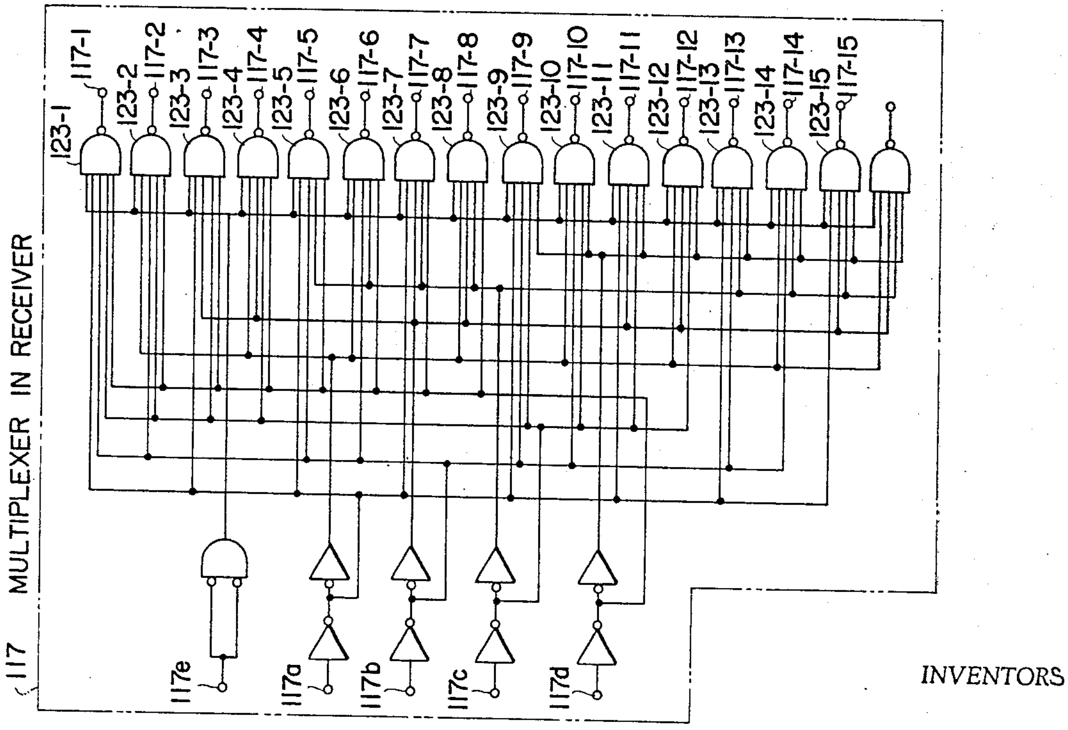
FIG. 22 MULTIPLEXER IN RECEIVER
INVENTORS
Wakamatsu, Hisato
Amaki, Masami
BY Cushman, Darby + Cushman
ATTORNEYS INVENTORS
Wakamatsu, Hisato
Amaki, Masami
BY Cushman, Darby + Cushman
ATTORNEYS INVENTORS
Wakamatsu, Hisato
Amaki, Masami
BY Cushman, Darby & Cushman
ATTORNEYS INVENTORS
Wakamatsu, Hisato
Amaki, Masami
BY Cushman, Darby & Cushman
ATTORNEYS INVENTORS
Wakamatsu, Hisato
Amaki, Masami
BY Cushman, Darby + Cushman
ATTORNEYS

INVENTORS

Wakamatsu, Hisato

Amaki, Masami

BY Cushman, Darby + Cushman

ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby & Cushman
ATTORNEYS

INVENTORS

Wakamatsu, Hisato

Amaki, Masami

BY Cushman, Darby + Cushman

ATTORNEYS

INVENTORS
Wakamatsu, Hisato
Amaki, Masami
BY Cushman, Darby + Cushman
ATTORNEYS

PATENTED APR 16 1974 3,804,986

INVENTORS
Wakamatsu, Hisato
Amaki, Masami
BY Cushman, Darby + Cushman
ATTORNEYS

PATENTED APR 16 1974

3,804,986

SHEET 26 OF 36

INVENTORS

Wakamatsu, Hisato

Amaki, Masami

BY Cushman, Darby + Cushman

ATTORNEYS

INVENTORS
Wakamatsu, Hisato
Amaki, Masami

BY

Cushman, Darby + Cushman ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby & Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

INVENTORS
Wakamatsu, Hisato
Amaki, Masami
BY Cushman, Darby + Cushman
ATTORNEYS

ELECTRICAL WIRING SYSTEM

BACKGROUND OF THE INVENTION

1. Field of the Invention

This invention relates generally to electrical wiring systems and more particularly to an electrical wiring system for transmitting electrical signals by means of multiplex communication to various electrical appliances installed in vehicles.

2. Description of the Prior Art

In modern transportation means such as, for example, automotive vehicles, the number of electrical appliances is increasing more and more in view of the demand for safety, a comfortable ride, etc. and a great number of combinations of electrical parts are required due to the fact that even vehicles of the same type include a variety of models. This results in the increase in the number of wire harnesses of various kinds required for electrical connection, and a lot of time and labor is required for the manufacture of the wire harnesses and mounting of these wire harnesses at suitable locations in the vehicle. Further, in the conventional electrical wiring system, these wire harnesses are relatively tightly squeezed into a limited space. Thus, the conventional electrical wiring system has drawbacks in that probability of disconnection, short-circuit and other troubles is quite high and maintenance and inspection therefor is very troublesome. More concretely, in the conventional electrical wiring system for vehicles, conductors of large diameter for transmitting electrical power between a group of command switches and loads or electrical appliances are required in a number as many as the number of independent electrical appliances.

Thus, the conventional electrical wiring system has been limited in that not only is there a high cost involved for the wiring but also the laying of the wiring is difficult due to the increased volume of the conductors and this is undesirable from the viewpoint of reliability of the system.

SUMMARY OF THE INVENTION

It is an object of the present invention to provide a novel electrical wiring system which is free from the defects above described and in which the technique of multiplex communication is utilized to reduce the number of conductors connecting loads with instruction signal generating means for energizing the loads.

Another object of the present invention is to provide an electrical wiring system preferably used in an automotive vehicle in which two conductors only are used to connect a plurality of electrical appliances with a group of command switches for energizing these appliances.

A further object of the present invention is to provide an electrical wiring system in which a plurality of loads are connected by two conductors with a plurality of load starting means such as switches so as to simplify the wiring, reduce the costs of the wiring and minimize undesirable short-circuit problems, and in which a diode matrix is employed so as to simplify the circuit structure and provide a high degree of freedom of design to deal with a great number of loads.

Another object of the present invention is to provide an electrical wiring system in which means for converting the starting signals generated by the load starting means and transmitting the signals to loads can be easily miniaturized or integrated.

Still another object of the present invention is to provide an electrical wiring system especially useful for use in an automotive vehicle where complex wiring must be made in a narrow space, in which analog signals for energizing a plurality of loads such as electrical appliances and meters of the vehicle remotely operated by analog quantities can be reliably transmitted to these loads by two conductors thereby minimizing the number of conductors and simplifying the wiring.

The present invention contemplates the provision of an electrical wiring system based on the principle of multiplex communication using a time division pulse signal, in which analog signals are converted in a transmitter into digital signals to be transmitted to a receiver and the digital signals are used to directly actuate controlled elements or restored to the original analog signals for actuating the controlled elements so that the two conductors for transmitting the time division pulse signal and the digital signals can also be used for transmitting the analog signals to the controlled elements. Further, the electrical wiring system includes only one bus bar which connects a power supply to various control circuits for supplying power thereto and is suitably branched to be connected to the controlled elements so that power supplied from the power supply can be converted into physical quantities such as light and mechanical displacement, and there is no need for connecting the power supply to the controlled elements by independent bus bars. Thus, only three conductors are required at the most thereby preventing the wire harnesses from becoming bulky, simplifying the fixation of the wiring to the vehicle body and facilitating the maintenance and inspection of the wiring.

An electrical wiring system according to the present invention comprises a transmitter including means for producing a time division pulse signal, a first frequency divider for assigning respective channels of said time division pulse signal to a plurality of loads, and a first logic circuit for carrying out a logical operation on the outputs from said first frequency divider and the signals for energizing some of said loads thereby delivering a logical signal, and a receiver including a second frequency divider for assigning respective channels of said time division pulse signal to a plurality of loads, a second logic circuit for carrying out a logical operation on the outputs from said second frequency divider and the output signal of said first logic circuit thereby delivering a logical signal, and a plurality of load drive circuits for driving the loads according to the output signal of said second logic circuit. Further, additional two logic circuits corresponding to the first and second logic circuits may be disposed in the receiver and transmitter respectively for the purpose of transmission of signals from the receiver to the transmitter by utilizing idle and available channels so that the means such as the first and second frequency dividers existing already in the transmitter and receiver can be utilized to transmit the signals from the receiver to the transmitter. Further, the transmitter may be connected to a plurality of such receivers for the purpose of communication therebetween.

Other objects, features and advantages of the present invention will be apparent from the following detailed description taken in conjunction with the accompanying drawings.

BRIEF DESCRIPTION OF THE DRAWINGS

FIG. 21 is an electrical connection diagram showing the structure of a multiplexer in the transmitter shown in FIG. 16.

FIG. 22 is an electrical connection diagram showing the structure of a multiplexer in the receiver shown in FIG. 18.

DESCRIPTION OF THE PREFERRED EMBODIMENTS

Figure 1:
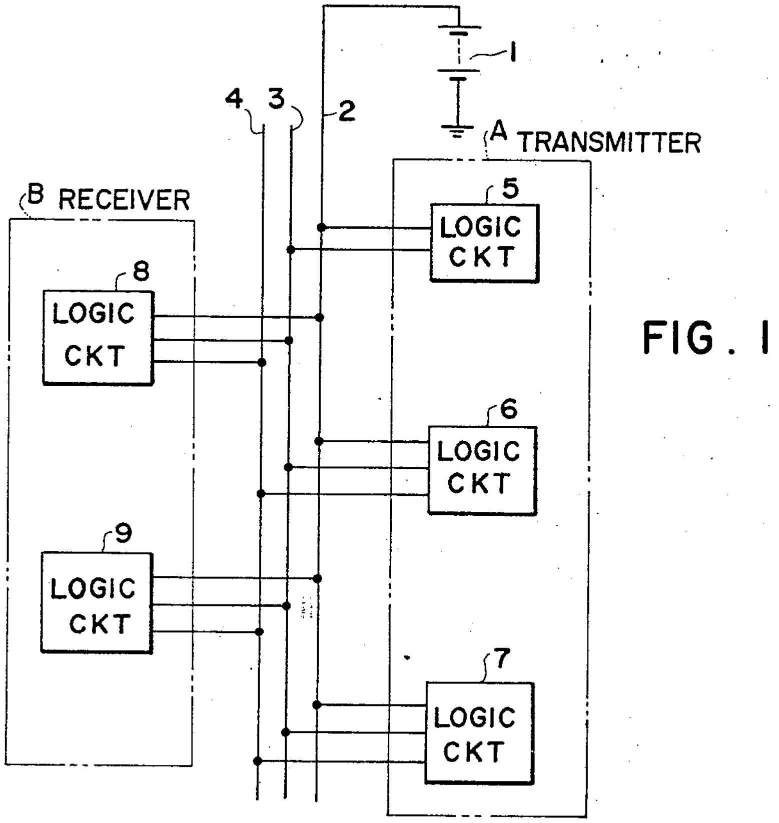
FIG. 1 is a block diagram showing the general structure of a basic embodiment of the present invention.

A basic embodiment of the present invention will be described first with reference to FIGS. 1 to 14. Referring to FIG. 1, a bus bar 2 is connected to a power supply battery 1, and there are provided two signal conductors 3 and 4. Hereinafter, signals transmitted by the signal conductors 3 and 4 will be referred to as a signal SIG I and a signal SIG II respectively. A transmitter A includes a plurality of logic circuits 5, 6 and 7, and a receiver B includes a plurality of logic circuits 8 and 9. The logic circuits 5, 6, 7, 8 and 9 are connected to the bus bar 2 and signal conductors 3 and 4 in a manner as shown. The logic circuit 5 in the transmitter A generates a basic signal or SIG I which is a time division pulse signal, while the logic circuits 6 and 7 generate signals SIG II by detecting the on-off of switches and the change in the continuous variables such as the temperature and level of water and oil. The logic circuits 8 and 9 in the receiver B operate in response to the application of the signals SIG I and SIG II to generate outputs for energizing a plurality of controlled elements or loads such as lamps, motors and solenoids.

Although only one logic circuit 5 is required for generating the signal SIG I, the number of the remaining logic circuits for generating the signals SIG II may be suitably selected depending on the disposition of detecting elements such as various switches and level gauges and on the disposition of controlled elements or loads such as lamps, motors and solenoids. In an extreme case, for example, such logic circuits may be provided for each of the switches, gauges, lamps, motors and solenoids. However, in the vehicle in which all the switches are arranged in the vicinity of the dashboard, one logic circuit for generating the signal SIG II may be disposed in the vicinity of the dashboard so that it takes care of some of these switches. Further, only one logic circuit for energizing the lamps arranged on the rear side of the vehicle in response to the signals SIG I and SIG II may be disposed in the vicinity of the rear side of the vehicle so that it takes care of all these lamps. From this point of view, therefore, the logic circuits 6 and 7 shown in FIG. 1 may be combined into a single circuit and the logic circuits 8 and 9 may also be combined into a single circuit. Further, although grounding to the chassis is generally done in the case of the vehicle, grounding conductors may be additionally provided in the case of transportation means other than the vehicle.

The waveform of the signal SIG I generated by the logic circuit 5 and those of the signals SIG I generated by the logic circuits 6 and 7 in the transmitter A will be described with reference to FIGS. 2(a) and 2(n). FIG. 2(a) shows the waveform of the signal SIG I or time division pulse signal whose one cycle is equal to a period of time T. This one cycle includes a plurality of high-frequency rectangular pulses $P_1$, $P_2$, . . . . $P_r$, $P_{r+1}$, $P_{r+2}$ and $P_n$ each having a pulse width $t_2$ and a pulse interval $(t_1 + t_2)$ and one pulse $P_o$ having a pulse width $t_3$ greater than $t_1$ and $t_2$. The signal SIG II varies continuously depending on the operating state of the detecting elements or controlled elements. In one example of the signal SIG II as shown in FIG. 2(b), a low level appears in synchronism with the pulses $P_1$, $P_3$, . . . . $P_r$ and $P_{r+1}$ in the signal SIG I. In the description given hereinafter, the so-called positive logic is employed in which a signal at a high voltage level and a signal at a low voltage level are designated by "1" and "0" respectively.

The signal SIG I shown in FIG. 2(a) can be obtained by carrying out the NAND operation on a high-frequency pulse signal as shown in FIG. 2(c) and a pulse signal as shown in FIG. 2(d) which is in synchronism with the signal shown in FIG. 2(c). The signal SIG II is always in synchronism with the signal SIG I, and each of the logic circuits 6 and 7 includes a first frequency divider which counts the number of pulses in the signal SIG I for the purpose of frequency division. This frequency divider is cleared during the duration $t_3$ of the pulse $P_o$ in the signal SIG I shown in FIG. 2(a) and then counts the number of pulses occurring after and including the pulse $P_1$ to produce a pulse signal or SIG II which is in synchronism with the pulse allotted to each individual controlled element. FIGS. 2(e), 2(f) and 2(g) show pulse signals which are produced in synchronism with the pulses $P_1$, $P_2$ and $P_r$ to $P_{r+2}$ in the signal SIG I respectively. The signal shown in FIG. 2(g) has such a waveform that " 1" appears during the period of time in which a plurality of pulses (or three pulses in this example) in the signal SIG I occur continuously, so that, during this period of time, a continuously varying analog quantity such as the reading of a level gauge can be detected in the form of the number of digital pulses.

The signal SIG II is produced in a manner as will be described below. Suppose that a switch on-off signal has a waveform as shown in FIG. 2(h) and the pulse $P_1$ in the signal SIG I is allotted to this switch. In this case, a signal as shown in FIG. 2(i) is obtained when the NAND operation on the signals shown in FIGS. 2(e) and 2(h) is carried out. Similarly, a signal as shown in FIG. 2(j) may be obtained in response to the on-off of a switch to which the pulse $P_2$ is allotted as shown in FIG. 2(f). In the case of the signal shown in FIG. 2(g) in which a pulse occurs during the period of time corresponding to the pulses $P_r$ to $P_{r+2}$, the analog signal detected by the detecting element, which is the level gauge in this case, is subjected to analog-to-digital conversion so as to convert the analog quantity into a digital quantity or the number of "0" levels as seen in FIG. 2(k). When the analog quantity has already been converted into a digital quantity by the detecting element, the procedure is similar to that described for the on-off of the switch. The signals having the waveforms shown in FIGS. 2(i), 2(j) and 2(k) indicative of the operating state of the detecting elements are combined together to obtain a composite signal or signal SIG II as shown in FIG. 2(l). The signals SIG II produced by the logic circuits 6 and 7 in this manner are supplied to the signal conductor 4 to be applied to the logic circuits 8 and 9 in the receiver B.

Figure 3:
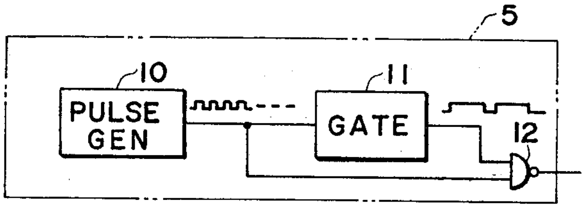
FIG. 3 is a block diagram showing the structure of a logic circuit generating a signal SIG I.

The logic circuit 5 for generating the signal SIG I has a structure as shown in FIG. 3. Referring to FIG. 3, a pulse generator 10 such as an astable multivibrator generates the basic pulse signal having the waveform shown in FIG. 2(c). A gate 11 consists of a plurality of cascade-connected flip-flops and divides the frequency of the basic pulse signal into a plurality of frequencies, and the outputs from suitable stages are combined to produce an output signal which is in synchronism with the basic pulse signal as shown in FIG. 2(d). A NAND gate 12 carries out the NAND operation on the outputs from the pulse generator 10 and gate 11 so that the signal SIG I shown in FIG. 2(a) appears at its output terminal. When an AND gate is used in place of the NAND gate 12, the output from the AND gate is such that "0" appears in each place of the pulse $P_o$ of duration $t_3$ in the waveform shown in FIG. 2(a), and this output may then be inverted by an inverter to obtain the signal SIG I shown in FIG. 2(a).

Figure 4:
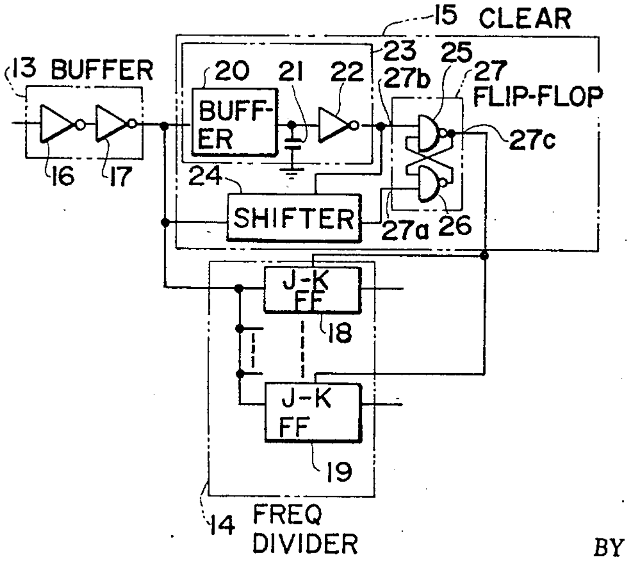
FIGS. 4, 5, 6 and 7 are block diagrams showing the structure of circuits producing a synchronizing signal for generating a signal SIG II.

Each of the logic circuits 6 and 7 includes a circuit which divides the frequency of the signal SIG I for producing the signals having the waveforms shown in FIGS. 2(e), 2(f) and 2(g) thereby obtaining the signal SIG II. This circuit has a structure as shown in FIG. 4, and includes a buffer circuit 13, a frequency divider 14 and a clear signal generator 15. The buffer circuit 13 is not necessarily required, but it may preferably be provided so as to alleviate the load on the logic circuit 5 which generates the signal SIG I. The buffer circuit 13 is composed of two inverter gates 16 and 17. The frequency divider 14 includes an m-scale counter 18, an $(m+1)$-scale counter, an $(m+2)$-scale counter and an $(m+3)$-scale counter 19 employing J-K flip-flops. The clear signal generator 15 includes a delay circuit 23 consisting of a buffer circuit 20, a capacitor 21 and an inverter gate 22, an n-scale counter 24, and an S-R flip-flop 27 consisting of NAND gates 25 and 26.

Figure 2:
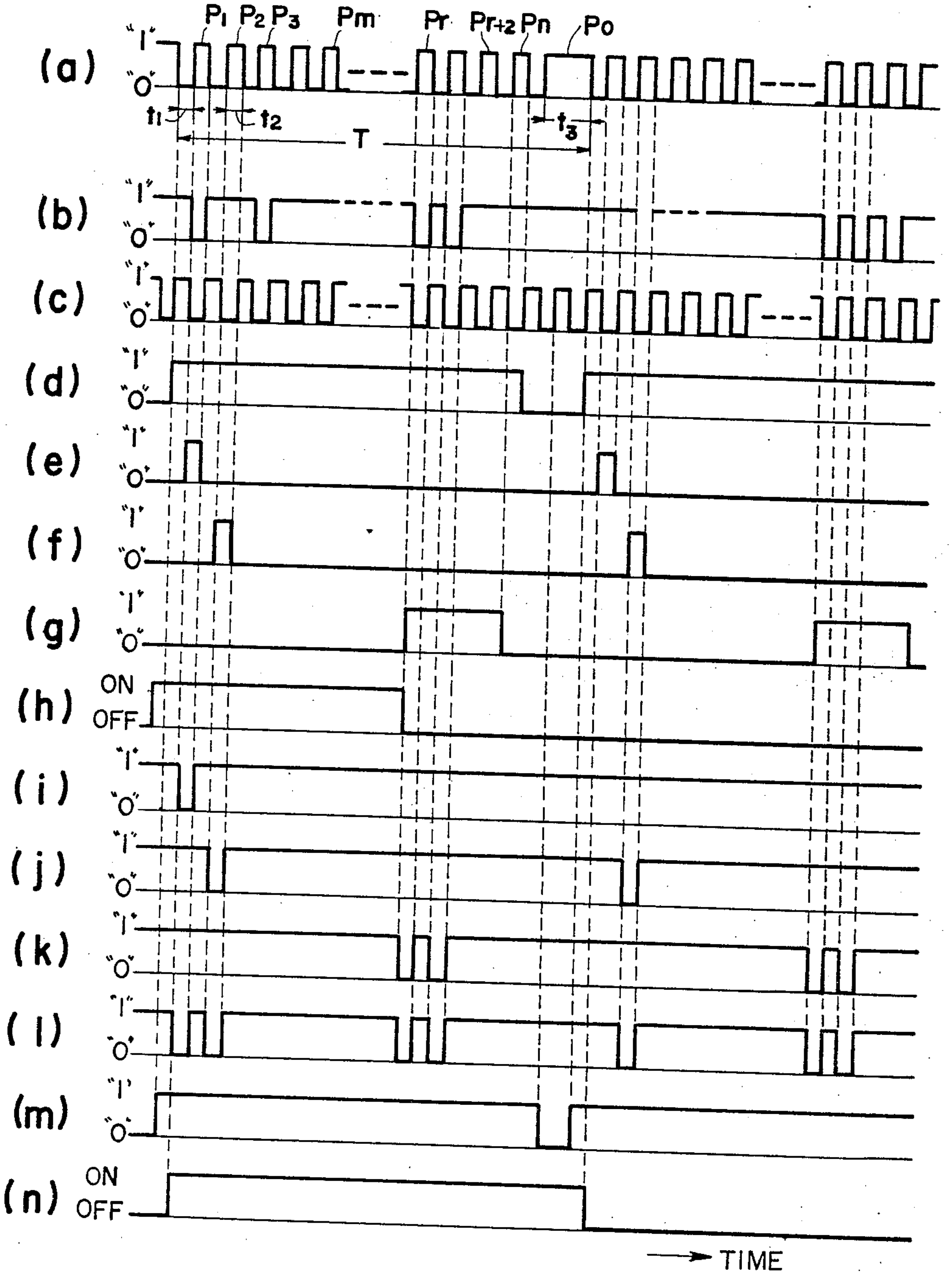
FIGS. 2(a) to 2(n) show voltage waveforms appearing at various parts of the electrical wiring system shown in FIG. 1.

In operation, when the signal SIG I is applied from the logic circuit 5 by way of the signal conductor 3 to the buffer circuit 13, thence to the m-scale counter 18, a signal such as the signal shown in FIG. 2(e) or 2(f) which is in synchronism with a specific pulse $P_m$ in the signal SIG I can be obtained. The signal SIG I is also applied to the n-scale counter 24 so that a signal which is in synchronism with a pulse $P_n$, that is, a signal in which "0" appears only during the duration of the pulse $P_n$ is obtained to be applied to one input terminal 27a of the flip-flop 27. On the other hand, a signal having a waveform as shown in FIG. 2(m) is applied from the delay circuit 23 to the other input terminal 27b of flip-flop 27. In order that the delay circuit 23 can produce the signal having the waveform shown in FIG. 2(m), the capacitance of the capacitor 21 may be suitably selected in relation to the periods of time $t_1$, $t_2$ and $t_3$ in the signal waveform of the signal SIG I. Thus, "0" appears at the output terminal 27*c* of the flip-flop 27 within the period of time ranging from the rising edge of the pulse $P_n$ in the signal SIG I to the falling edge of the output pulse shown in FIG. 2(m) delivered from the delay circuit 23, and "1" appears already at the output terminal 27c before the pulse $P_0$ disappears. The signal of "0" level appearing at the output terminal 27*c* of the flip-flop 27 is applied to the clear terminals of the m-scale counter 18, (*m*+1)-scale counter, (*m*+2)-scale counter and (*m*+3)-scale counter 19 to clear these counters. The m-scale counter 18, (*m*+1)-scale counter, (*m*+2)-scale counter and (*m*+3)-scale counter 19 start their counting operation again in response to the application of the next train of pulses of the signal SIG I starting from the pulse $P_1$ due to the fact that "1" is applied already to their clear terminals at this time. In the meantime, the "0" level in the output shown in FIG. 2(*m*) delivered from the delay circuit 23 is applied to the clear terminal of the *n*-scale counter 24 to clear same. In a while, the *n*-scale counter 24 starts its counting operation again in response to the application of the next train of pulses of the signal SIG I starting from the pulse $P_1$. In this manner, the frequency divider 14 and the n-scale counter 24 are reset to prepare for the subsequent counting operation each time the pulse $P_0$ disappears. It will be understood that $m+l < n$ and $l$ may be any integer larger than and including 1. When the *m*-scale counter, (*m*+1)-scale counter, (*m*+2)-scale counter and (*m*+3)-scale counter are connected in parallel with each other as shown, only one clear signal generator 15 suffices.

Figure 5:
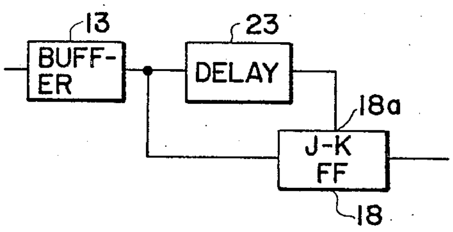

A circuit as shown in FIG. 5 may be used for generating the signal SIG II. This circuit can be employed in the case in which $m > n/2$, and in this case, the output from the delay circuit 23 may be applied to the clear terminal 18*a* of the m-scale counter 18.

Figure 6:
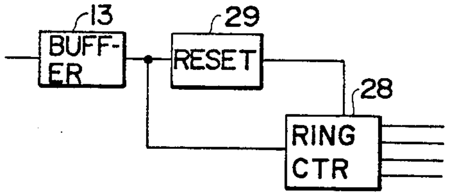

When it is required to derive independent outputs from the *m*-scale counter, (*m*+1)-scale counter, (*m*+2)-scale counter and (*m*+3)-scale counter as shown in FIG. 4, a circuit using a ring counter 28 as shown in FIG. 6 may be employed to produce the signal SIG II. The delay circuit 23 or clear signal generator 15 shown in FIG. 4 may be used as a reset circuit 29 depending on the capacity of the ring counter 28 and on the number of bit positions used. ($P_0$ represents the least significant digit and $P_1$, $P_2$, . . . . are more significant digits in this order.) When the clear signal generator 15 is used, the output from the ring counter 28 may be used in lieu of the output from the n-scale counter 24.

Figure 7:
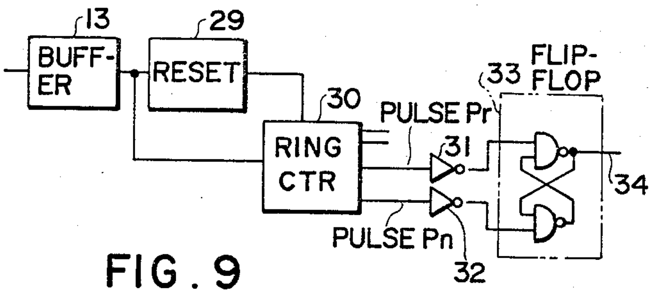

FIG. 7 shows one form of a circuit for producing the signal having the waveform shown in FIG. 2(g). A ring counter 30 delivers a pulse output Pulse $P_r$ which is synchronized with the pulse $P_r$ in the signal SIG I and a pulse output Pulse $P_n$ which is synchronized with the pulse $P_n$ in the signal SIG I. These pulse outputs are inverted by respective inverter gates 31 and 32 and are applied to an S-R flip-flop 33 to obtain an output having the waveform shown in FIG. 2(g) at the output terminal 34 of the flip-flop 33. Other outputs from the ring counter 30 are used as independent pulse outputs.

Figure 8:
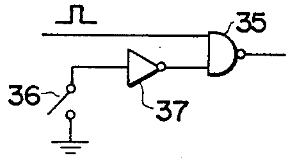
FIG. 8 is an electrical connection diagram showing the structure of a gate for generating the signal SIG II.

The pulse signals having the waveforms shown in FIGS. 2(e), 2(f) and 2(g) can be obtained in the manner above described. The signal SIG II which is in synchronism with these pulse signals can be produced in a manner as will be described below. Referring to FIG. 8, a detecting element such as an on-off switch 36 delivers a digital on-off signal having a waveform as shown in FIG. 2(h). Suppose that the pulse $P_1$ in the signal SIG I shown in FIG. 2(a) is assigned to this on-off switch. The output shown in FIG. 2(e) delivered from the frequency divider 14 in synchronism with the pulse $P_1$ in the signal SIG I is applied to one input terminal of a NAND gate 35 in FIG. 8, while the signal appearing at the non-grounded terminal of the on-off switch 36 is applied to the other input terminal of the NAND gate 35 after being inverted by an inverter gate 37. When the output from the frequency divider 14 is "1" and the switch 36 is on, "0" appears at the output terminal of the NAND gate 35, while when the output from the frequency divider 14 is "1" and the switch 36 is off, "1" appears at the output terminal of the NAND gate 35. When the output from the frequency divider 14 is "0," "1" appears at the output terminal of the NAND gate 35 irrespective of the on-off of the switch 36. Thus, the signal SIG II having the waveform shown in FIG. 2(i) can be obtained.

Figure 9:
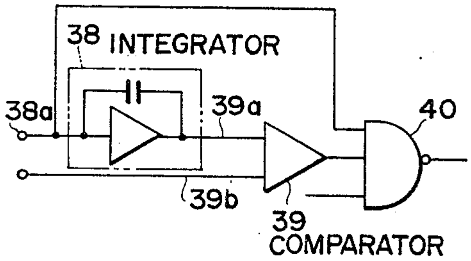
FIG. 9 is an electrical connection diagram showing the structure of an analog-to-digital converter.

The signal SIG II representative of an analog quantity detected by means such as an oil level gauge can be obtained by a circuit having a structure as shown in FIG. 9. This circuit is an analog-to-digital (A-D) converter. Referring to FIG. 9, the pulse signal shown in FIG. 2(g) (also shown in FIG. 10(a)) appearing at the output terminal 34 of the flip-flop 33 shown in FIG. 7 is applied to the input terminal 38*a* of an integrator 38. In the integrator 38, the pulse signal is integrated as shown in FIG. 10(b) and is then applied to one input terminal 39*a* of a comparator 39. On the other hand, the analog quantity is converted into a d.c. voltage E as shown in FIG. 10(b) and this d.c. voltage E is applied to the other input terminal 39*b* of the comparator 39. In response to the application of these inputs, a signal having a waveform as shown in FIG. 10(c) appears at the output terminal of the comparator 39. The output from the comparator 39, the pulse signal shown in FIG. 10(a) and the signal SIG I shown in FIG. 10(d) are applied to a NAND gate 40. A pulse signal having a waveform as shown in FIG. 10(e) appears at the output terminal of the NAND gate 40, and the number of pulses in this pulse signal corresponds to the analog quantity. In other words, an analog quantity detected during a predetermined period of time of the signal SIG I assigned to the detection of the analog quantity is converted into a digital quantity which is represented by the number of pulses.

Figure 11:
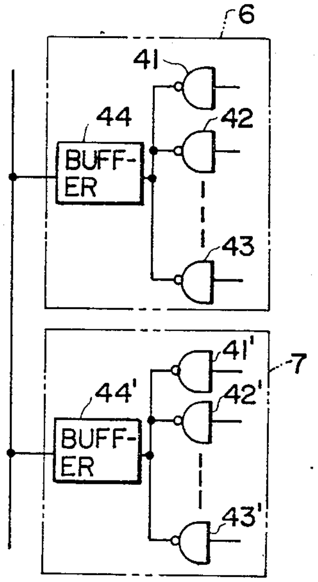
FIG. 11 is an electrical connection diagram showing the structure of means for producing the composite signal SIG II.
Figure 10:
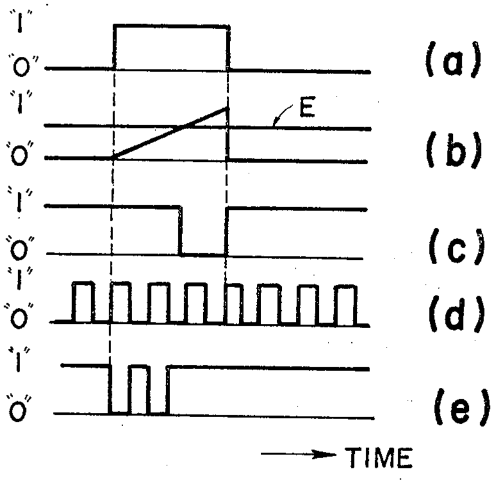
FIGS. 10(a) to 10(e) show voltage waveforms appearing at various parts of the analog-to-digital converter shown in FIG. 9.

Referring to FIG. 11, the logic circuits 6 and 7 include a plurality of NAND gates 41, 42, 43 and 41', 42' and 43' corresponding to the NAND gates 35 and 40 shown in FIGS. 8 and 9 respectively. These NAND gates 41, 42, 43, 41', 42' and 43' deliver outputs representative of digital and analog quantities, and these outputs are supplied through buffer circuits 44 and 44' to the signal conductor 4 as the outputs from the respective logic circuits 6 and 7 so that the signal SIG II shown in FIG. 2(*l*) appears on the signal conductor 4. However, the buffer circuits 44 and 44' are not essentially required.

Figure 12:
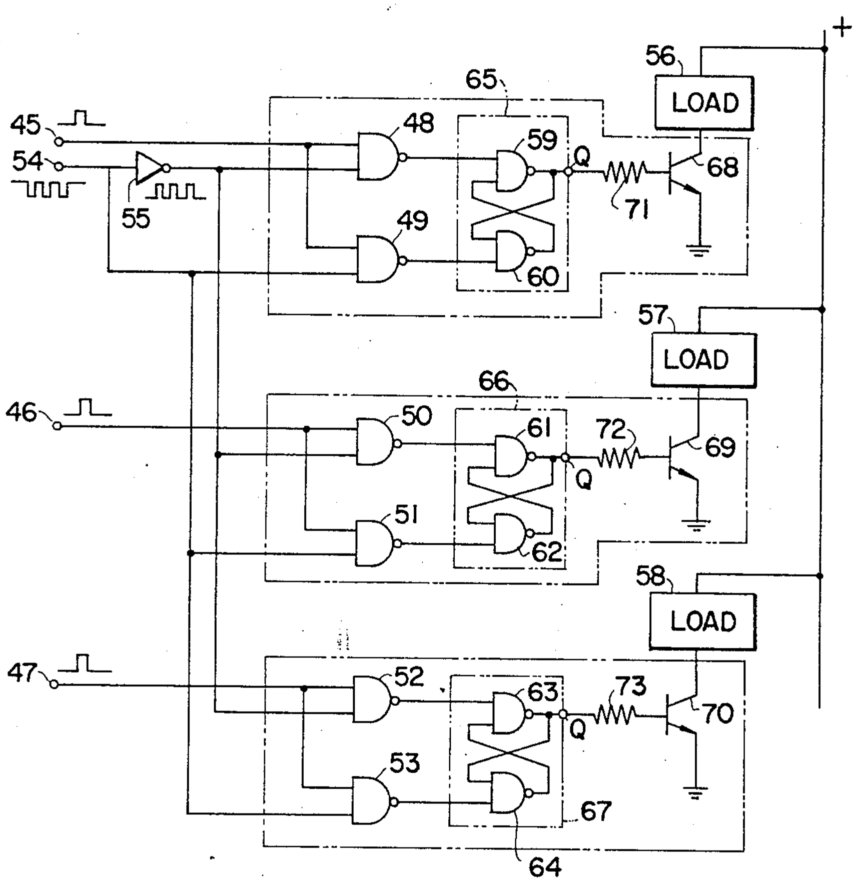
FIGS. 12, 13 and 14 are electrical connection diagrams showing the structure of logic circuits generating outputs for driving loads.

The structure and operation of the logic circuits 8 and 9 in the receiver B will next be described. The logic circuits 8 and 9 operate in response to the signals SIG I and SIG II applied by way of the signal conductors 3 and 4 to produce output signals for driving the controlled elements or loads. Before operating in response to the signals SIG I and SIG II, synchronizing signals as shown in FIGS. 2(e), 2(f) and 2(g) which are in synchronism with the signal SIG I and assigned to the individual controlled elements or loads are produced in a manner similar to that described with reference to FIGS. 4, 5 and 6. Among these synchronizing signals, those associated with digital quantities are applied to input terminals 45, 46 and 47 of a circuit shown in FIG. 12. The synchronizing signals are applied to NAND gates 48, 49, 50, 51, 52 and 53 through respective input terminals 45, 46 and 47. On the other hand, the signal SIG II is applied by the signal conductor 4 to another input terminal 54, thence directly to the NAND gates 49, 51 and 53, and at the same time, through an inverter gate 55 to the NAND gates 48, 50 and 52. When the synchronizing signals assigned to the controlled elements or loads 56, 57 and 58 are "1" and the corresponding portions of the signal SIG II are "0," "0" appears from the NAND gates 48, 50 and 52, while "1" appears from the NAND gates 49, 51 and 53. As a result, the outputs appearing at the output terminals Q of S-R flip-flops 65, 66 and 67 consisting of NAND gates 59, 60; 61, 62; and 63, 64, respectively are all "1," and transistors 68, 69 and 70 conduct due to the base current supplied through respective resistors 71, 72 and 73, thereby energizing the loads 56, 57 and 58. On the other hand, when the synchronizing signals applied to the input terminals 45, 46 and 47 are "1" and the corresponding portions of the signal SIG II are "1," "1" appears from the NAND gates 48, 50 and 52, while "0" appears from the NAND gates 49, 51 and 53. As a result, "0" appears from the flip-flops 65, 66 and 67 to cut off the transistors 68, 69 and 70, and no current is supplied to the loads 56, 57 and 58. Suppose that the load 56 in FIG. 12 is driven by a signal as shown in FIG. 2(h) representative of the on-off of a switch. Suppose further that the synchronizing signal applied to the input terminal 45 has a waveform as shown in FIG. 2(e) and the signals SIG II has a waveform as shown in FIG. 2(l). In this case, the transistor 68 for driving the load 56 is turned on and off in a manner as shown in FIG. 2(n).

Figure 13:
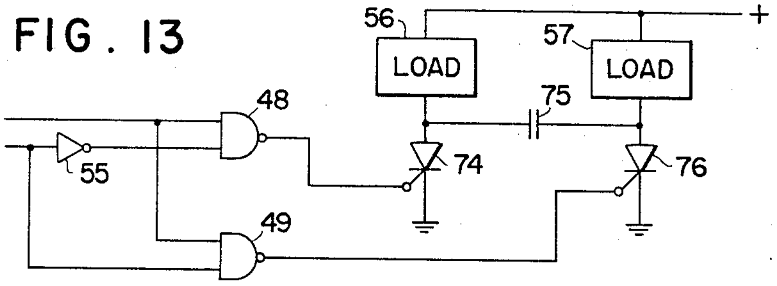

In the circuit shown in FIG. 12, the flip-flops 65, 66 and 67 are employed to turn on and off the current supplied to the loads 56, 57 and 58. However, thyristors may be employed as shown in FIG. 13 to carry out similar operation. In FIG. 13, the circuit portion in the preceding stage of the inverter gate 55 and NAND gates 48 and 49 is the same as that shown in FIG. 12. Referring to FIG. 13, the circuit includes a thyristor 74 for drying the load 56, a thyristor 76 for driving the load 57, and a capacitor 75 connected across the thyristors 74 and 76. The thyristor 74 conducts to supply current to the load 56 in response to the appearance of "1" at the output terminal of the NAND gate 48, while the thyristor 76 conducts to supply current to the load 57 and to cut off the thyristor 74 thereby interrupting the current supplied to the load 56 in response to the appearance of "1" at the output terminal of the NAND gate 49.

Figure 14:
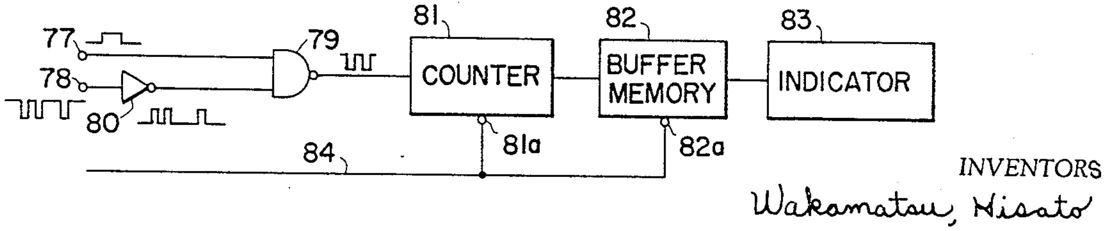

FIG. 14 shows a circuit preferably used in the logic circuits 8 and 9 to operate in response to the application of the signal SIG II by way of the signal conductor 4, which signal is obtained by analog-to-digital conversion of an analog quantity as described previously. Referring to FIG. 14, a pulse signal having a waveform as shown in FIG. 2(g) is applied to an input terminal 77. This pulse signal is produced by a circuit whose structure is the same as that of the circuit shown in FIG. 7 from which it will be recalled that the pulse signal shown in FIG. 2(g) appears at the output terminal 34 of the flip-flop 33. The signal SIG II is applied to another input terminal 78. The pulse signal is applied to one input terminal of a NAND gate 79 through the input terminal 77, while the signal SIG II is applied to the other input terminal of the NAND gate 79 through the input terminal 78 and an inverter gate 80. The NAND gate 79 carries out the NAND operation on these two input signals and delivers a pulse signal in which "0" occurs in the number as many as the number of "0's" in the signal SIG II during the appearance of "1" in the pulse signal applied to the input terminal 77. The output from the NAND gate 79 is applied to a counter 81, and the output from the counter 81 is applied to a buffer and memory 82. The output from the memory 82 is finally displayed on an indicator 83. The indicator 83 may display a digital quantity in the form of, for example, a numeral, or it may display an analog quantity after digital-to-analog conversion, or the output from the counter 81 or buffer and memory 82 may be applied to an operating circuit. A pulse signal which is in synchronism with a pulse, for example, a pulse $P_{r-l}$ occurring immediately before "1" appears in the pulse signal applied to the input terminal 77 is applied to the respective clear terminals 81*a* and 82*a* of the counter 81 and buffer and memory 82 by way of a conductor 84 so as to clear these circuits.

Further, in lieu of directly driving the loads by the outputs from the logic circuits 8 and 9, more than two output signals may be applied to a logic circuit and the output from the logic circuit may be added to the signal SIG II.

As for the period of time T in the signal SIG I shown in FIG. 2(a), its allowable maximum is controlled by the fact that a signal is generated by a detecting element with a maximum delay time T after the detected quantity has shown a change. The number of pulses $P_1$ to $P_n$ is determined by the number of detecting elements and controlled elements or loads.

It will be understood that the system embodying the present invention is applicable not only to vehicles but also to any other communication means.

Figure 15A:
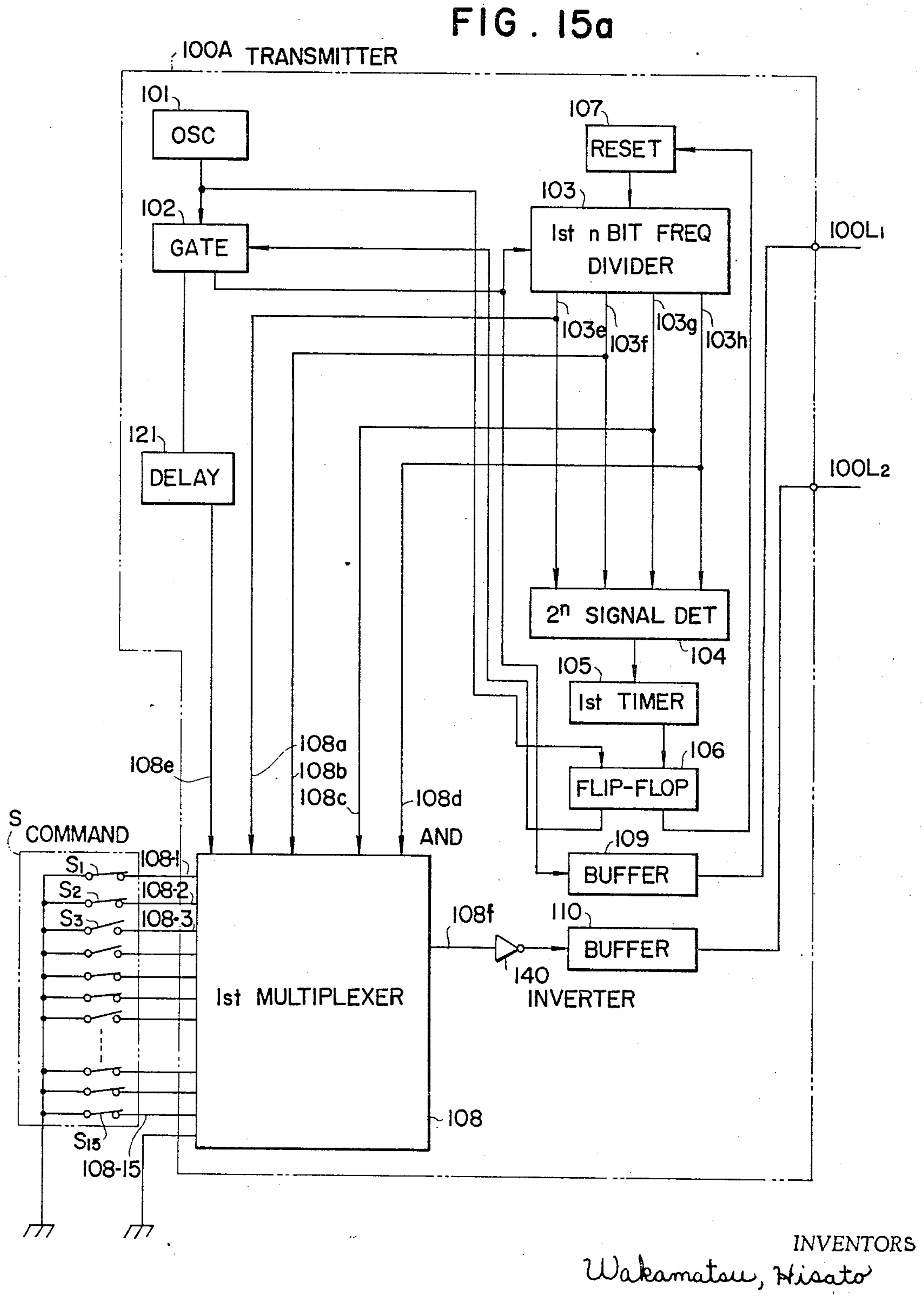
FIGS. 15*a* and 15*b* are block diagrams showing the general structure of a second embodiment of the present invention.
Figure 15B:
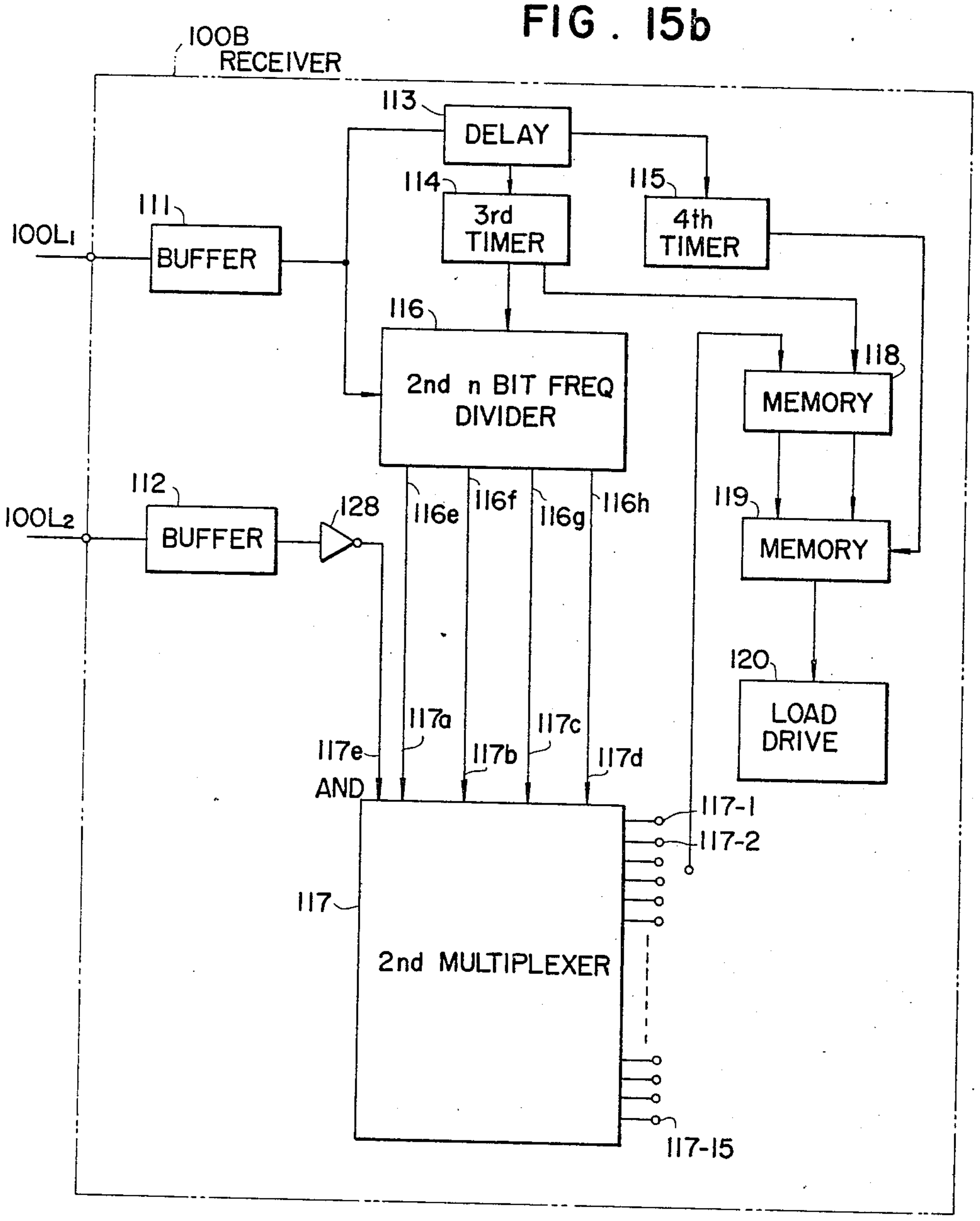

A second embodiment of the present invention will now be described with reference to FIGS. 15a to 22. FIGS. 15*a* and 15*b* are block diagrams showing the general structure of the second embodiment. Referring to FIG. 15*a*, an instruction signal generator S issues instructions for actuating various electrical appliances mounted on a vehicle and is shown herein as including 15 normally closed switches $S_1$, $S_2$, . . . $S_{15}$ each associated with an electrical appliance. A transmitter 100A includes an oscillator 101 which generates a pulse signal having a constant frequency of, for example, 18 kHz. A gate 102 makes a gate action against the pulse signal generated by the oscillator 101. A first *n*-bit frequency divider 103 counts the number of pulses passed through the gate 102 thereby dividing the frequency. In the illustrated example, the frequency divider 103 is a 4-bit frequency divider. A $2^n$ signal detector 104 detects a $2^n$-th pulse, or the 16th pulse in the illustrated example, counting from the 1st pulse of the pulse signal generated by the oscillator 101. In response to the detection of the rising edge of the 16th pulse by the $2^n$ signal detector 104, a first timer 105 produces a pulse having a duration $T_1$ measured from the falling edge of the 15th pulse, which may, for example, be four to seven times one cycle of the oscillation frequency of the oscillator 101. A memory 106 consisting of a flip-flop acts to close the gate 102 for a period of time which is equal to the duration $T_1$ of the pulse produced by the timer 105. A second timer 107 is actuated in response to the falling edge of the pulse of duration $T_1$ produced by the first timer 105 to produce a pulse having a duration $T_2$ which is less than one cycle of the oscillation frequency of the oscillator 101 so that the first *n*-bit frequency divider 103 is reset by this pulse and starts its frequency dividing operation again when the gate 102 is opened next. Therefore, a time division pulse signal whose one cycle includes fifteen pulses at a high voltage level or "1" and one pulse of duration $T_1$ at a low voltage level or "0" appears at the output terminal of the gate 102. The pulses $P_1$, $P_2$, . . . . $P_{15}$ in the time division pulse signal provide respective channels. In the case of the pulse $P_1$, for example, the period of time $T_c$ (FIG. 17(d)) provides a channel assigned to a load. The first *n*-bit frequency divider 103 delivers four outputs, that is, four signals obtained by dividing the oscillation frequency of the oscillator 101 to one-half, one-fourth, one-eighth and one-sixteenth respectively. These signals are applied to a first multiplexer 108 to which the normally closed switches $S_1$, $S_2$, . . . . $S_{15}$ in the instruction signal generator S are connected to apply instructions when they are opened so that the first multiplexer 108 carries out the AND operation on these signals. The pulse having the same suffix as the suffix of the opened one of the normally closed switches counting from the first one of the 15 pulses passed through the gate 102 is derived from the first multiplexer 108 as its output when the specific normally closed switch is opened for the purpose of actuating the associated electrical appliance. Buffer circuits 109, 110, 111 and 112 are provided to protect the circuits described above and circuits described later which are integrated so that these circuits may not be adversely affected by noises developed by other equipment. A delay circuit 121 prevents mal-operation due to mutual interference between adjoining pulses. An inverter 140 is connected between the first multiplexer 108 and the buffer circuit 110. The elements 101 to 110, 121 and 140 constitute the transmitter 100A.

Referring to FIG. 15*b*, a receiver 100B includes a delay circuit 113 which acts to slightly shorten the period of time $T_1$ following the fifteen pulses above described. A third timer 114 acts to produce a pulse which has a duration shorter than the duration of the output pulse delivered from the oscillator 101 and is in synchronism with the end of the output from the delay circuit 113 so that a second *n*-bit frequency divider 116 can be operated in synchronism with the transmitter 100A. A fourth timer 115 produces a pulse of short duration during the period of time $T_1$ so as to check as to whether the normally closed switches in the instruction signal generator S are opened or not during the preceding one cycle of the time division pulse signal. The second *n*-bit frequency divider 116 divides the frequency of the pulse signal applied from the transmitter 100A by way of the buffer circuit 109, a conductor 100L$_1$ and the buffer circuit 111 to produce signals whose frequencies are one-half, one-fourth, one-eighth and one-sixteenth of the original frequency respectively. In the illustrated example, the frequency divider 116 is a 4-bit frequency divider. The output from the first multiplexer 108 in the transmitter 100A is applied by way of the inverter 140, the buffer circuit 110, a conductor 100L$_2$, the buffer circuit 112 and an inverter 128 to a second multiplexer 117 to which the outputs from the second *n*-bit frequency divider 116 are also applied so that the second multiplexer 117 carries out the AND operation on these inputs. The pulse having the same suffix as the suffix of the opened one of the normally closed switches $S_1$, $S_2$, . . . . $S_{15}$ is detected by the second multiplexer 117. Memories 118 and 119 deliver "1" continuously until the pulse output from the second multiplexer 117 disappears, that is, until the specific normally closed switch in the open position is closed again. A load drive circuit 120 is connected to the memory 119 for actually energizing an associated load. The elements 111 to 120, and 128 constitute the receiver 100B.

Figure 16:
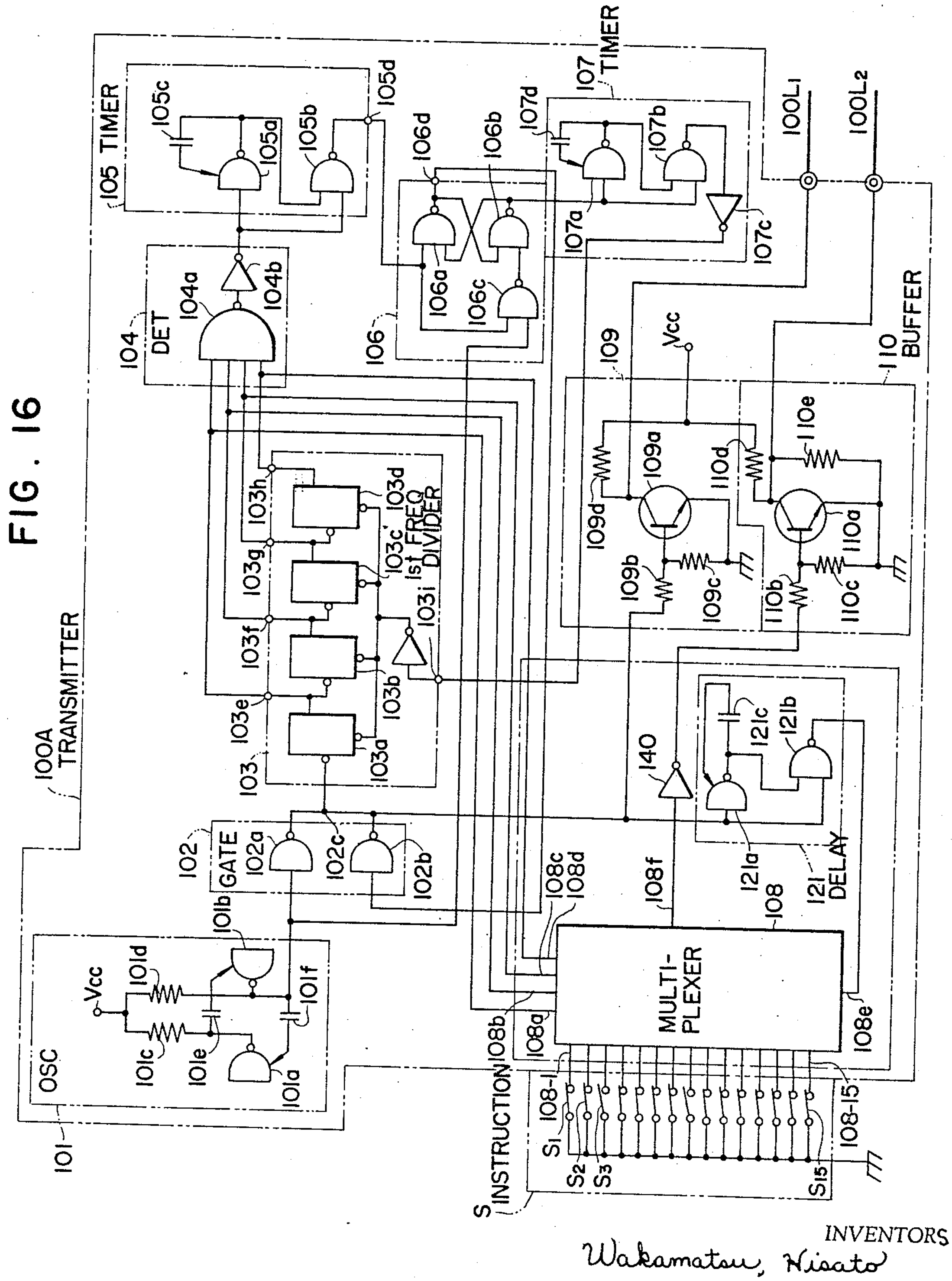
FIG. 16 is an electrical connection diagram showing the structure of a transmitter in the system shown in Figs. 15*a* and 15*b*.
Figure 17:
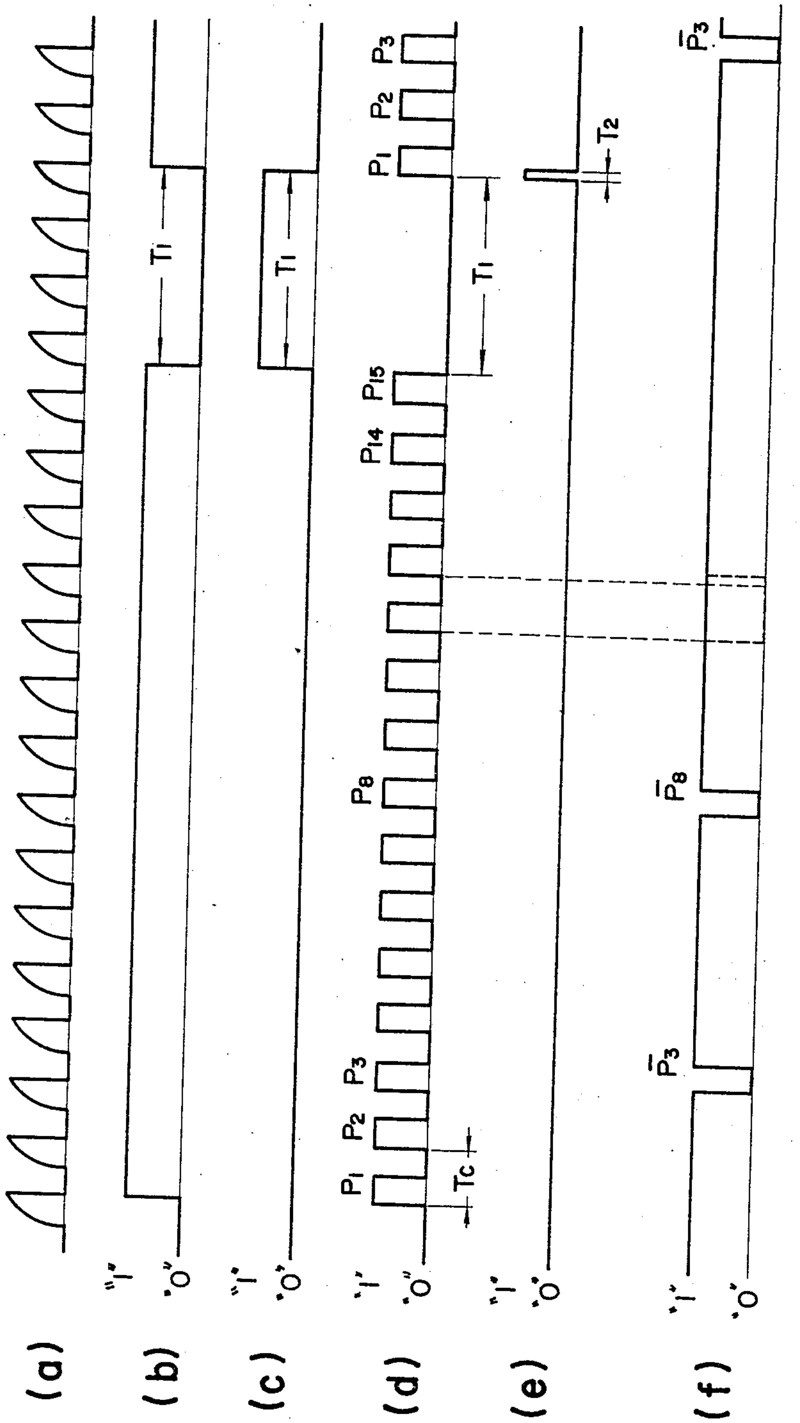
FIGS. 17(a) to 17(f) show voltage waveforms appearing at various parts of the transmitter shown in FIG. 16.

Detailed structure and operation of the system shown in FIGS. **15*a* and 15*b* will be described with reference to FIGS. 16 to 19, 21 and 22. Referring first to FIG. 16 showing the structure of the instruction signal generator S and transmitter 100A, the oscillator 101 is in the form of an astable multivibrator which is composed of NAND gates 101a and 101*b*, resistors 101*c* and 101*d* (1 k Ω), and capacitors 101*e* and 101*f* (10,000 pF). The oscillator 101 generates a pulse signal of constant frequency having a waveform as shown in FIG. 17(a) and its oscillation frequency is, for example, 18 kHz. The gate 102 consists of a pair of NAND gates 102*a* and 102*b*. When the gate 102 is open, it shapes the waveform of the output pulse signal of the oscillator 101 to apply same to the first 4-bit frequency divider 103. The frequency divider 103 is of the binary type using four J-K flip-flops 103*a*, 103*b*, 103*c* and 103*d*, and pulse signals whose frequencies are one-half, one-fourth, one-eighth and one-sixteenth of the frequency of the input pulse signal appear at respective output terminals 103*e*, 103*f*, 103*g* and 103*h*. These pulse signals are applied to the $2^n$ signal detector 104 which is composed of a NAND gate 104*a* and an inverter 104*b*. In response to the application of these signals to the NAND gate 104*a*, "0" appears therefrom in synchronism with the rising edge of the 16th pulse of the pulses passed through the gate 102 and is inverted into "1" by the inverter 104*b* to be applied to the first timer 105 which is composed of NAND gates 105*a* and 105*b* and a capacitor 105*c* (0.068 μ F). In response to the application of "1" to the NAND gates 105*a* and 105*b*, a pulse signal having a waveform as shown in FIG. 17(b) appears at the output terminal 105***d* of the first timer 105. In the pulse signal shown in FIG. 17(b), a "0" level persists over a period of time $T_1$ after the $2^n$ signal detector 104 has detected the falling edge of the 15th pulse. This pulse signal is applied to the memory 106 which is composed of NAND gates 106*a*, 106*b* and 106*c* constituting an R-S flip-flop. When this pulse signal is applied to the NAND gates 106*a* and 106*c*, a signal in which a "1" level persists over the period of time $T_1$ as seen in FIG. 17(c) appears at the output terminal 106*d* of the NAND gate 106*a*. In response to the application of the "1" thus appearing to the NAND gate 102*b* in the gate 102, "0" appears from the NAND gate 102*b* and thus the application of the pulse signal from the oscillator 101 to the first frequency divider 103 is interrupted during this period of time as seen in FIG. 17(d). It will thus be seen that a time division pulse signal whose one cycle includes fifteen pulses $P_1$, $P_2$, . . . . $P_{15}$ and which is spaced apart by a period of time $T_1$ from the next cycle appears at the output terminal 102*c* of the gate 102.

The output from the NAND gate 106*b* in the memory 106 is applied to the second timer 107 which is composed of NAND gates 107*a* and 107*b*, an inverter 107*c* and a capacitor 107*d* (150 pF). In response to the application of the output from the NAND gate 106*b*, the second timer 107, hence the inverter 107*c* therein delivers a pulse of very short duration $T_2$ as seen in FIG. 17(e), and this pulse is applied to the reset terminal 103*i* of the first frequency divider 103 to reset the frequency divider 103. The frequency divider 103 starts its frequency dividing operation again from the 1st pulse $P_1$ in the next cycle of the time division pulse signal shown in FIG. 17(d). The pulse signals appearing at the output terminals 103*e*, 103*f*, 103*g* and 103*h* of the first frequency divider 103 are applied to respective data select terminals 108*a*, 108*b*, 108*c* and 108*d* of the first multiplexer 108. The time division pulse signal appearing at the output terminal 102*c* of the NAND gate 102*a* in the gate 102 is applied to the delay circuit 121 which is composed of NAND gates 121*a* and 121*b* and a capacitor 121*c* (2,200 pF), and the output from the delay circuit 121 is applied to the terminal 108*e* of the first multiplexer 108.

Detailed structure of the first multiplexer 108 is shown in FIG. 21. The normally closed switches $S_1$, $S_2$, $S_3$, . . . . $S_{15}$ in the instruction signal generator S are connected to respective input terminals 108–1, 108–2, 108–3, . . . . 108–15 of the first multiplexer 108. There are as many AND gates 122–1, 122–2, 122–3, . . . . 122–15 as the normally closed switches $S_1$, $S_2$, $S_3$, . . . . $S_{15}$ and they are suffixed with the same numbers as those of the corresponding switches. A NOR gate 122–16 carries out the NOR operation of the outputs from the AND gates 122–1, 122–2, 122–3, . . . . 122–15. Suppose, for example, that the normally closed switches $S_3$ and $S_8$ are opened for the purpose of energizing the associated electrical appliances. In this case, the pulse signals corresponding to the specific electrical appliances associated with the switches $S_3$ and $S_8$ are applied from the frequency divider 103 to predetermined ones of the data select terminals 108*a*, 108*b*, 108*c* and 108*d* so that "1" appears at each of the output terminals of the AND gates 122–3 and 122–8 bearing the same suffixes as the normally closed switches $S_3$ and $S_8$ which are in the open position. The NOR gate 122–16 inverts the "1" output signals delivered from the AND gates 122–3 and 122–8 with the result that pulses $\overline{P_3}$ and $\overline{P_8}$ of the "0" level as shown in FIG. 17(f) appear at the same positions as those of the 3rd and 8th pulses counting from the 1st pulse of the time division pulse signal shown in FIG. 17(d). Due to the fact that the time division pulse signal is applied to the terminal 108*e* of the multiplexer 108 after being delayed by the delay circuit 121, the pulse width of the pulses $\overline{P_3}$ and $\overline{P_8}$ is slightly less than that of the pulses $P_1$, $P_2$, . . . . $P_{15}$ in the time division pulse signal. This is advantageous for eliminating mal-operation which may result from impossibility of accurate data selection due to undesirable mutual interference between adjacent pulses of the pulse signal applied to the G terminal 117*e* of the multiplexer 117 in the receiver 100B described in detail later. More precisely, if the time division pulse signal delayed by the delay circuit 121 were not applied to the terminal 108*e* of the multiplexer 108, a pulse of "0" level whose duration is equal to one period (channel width) of the pulses $P_1$, $P_2$, . . . . $P_{15}$ appears at the output terminal 108f of the multiplexer 108. If this pulse were delayed to such an extent that it overlaps the next channel as shown by the broken lines in FIG. 17(f), the second multiplexer 117 in the receiver 100B may make an erroneous decision that instructions are issued for energizing the load associated with the latter channel. In the present embodiment, the delay circuit 121 is provided to eliminate such an undesirable mal-operation. However, another means such as an inverter may be provided in lieu of the delay circuit 121 and the time division pulse signal may be applied through this inverter to the terminal 108*e* of the first multiplexer 108 so as to eliminate undesirable mal-operation.

When one of the normally closed switches $S_1$, $S_2$, . . . . $S_{15}$ in the instruction signal generator S is opened, the signal indicative of the open position of the specific switch is applied to the associated input terminal of the first multiplexer 108 and the pulse signal corresponding to this signal is applied from the frequency divider 103 to the data select terminals 108*a*, 108*b*, 108*c* and 108*d* of the multiplexer 108 so that the corresponding AND gate carries out the AND operation on these signals. As a result, a signal including a pulse of "0" level corresponding to the suffix of the normally closed switch in the open position appears at the output of the NOR gate 121–16, hence the output terminal 108*f* of the first multiplexer 108. The signal appearing at the output terminal 108f of the first multiplexer 108 will hereinafter be referred to as a level signal. The time division pulse signal delivered from the gate 102 is applied to the buffer circuit 109 which is composed of a transistor 109*a* and resistors 109*b*, 109*c* and 109*d* to be finally sent out to the conductor $100L_1$ from the collector of transistor 109*a*. The level signal delivered from the output terminal 108*f* of the first multiplexer 108 is inverted by the inverter 140 and is then applied to the buffer circuit 110 which is composed of a transistor 110*a* and 110*b*, 110*c*, 110*d* and 110*e* to be finally sent out to the conductor $100L_2$ from the collector of transistor 110*a*.

Figure 18:
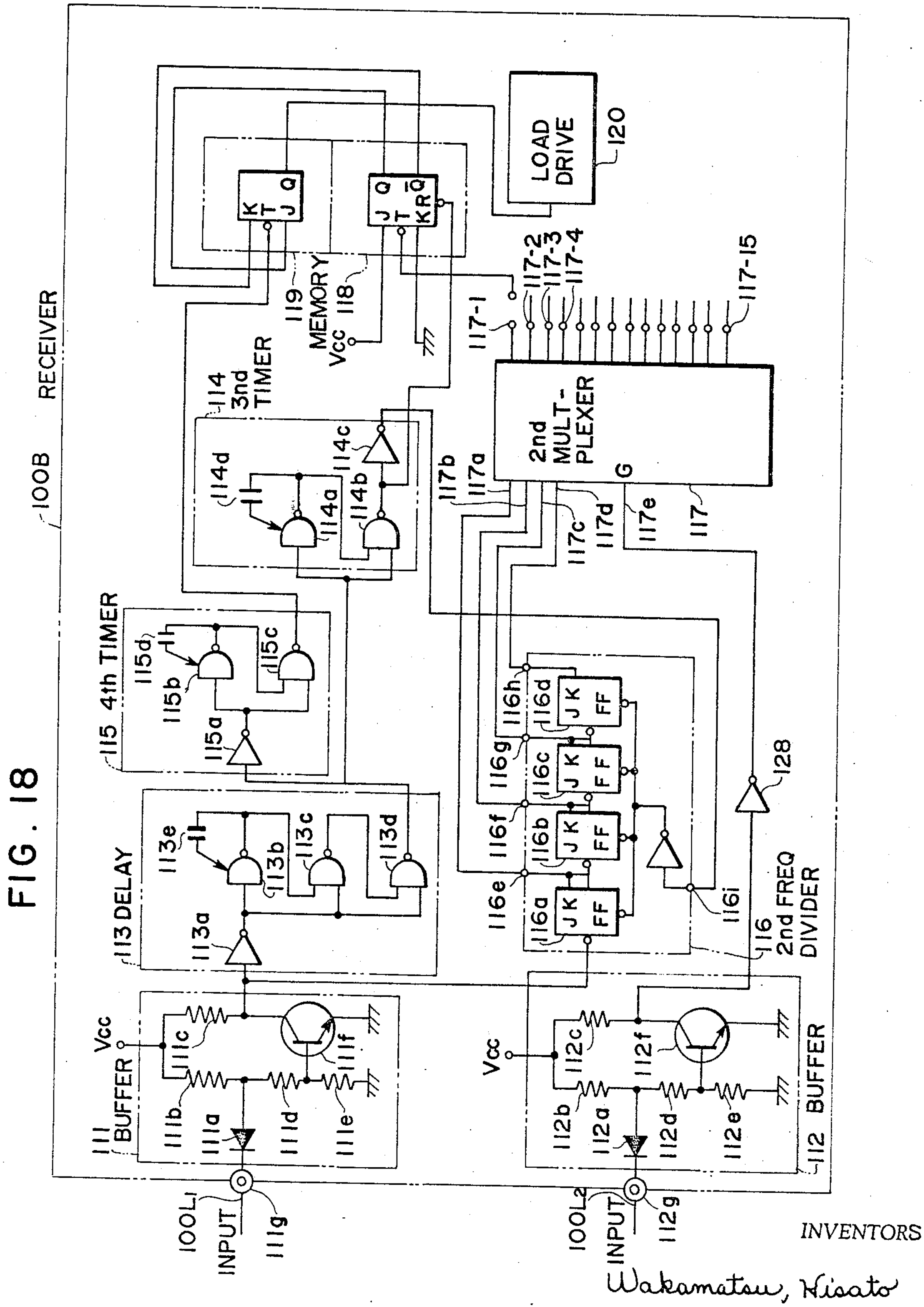
FIG. 18 is an electrical connection diagram showing the structure of a receiver in the system shown in FIG. 15*b*.
Figure 19:
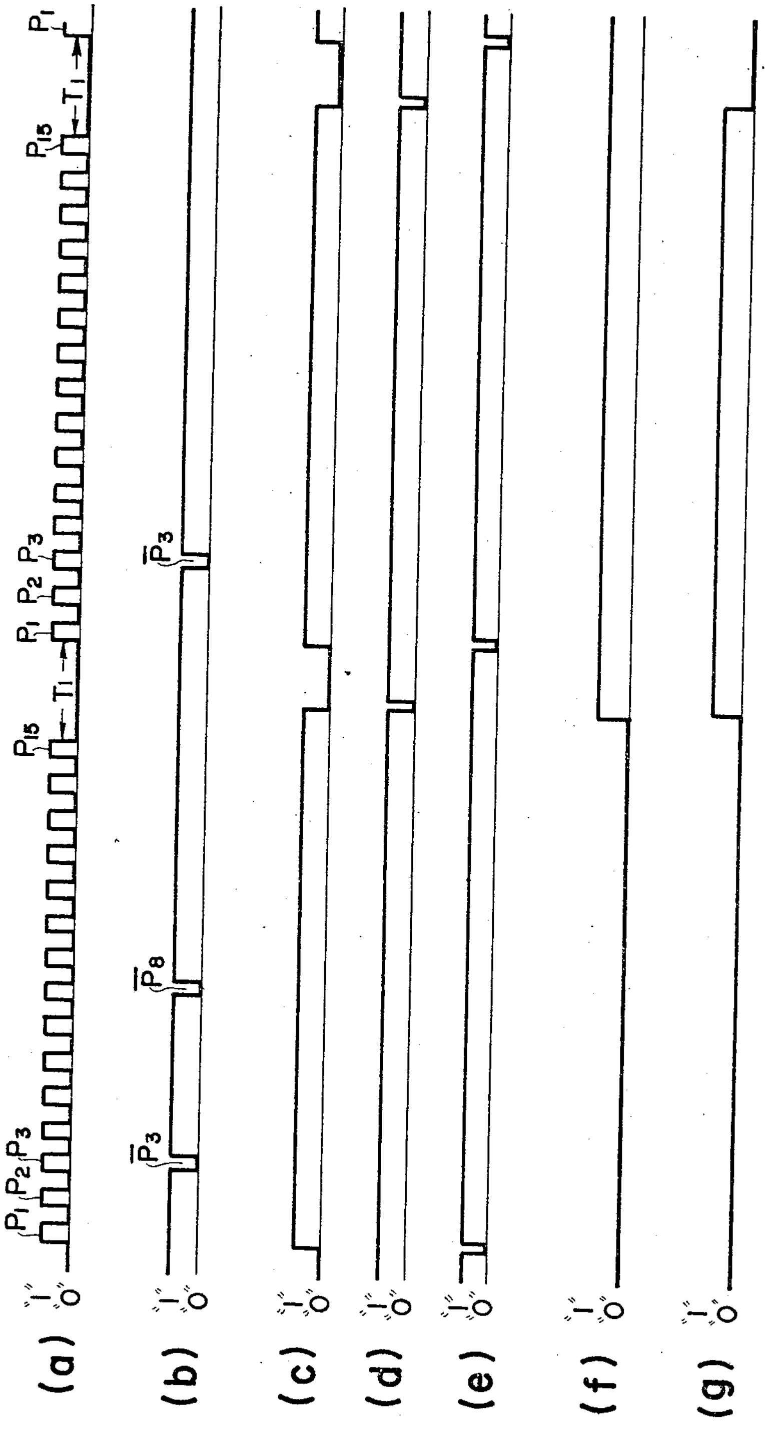
FIGS. 19(a) to 19(g) show voltage waveforms appearing at various parts of the receiver shown in FIG. 18.

Detailed structure and operation of the receiver 100B will next be described with reference to FIGS. 18 and 19. The time division pulse signal and the level signal shown in FIGS. 17(d) and 17(f) are shown again in FIGS. 19(a) and 19(b) respectively. The time division pulse signal delivered from the buffer circuit 109 in the transmitter 100A is applied by way of the conductor 100L$_1$ to the input terminal 111g of the buffer circuit 111 which is composed of a diode 111*a*, resistors 111*b*, 111*c*, 111*d* and 111*e*, and a transistor 111*f*. The time division pulse signal derived from the collector of the transistor 111f is applied to the delay circuit 113 which is composed of an inverter 113*a*, NAND gates 113*b*, 113*c* and 113*d*, and a capacitor 113*e* (0.0015 $\mu$F). The time division pulse signal is inverted by the inverter 113*a* and the inverted time division pulse signal is applied to the NAND gates 113*b*, 113*c* and 113*d*. The inverted time division pulse signal applied to the NAND gate 113b is integrated by the integrating operation of the NAND gate 113*b* and capacitor 113*e*, and the NAND gate 113*b* delivers a signal which is maintained at a "1" level between a time corresponding to the rising edge of the pulse $P_1$ in FIG. 19(a) and a time slightly later than the disappearance of the pulse $P_{15}$ in the same pulse train and is thereafter kept at a "0" level until the pulse $P_1$ in the next pulse train appears. The NAND gate 113*c* carries out the NAND operation on the output from the NAND gate 113*b* and the inverted time division pulse signal applied thereto, and then the NAND gate 113*d* carries out the NAND operation on the output from the NAND gate 113*c* and the inverted time division pulse signal applied thereto, with the result that a pulse signal as shown in FIG. 19(c) appears at the output terminal of the NAND gate 113d. It will be seen from FIG. 19(c) that a "0" level appears in slightly delayed relation from the end of the pulse $P_{15}$ in the time division pulse signal shown in FIG. 19(a). This pulse signal is applied to the fourth timer 115 which is composed of an inverter 115*a*, NAND gates 115*b* and 115*c*, and a capacitor 115*d* (150 pF). The pulse signal is inverted by the inverter 115*a*, and a pulse signal including a "0" level of short duration as shown in FIG. 19(d) appears finally at the output terminal of the NAND gate 115*c* to be applied to the T terminal of the memory 119. The output from the NAND gate 113*d* in the delay circuit 113 is also applied to the third timer 114 which is composed of NAND gates 114*a* and 114*b*, an inverter 114*c* and a capacitor 114*d* (1,500 pF). The output from the NAND gate 114*b* is a pulse signal including a "0" level of short duration as shown in FIG. 19(e). This pulse signal is applied to the reset terminal of the memory 118 to reset same, and at the same time, it is inverted by the inverter 114*c* so as to operate the second frequency divider 116 in synchronism with the transmitter 100A. The second frequency divider 116 of the binary type employing four J-K flip-flops 116*a*, 116*b*, 116*c* and 116*d*. In response to the application of the time division pulse signal through the buffer circuit 111 to the second frequency divider 116, pulse signals whose frequencies are one-half, one-fourth, one-eighth and one-sixteenth respectively of the input frequency appear at output terminals 116*e*, 116*f*, 116*g* and 116*h* of the frequency divider 116. The pulse signals appearing at the output terminals 116*e*, 116*f*, 116*g* and 116*h* are applied to respective data select terminals 117*a*, 117*b*, 117*c* and *₊d* of the second multiplexer 117. On the other hand, the level signal is applied from the transmitter 100A to the input terminal 112*g* of the buffer circuit 112 through the buffer circuit 110 and conductor 100L$_2$. The buffer circuit 112 is composed of a diode 112*a*, resistors 112*b*, 112*c*, 112*d* and 112*e*, and a transistor 112*f*. The level signal derived from the collector of transistor 112*f* as the output from the buffer circuit 112 is inverted by the inverter 128 to be applied to the G terminal 117*e* of the second multiplexer 117.

Detailed structure of the second multiplexer 117 is shown in FIG. 22. Referring to FIG. 22, the second multiplexer 117 includes NAND gates 123–1, 123–2, 123–3, . . . . 123–15. Suppose, for example, that the normally closed switches $S_3$ and $S_8$ are opened. Then, a pulse signal including pulses $\overline{P_3}$ and $\overline{P_8}$ as shown in FIG. 19(b) is applied to the input terminal 112*g* of the buffer circuit 112 to be applied to the G terminal 117e of the second multiplexer 117. In the meantime, the pulse signals corresponding to the pulses $\overline{P_3}$ and $\overline{P_8}$ are delivered from the frequency divider 116 to be applied to predetermined ones of the data select terminals 117*a*, 117*b*, 117*c* and 117*d* of the second multiplexer 117. The signal applied to the G terminal 117e and the signals applied to the predetermined ones of the data select terminals 117*a*, 117*b*, 117*c* and 117*d* are subject to the AND operation, and "0" appears in order from the output terminals of the NAND gates 123–3 and 123–8 having the same suffixes as the suffixes of the pulses $\overline{P_3}$ and $\overline{P_8}$ in the level signal. The "0" signal appearing at the output of the NAND gate 123–3, hence the output terminal 117–3 of the second multiplexer 117 is applied to the T terminal of the memory 118 consisting of a J-K flip-flop with the result that the output signals appearing at the output terminals Q and $\overline{Q}$ are inverted and "1" and "0" appear now at the respective output terminals Q and $\overline{Q}$. The signals appearing at the output terminals Q and $\overline{Q}$ are applied to the J and K terminals respectively of the memory 119 consisting of a J-K flip-flop so that "1" and "0" appear at the J and K terminals respectively of the memory 119. In response to the application of the output from the NAND gate 115c in the fourth timer 115 to the T terminal of the memory 119, "1" appears at the output terminal Q of the memory 119. The output terminal of the NAND gate 114b in the third timer 114 is connected to the reset terminal R of the memory 118. Thus, in response to the application of the resetting signal to the reset terminal R of the memory 118, the memory 118 is reset, and "0" and "1" appear now at the output terminals Q and $\overline{Q}$ respectively of the memory 118. As soon as the memory 118 is reset, the output from the inverter 114c in the third timer 114 is applied to the reset terminal 116i of the second frequency divider 116 to reset same. In the next cycle, "0" appears at the output terminal 117–3 of the second multiplexer 117 again and is applied to the T terminal of the memory 118 with the result that "1" and "0" appear at the output terminals Q and $\overline{Q}$ respectively of the memory 118 again. Thus, a continuouse output of "1" level can be derived from the output terminal Q of the memory 119. This continuous signal is amplified by the amplifier in the load drive circuit 120 to energize the electrical appliance associated with the normally closed switch $S_3$. When the signal having appeared at the output terminal 117-3 of the second multiplexer 117 disappears, "0" and "1" appear at the respective output terminals Q and Q of the memory 118 again. In response to the application of the signal from the fourth timer 115 to the T terminal of the memory 119 in such a state of the memory 118, "0" appears now at the output terminal Q of the memory 119 and no signal is supplied to the load drive circuit 120. FIGS. 19(f) and 19(g) show the waveforms of the outputs appearing at the output terminal Q of the memory 119 when the level signal shown in FIG. 19(b), in which "0" levels appear at the positions of the 3rd and 8th pulses in the time division pulse signal, is applied to the G terminal 117e of the second multiplexer 117. More precisely, FIG. 19(f) shows the output waveform responsive to the pulse $\overline{P_3}$ in the level signal and FIG. 19(g) shows the output waveform responsive to the pulse $\overline{P_8}$ in the level signal. It is to be understood that each of the output terminals 117–1, 117–2, . . . . 117–15 is associated with a pair of memories (not shown) and a load drive circuit (not shown) which are the same in structure as the memories 118 and 119 and the load drive circuit 120 shown in FIG. 18 and operate in the same way as those illustrated.

Figure 20A:
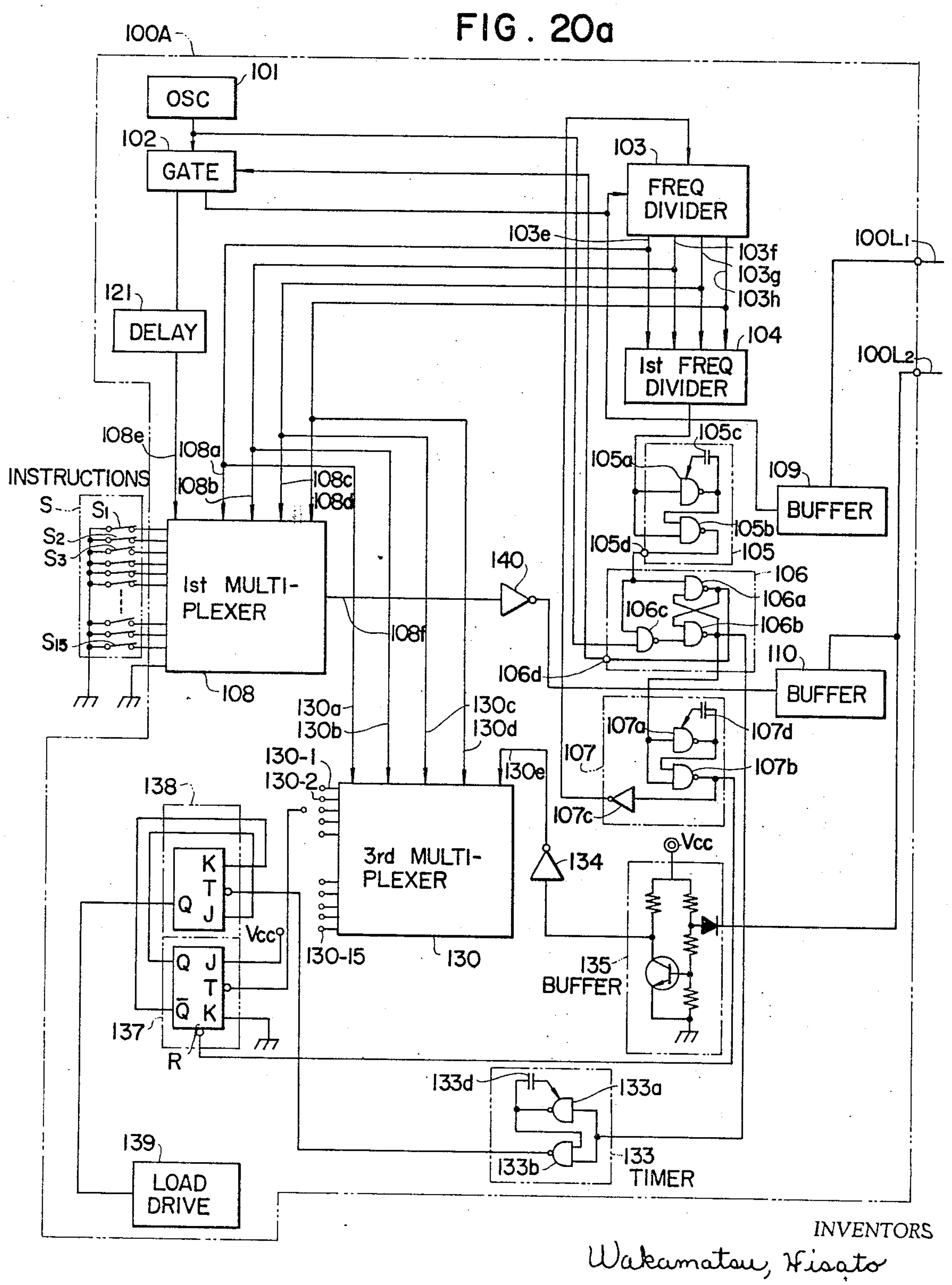
FIGS. 20*a* and 20*b* are electrical connection diagrams illustrating the manner of signal transmission from the receiver to the transmitter in the system shown in FIGS. 15*a* and 15*b*.
Figure 20B:
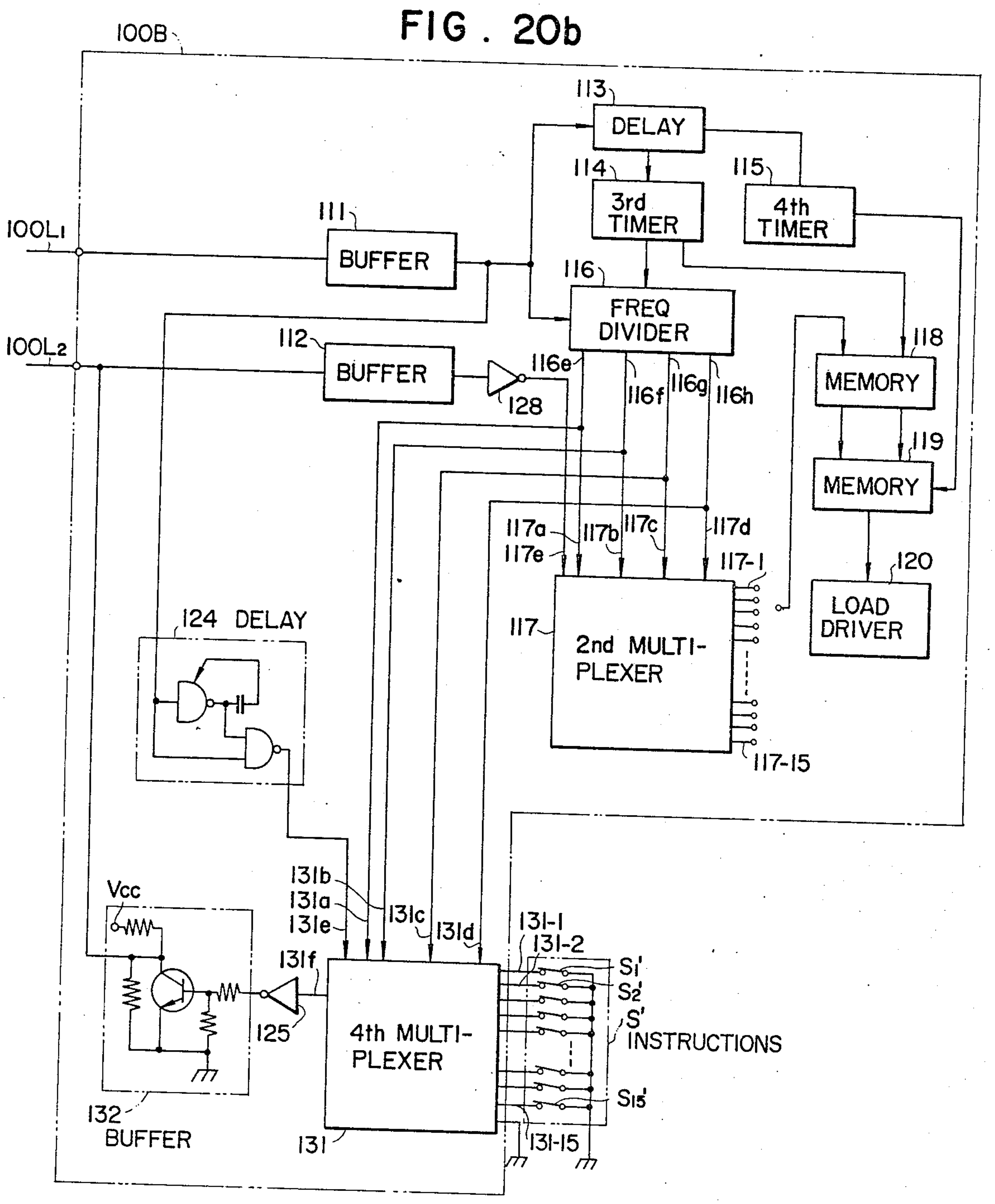

It is also possible to transmit signals from the receiver 100B to the transmitter 100A by effectively utilizing idle and available channels in the time division pulse signal. This operation will be described with reference to FIGS. 20*a* and 20*b*. Referring to FIGS. 20*a* and 20*b* in which parts of the circuits illustrated in FIGS. 16 and 18 are shown by blocks and additional parts only are shown in an electrical connection diagram, a third multiplexer 130 is disposed in the transmitter 100A separately from the first multiplexer 108. The third multiplexer 130 is substantially similar in structure and operation to the second multiplexer 117 in the receiver 100B shown in FIG. 22 and any detailed description as to the structure thereof is unnecessary. The third multiplexer 130 is provided with data select terminals 130*a*, 130*b*, 130*c* and 130*d*, a G terminal 130*e*, and output terminals 130–1, 130–2, . . . . 130–15 which correspond to the data select terminals 117*a*, 117*b*, 117*c* and 117*d*, the G terminal 117*e*, and the output terminals 117–1, 117–2, . . . . 117–15 of the second multiplexer 117 respectively. The pulse signals appearing at the output terminals 103*e*, 103*f*, 103*g* and 103*h* of the first frequency divider 103 are applied to the data select terminals 130*a*, 130*b*, 130*c* and 130*d* of the third multiplexer 130 respectively. A fourth multiplexer 131 is disposed in the receiver 100B separately from the second multiplexer 117. The fourth multiplexer 131 is substantially similar in structure and operation to the first multiplexer 108 in the transmitter 100A shown in FIG. 21 and any detailed description as to its structure is unnecessary. The number of channels is 15 if the number of idle and available channels in the first multiplexer 108 is, for example, five. Switches $S_1'$, $S_2'$, . . . . $S_{15}'$ are connected to respective input terminal 131–1, 131–2, . . . . 131–15 of the fourth multiplexer 131 for driving associated loads. The fourth multiplexer 131 is provided with data select terminals 131*a*, 131*b*, 131*c* and 131*d*, a terminal 131*e* and an output terminal 131*f* which correspond to the data select terminal 108*a*, 108*b*, 108*c* and 108*d*, the terminal 108*e* and the output terminal 108*f* of the first multiplexer 108 respectively. The pulse signals appearing at the output terminals 116*e*, 116*f*, 116*g* and 116*h* of the second frequency divider 116 are applied to the data select terminals 131*a*, 131*b*, 131*c* and 131*d* of the fourth multiplexer 131 respectively. The terminal 131*e* of the fourth multiplexer 131 is connected through a delay circuit 124 to the collector of transistor 111*f* in the buffer circuit 111, while the output terminal 131*f* is connected through an inverter 125 and a buffer circuit 132 to the conductor 100$L_2$. The delay circuit 124 is similar in structure and operation to the delay circuit 121 in the transmitter 100A, and the buffer circuit 132 is also similar in structure and operation to the buffer circuit 110 in the transmitter 100A. The G terminal 130*e* of the third multiplexer 130 is connected through an inverter 134 and a buffer circuit 135 to the conductor 100$L_2$. The buffer circuit 135 is similar in structure and operation to the buffer circuit 112 in the receiver 100B. Memories 137 and 138 each consisting of a J-K flip-flop are provided and correspond to the memories 118 and 119 in the receiver 100B respectively. The reset terminal R of the memory 137 is connected to the output terminal of the NAND gate 107*b* in the second timer 107, and the T terminal of the other memory 138 is connected through a timer 133 to the output terminal of the NAND gate 106*b* in the memory 106. The timer 133 is composed of NAND gates 133*a* and 133*b*, and a capacitor 133 *d*. A load drive circuit 139 is connected to the output terminal Q of the memory 138. While only one pair of memories 137 and 138 and only one load drive circuit 139 are shown in FIG. 20*a*, it is to be understood that a pair of such memories and such a load drive circuit are provided for each of the output terminals 130–1, 130–2, . . . . 130–15 of the third multiplexer 130.

The operation of the system wor transmitting the signals from the receiver 100B to the transmitter 100A in response to the opening of the normally closed switches $S_1'$, $S_2'$, . . . . $S_{15}'$ will now be described. The operating principle is similar to that described previously in regard to the transmission of the signals from the transmitter 100A to the receiver 100B. Suppose that some of the normally closed switches $S_1'$, $S_2'$, . . . . $S_{15}'$ are opened to deliver the signals for the purpose of actuation of the associated electrical appliances. These signals are applied to the fourth multiplexer 131 to which the pulse signals corresponding to the above signals are also applied from the secondary frequency divider 116 to predetermined ones of the data select terminals 131*a*, 131*b*, 131*c* and 131*d*. The AND operation is carried out in the fourth multiplexer 131 so that the level signal appearing at the output terminal 131*f* includes "0" levels at the same positions as the suffixes of the specific normally closed switches in the open position counting from the 1st pulse of the time division pulse signals appearing at the output terminal of the buffer circuit 111. The level signal appearing at the output terminal 131*f* of the fourth multiplexer 131 is applied to the G terminal 130*e* of the third multiplexer 130 through the inverter 125, buffer circuit 132, conductor 100$L_2$, buffer circuit 135 and inverter 134. The pulse signals corresponding to the selected ones of the normally closed switches $S_1'$, $S_2'$, . . . . $S_{15}'$ are applied to predetermined ones of the data select terminals 130*a*, 130*b*, 130*c* and 130*d* of the third multiplexer 130 from the frequency divider 103. Therefore, the AND operation is carried out on the signal applied to the G terminal 130e and the corresponding pulse signals applied to the predetermined ones of the data select terminals 130*a*, 130*b*, 130*c* and 130*d*, with the result that "0" appears in order at the corresponding ones of the output terminals 130–1, 130–2, . . . . 130–15. In response to the appearance of "0," the memories 137 and 138 and the load drive circuits 139 are actuated to drive the associated loads in the same manner as when the level signal is transmitted from the transmitter 100A to the receiver 100B. In this manner, not only the signal transmission from the transmitter 100A to the receiver 100B but also the signal transmission from the receiver 100B to the transmitter 100A can be carried out.

Figure 23:
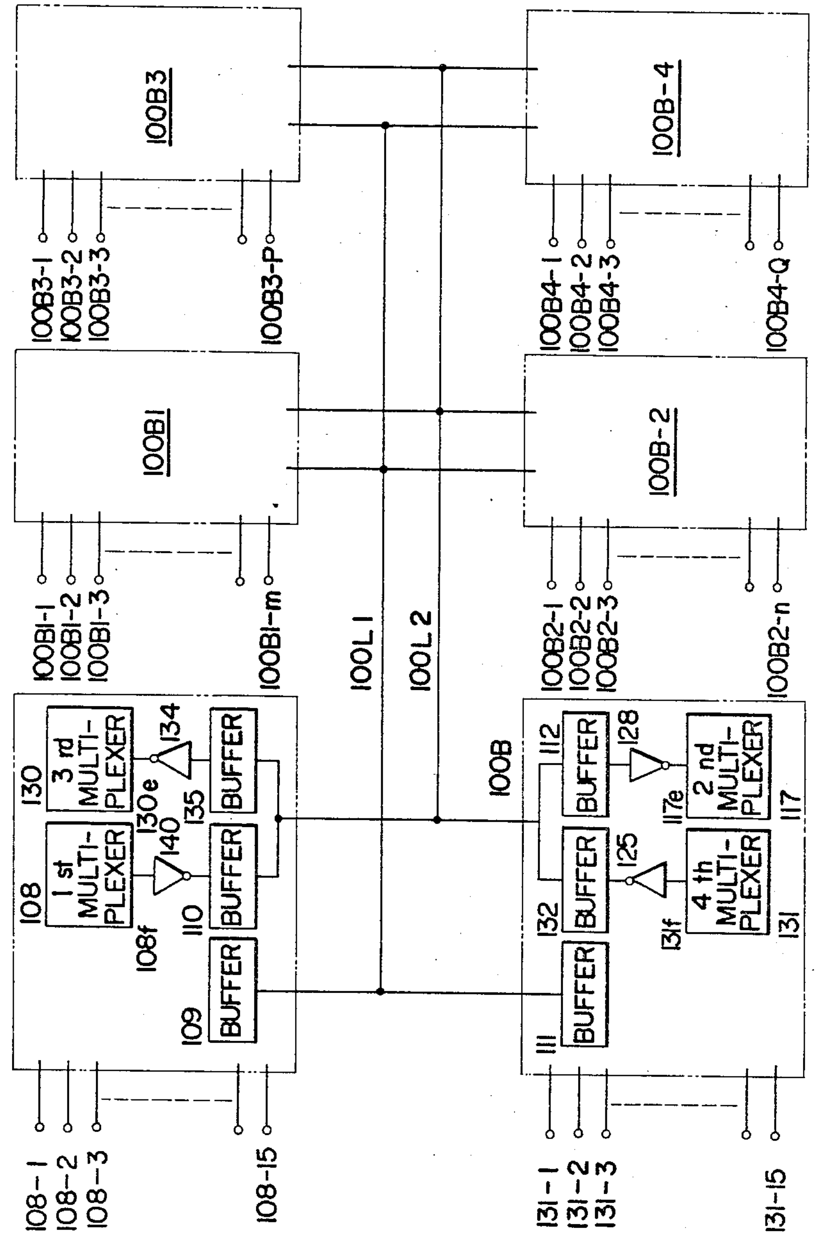
FIG. 23 is a block diagram of a modification in which a transmitter capable of signal transmission and reception is connected to a plurality of receivers capable of signal transmission and reception so as to carry out intercommunication therebetween.

Further, such a transmitter 100A may be connected to a plurality of such receivers 100B so that intercommunication may be made therebetween. Referring to FIG. 23, a transmitter 100A and a receiver 100B are of the same structures as those shown in FIGS. 20*a* and 20*b*, and their principal components are only shown therein for the sake of simplicity. In addition to the receiver 100B, there are provided a plurality of receivers 100B1, 100B2, 100B3 and 100B4 of the same structure as that of the receiver 100B. The time division pulse signal is applied from the transmitter 100A to a buffer circuit 111 in the receiver 100B by way of a conductor $100L_1$. The time division pulse signal is similarly applied to buffer circuits of similar structure in the receivers 100B1, 100B2, 100B3 and 100B4 by way of the conductor $100L_1$. For the purpose of transmission and reception of the level signal between the transmitter 100A and the receivers 100B, 100B1, 100B2, 100B3 and 100B4 through buffer circuits therein, the output terminals of these buffer circuits are connected to a conductor $100L_2$ so as to form a wired-OR connection. The receivers 100B1, 100B2, 100B3 and 100B4 are provided with input terminals 100B1-1 to 100B1-m; 100B2–1 to **100B2–*n*; 100B-1 to 100B3–*p*; and 100B4–1 to 100B4–*q***, respectively.

The operation of the system shown in FIG. 23 will be easily understood from the basic operating principle of the system described with reference to FIG. 20a and 20b in regard to the manner of mutual communication between the transmitter 100A and the receiver 100B. A level signal appears from the transmitter 100A in response to the application of instruction inputs to the input terminals 108–1, 108–2, . . . . 108–15 thereof and is applied by way of the conductor $100L_2$, buffer circuit 112 and phase inverter 128 to the G terminal 117e of a fourth multiplexer 117 in the receiver 100B. This level signal is similarly applied through the buffer circuits and phase inverters to the G terminals of fourth multiplexers in the remaining receivers 100B1, 100B2, 100B3 and 100B4. At the same time, the level signal is applied to the G terminal 130*e* of a second multiplxer 130 in the transmitter 100A itself through the conductor $100L_2$, buffer circuit 135 and phase inverter 134. These multiplexers select the level signal and generate output signals for driving the loads which are designated by the level signal. Similarly, a level signal appearing from anyone of the receivers 100B, 100B1, 100B2, 100B3 and 100B4 in response to the application of instruction inputs to its input terminals is applied through the buffer circuits and phase inverters to the G terminals of all the receiving multiplexers in the transmitter and receivers including the one originating the level signal so that these multiplexers select the level signal and generate output signals for driving the loads which are designated by the level signal. The operation of the system may be such that, when, for example, a first channel input signal, a second channel input signal and a third channel input signal are applied to the transmitter 100A, receiver 100B2 and receiver 100B4 respectively, they generate level signals representative of the first, second and third channels respectively so that the receivers 100B3, 100B and 100B1 drive the loads corresponding to the first, second and third channels respectively. According to another arrangement, an input signal for driving one of the loads connected to, for example, the receiver 100B3 to be driven thereby may be applied to the receivers 100B2 and 100B4.

The present invention is in no way limited to such a specific embodiment and various changes and modifications may be made therein. The application of the present invention is not limited to automotive vehicles. The first and second frequency dividers 103 and 116 may be of the synchronous type, and the number of loads may be suitably selected. Further, the number of pulses in the time division pulse signal, hence the number of channels may be suitably selected depending on the number of loads. The switches in the instruction signal generators S and S′ may be of the normally open type, or of the manual on-off type, or of the type turned on or off by automatically sensing an operating condition.

Figure 24A:
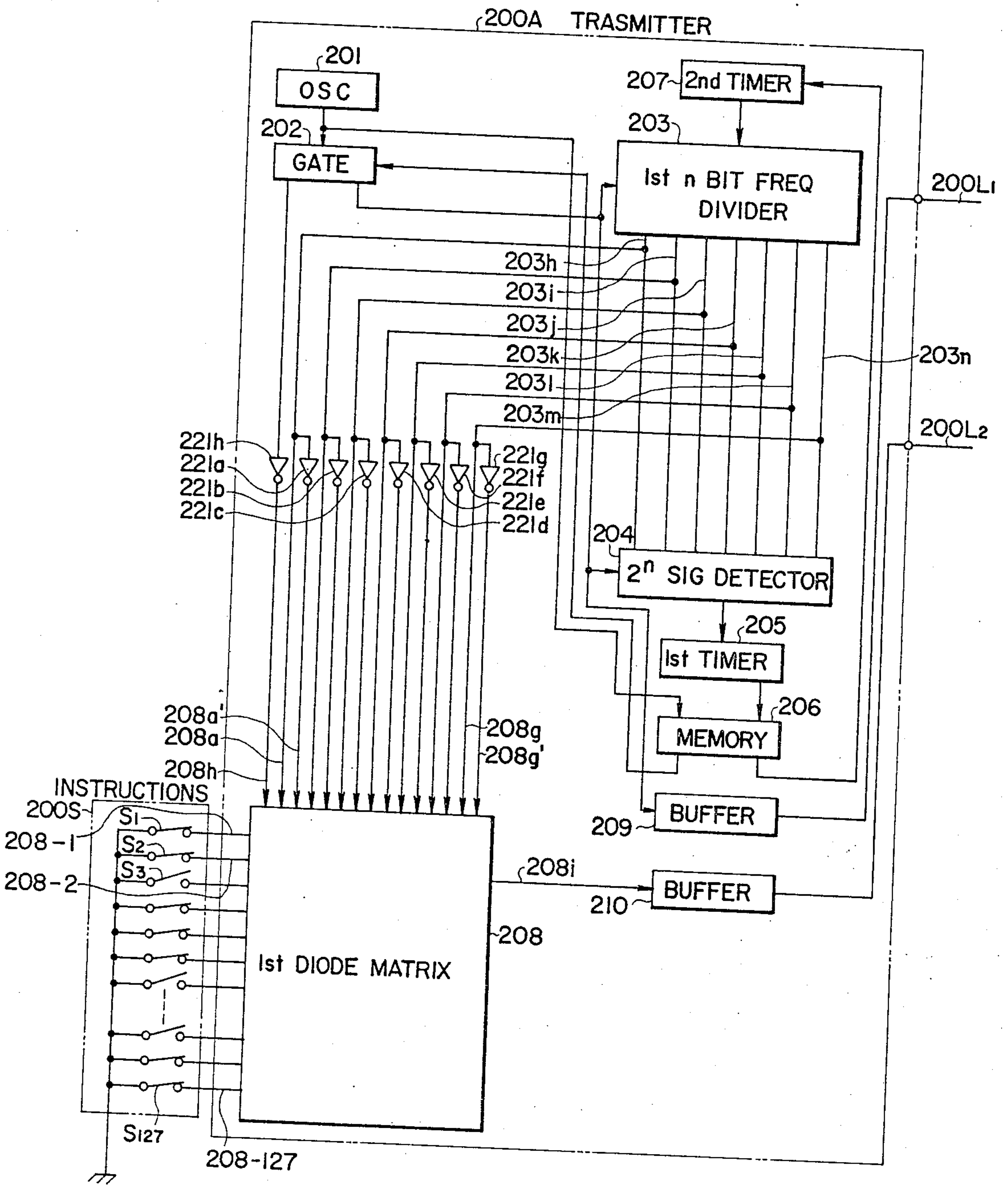
FIGS. 24*a* and 24*b* are block diagrams showing the general structure of a third embodiment of the present invention.
Figure 24B:
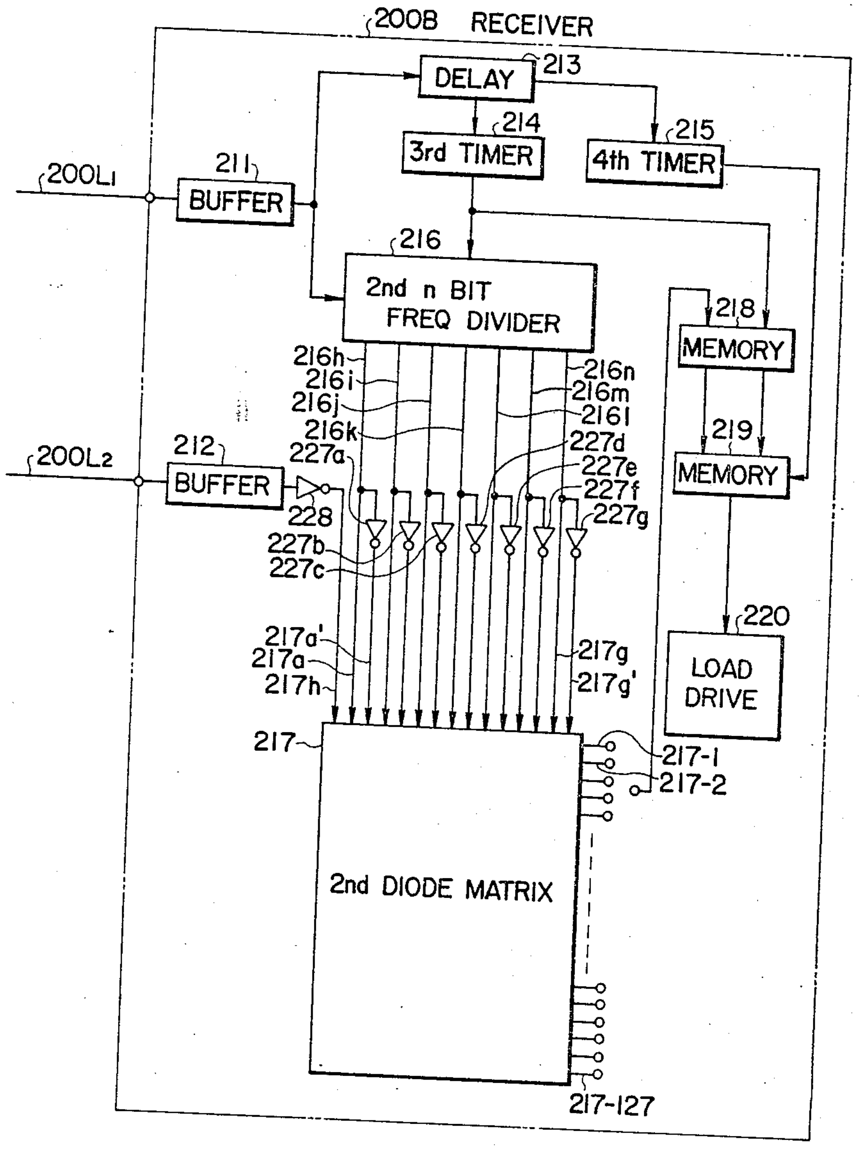

A third embodiment of the present invention will be described with reference to FIGS. 24*a* to 30. FIGS. 24*a* and 24*b* are block diagrams showing the general structure of the third embodiment. Referring to FIG. 24*a*, an instruction signal generator 200S issues instructions for actuating various electrical appliances mounted on a vehicle and includes a number of, for example, 127 normally closed switches $S_1, S_2, \ldots . S_{127}$ disposed to correspond to associated electrical appliances. A transmitter 200A includes an oscillator 201 which generates a pulse signal having a constant frequency of, for example, 100 kHz. A gate 202 makes a gate action against the pulse signal generated by the oscillator 201. A first *n*-bit frequency divider 203 counts the number of pulses passed through the gate 202 thereby dividing the frequency. In the illustrated example, the frequency divider 203 is a 7-bit frequency divider. A $2^n$ signal detector 204 detects a $2^n$-th pulse, or the 128th pulse in the illustrated example, counting from the 1st pulse of the pulse signal generated by the oscillator 201. In response to the detection of the rising edge of the 128th pulse by the $2^n$ signal detector 204, a first timer 205 produces a pulse having a duration $T_{21}$ which may, for example, be ten times one cycle of the oscillation frequency of the oscillator 201. A memory 206 consisting of a flip-flop acts to close the gate 202 for a period of time which is equal to the duration $T_{21}$ of the pulse produced by the first timer 205. A second timer 207 is actuated in response to the falling edge of the pulse of duration $T_{21}$ produced by the first timer 205 to produce a pulse having a duration $T_{22}$ which is less than one cycle of the oscillation frequency of the oscillator 201 so that the first *n*-bit frequency divider 203 is reset by this pulse signal and starts its frequency dividing operation again when the gate 202 is opened next. Therefore, a time division pulse signal whose one cycle includes 127 pulses at a high voltage level or "1" and one pulse of duration $T_{21}$ at a low voltage level or " 0" appears at the output terminal of the gate 202. The first *n*-bit frequency divider 203 delivers seven outputs, that is, seven signals obtained by dividing the oscillation frequency of the oscillator 201 to one-half, one-fourth, one-eighth, one-sixteenth, one thirty-second, one sixty-fourth and one one hundred and twenty-eighth respectively. These signals are applied to a first diode matrix 208 to which the normally closed switches $S_1, S_2, \ldots . S_{127}$ in the instruction signal generator 200S are connected to apply instructions when they are opened so that the first diode matrix 208 carries out the AND operation on these signals. The pulse having the same suffix as the suffix of the opened one of the normally closed switches counting from the first one of the 127 pulses passed through the gate 202 is derived from the first diode matrix 208 as its output when the specific normally closed switch is opened for the purpose of actuating the associated electrical appliance. Buffer circuits 209, 210, 211 and 212 are provided to protect the circuits described above and circuits described later which are integrated so that these circuits may not be adversely effected by noises developed by other equipment. The elements 201 to 210 constitute the transmitter 200A.

Referring to FIG. 24b, a receiver 200B includes a delay circuit 213 which acts to slightly shorten the period of time $T_{21}$ following the 127 pulses above described. A third timer 214 acts to produce a pulse which has a duration shorter than one cycle of the output frequency delivered from the oscillator 201 and is in synchronism with the falling edge of the output from the delay circuit 213 so that a second $n$-bit frequency divider 216 can be operated in synchronism with the transmitter 200A. A fourth timer 215 produces a pulse of short duration during the period of time $T_{21}$ so as to check as to whether the normally-closed switches in the instruction signal generator 200S are opened or not during the preceding one cycle (consisting of the 127 pulses plus the period of time $T_{21}$) of the time division pulse signal. The second $n$-bit frequency divider 216 divides the frequency of the pulse signal applied from the transmitter 200A by way of the buffer circuit 209, a conductor $200L_1$ and the buffer circuit 211 to produce signals whose frequencies are one-half, one-fourth, one-eighth, one-sixteenth, one thirty-second, one sixty-fourth and one one hundred and twenty-eighth respectively of the original frequency. In the illustrated example, the frequency divider 216 is a 7-bit frequency divider. The output from the first diode matrix 208 in the transmitter 200A is applied by way of the buffer circuit 210, a conductor $200L_2$, the buffer circuit 212 and an inverter 228 to a second diode matrix 217 to which the outputs from the second $n$-bit frequency divider 216 are also applied so that the second diode matrix 217 carries out the AND operation on these inputs. The pulse having the same suffix as the suffix of the opened one of the normally closed switches $S_1$, $S_2$, . . . $S_{127}$ is detected by the second diode matrix 217. Memories 218 and 219 deliver "1" continuously until the pulse output from the second diode matrix 217 disappears, that is, until the specific normally closed switch in the open position is closed again. A load drive circuit 220 is connected to the memory 219 for actually energizing an associated load. The elements 211 to 220 constitute the receiver 200B.

Figure 25:
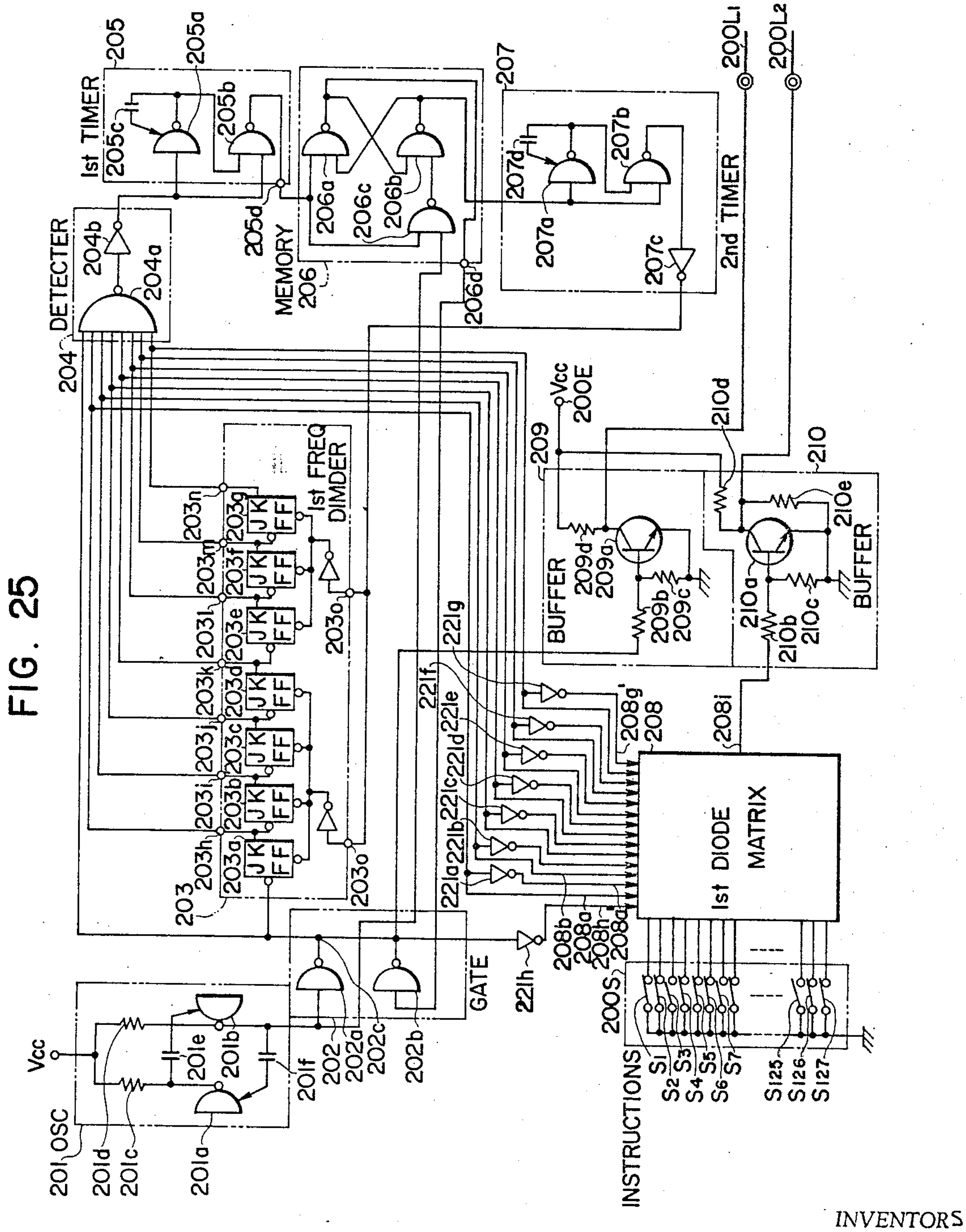
FIG. 25 is an electrical connection diagram showing the structure of a transmitter in the system shown in FIGS. 24*a* and 24*b*.
Figure 26:
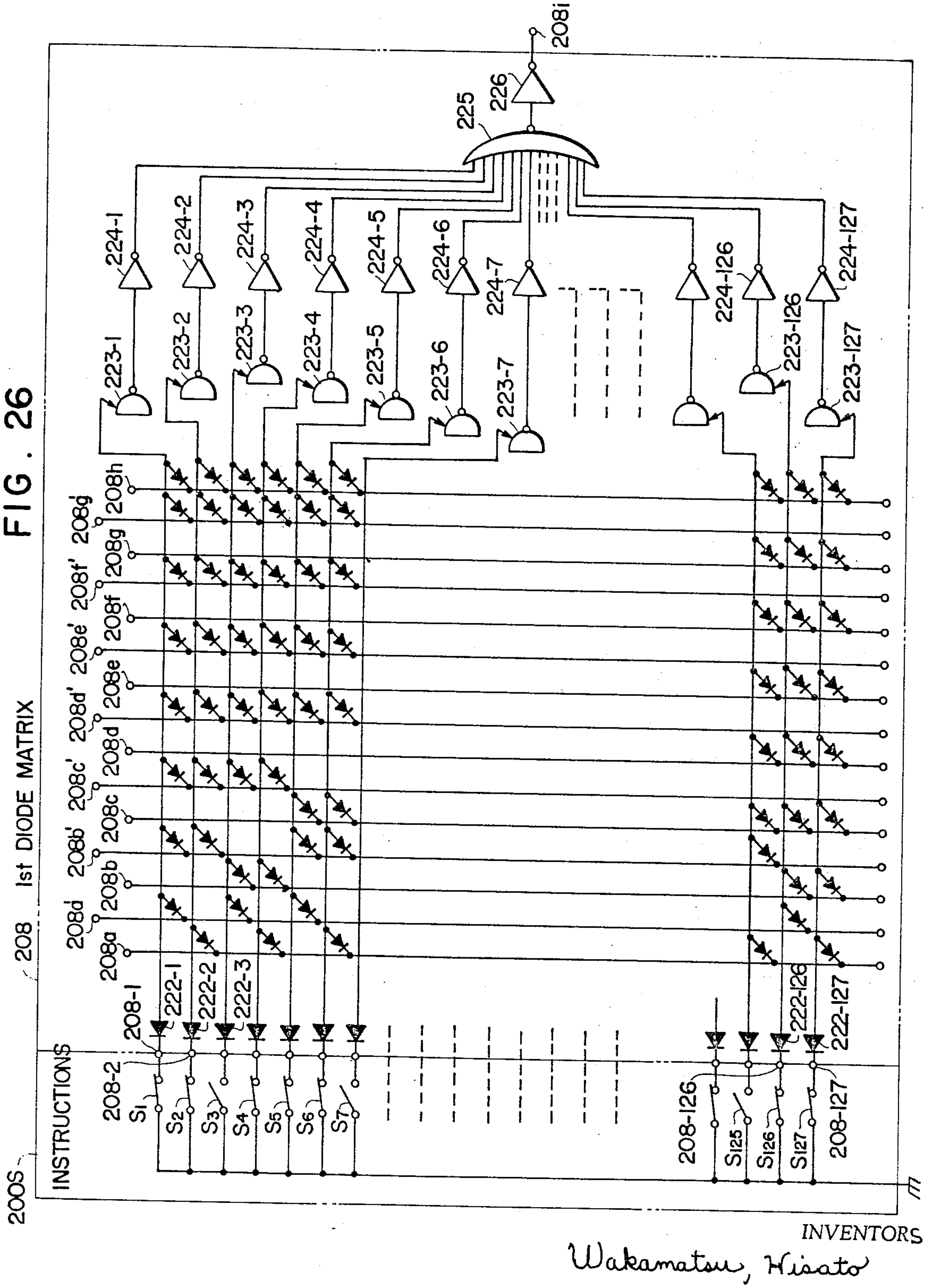
FIG. 26 is an electrical connection diagram showing the structure of a diode matrix in the transmitter shown in FIG. 25.
Figure 27:
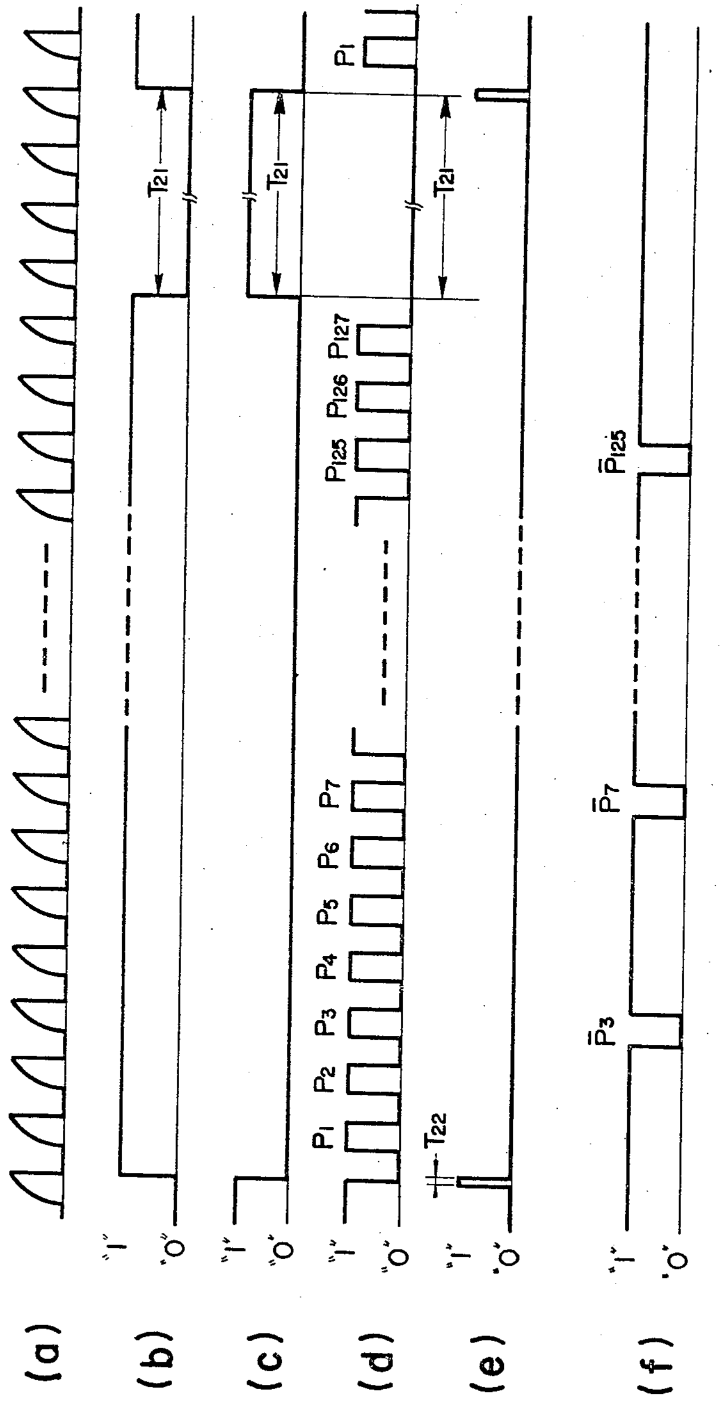
FIGS. 27(a) to 27(f) show voltage waveforms appearing at various parts of the transmitter shown in FIG. 25.

Detailed structure and operation of the system shown in FIGS. 24a and 24b will be described with reference to FIGS. 25 to 30. Referring first to FIGS. 25 and 26 showing the structure of the instruction signal generator 200S and transmitter 200A, the oscillator 201 is in the form of an astable multivibrator which is composed of NAND gates 201a and 201b, resistors 201c and 201d (1 k Ω), and capacitors 201e and 201f (1,000 pF). The oscillator 201 generates a pulse signal of constant frequency having a waveform as shown in FIG. 27(a) and its oscillation frequency is, for example, 100 kHz. The gate 202 consists of a pair of NAND gates 202a and 201b. When the gate 202 is open, it shapes the waveform of the output pulse signal of the oscillator 201 to apply it to the first 7-bit frequency divider 203. The frequency divider 203 is of the binary type using seven J-K flip-flops 203a, 203b, 203c, 203d, 203e, 203f, and 203g, and pulse signals whose frequencies are one-half, one-fourth, one-eighth, one-sixteenth, one thirty-second, one sixty-fourth and one one hundred and twenty-eighth of the frequency of the input pulse signal appear at respective output terminals 203h, 203i, 203j, 203k, 203l, 203m and 203n. These pulse signals and the time division pulse signal from the gate 202 are applied to the $2^n$ signal detector 204 which is composed of a NAND gate 204a and an inverter 204b. The output from the $2^n$ signal detector 204 is applied to the first timer 205 which is composed of NAND gates 205a and 205b and a capacitor 205c (0.001 μ F). In response to the application of the output from the $2^n$ signal detector 204 to the NAND gates 205a and 205b, a pulse signal having a waveform as shown in FIG. 27(b) appears at the output terminal 205d of the first timer 205. In the pulse signal shown in FIG. 27(b), a "0" level persists over a period of time $T_{21}$ after the $2^n$ signal detector 204 has detected the rising edge of the 128th pulse of the pulse output from the oscillator 201 and "0" has been delivered therefrom. This pulse signal is applied to the memory 206 which is composed of NAND gates 206a, 206b and 206c constituting an R-S flip-flop. In response to the application of the pulse signal to the NAND gates 206a and 206c, a signal in which a "1" level persists over the period of time $T_{21}$ as seen in FIG. 27(c) appears at the output terminal 206d of the NAND gate 206a. In response to the application of the "1" thus appearing to the NAND gate 202b in the gate 202, "0" appears from the NAND gate 202b and thus the application of the pulse signal from the oscillator 201 to the first frequency divider 203 is interrupted during this period of time as seen in FIG. 27(d). It will thus be seen that one cycle of the time division pulse signal appearing at the output terminal 202c of the gate 202 includes 127 pulses $P_1$, $P_2$, . . . $P_{127}$ and is spaced apart by the period of time $T_{21}$ from the next cycle.

The output from the NAND gate 206b in the memory 206 is applied to the second timer 207 which is composed of NAND gates 207a and 207b, an inverter 207c and a capacitor 207d (150 pF). In response to the application of the output from the NAND gate 206b, the second timer 207, hence the inverter 207c therein delivers a pulse of very short duration $T_{22}$ as seen in FIG. 27(e), and this pulse is applied to the reset terminal 203o of the first frequency divider 203 to reset the frequency divider 203. The frequency divider 203 starts its frequency dividing operation again from the 1st pulse $P_1$ in the next cycle of the time division pulse signal shown in FIG. 27(d). The pulse signals appearing at the output terminals 203h, 203i, 203j, 203k, 203l, 203m and 203n of the first frequency divider 203, and the signals obtained by inverting these signals by respective inverters 221a, 221b, 221c, 221d, 221e, 221 d, 221f, and 221g are applied to data select terminals 208a, 208a', 208b, 208b', 208c, 208c', 208d, 208d', 208e, 208e', 208f, 208f', 208g and 208g' respectively of the first diode matrix 208. Further, the time division pulse signal appearing at the output terminal of the NAND gate 202a in the gate 202 is applied through an inverter 221h to another data select terminal 208h of the first diode matrix 208. The 127 normally closed switches $S_1$, $S_2$, . . . . $S_{127}$ are connected through diodes 222–1, 222–2, . . . . 222–127 to input terminals 208–1, 208–2, . . . . 208–127 of the first diode matrix 208 respectively, and the input terminals 208–1, 208–2, . . . . 208–127 are connected to the expander terminal of respective NAND gates 223–1, 223–2, . . . . 223–127.

Suppose, for example, that the normally closed switches $S_3$, $S_7$ and $S_{125}$ are opened for the purpose of actuating the associated electrical applicances. In this case, the pulse signals corresponding to the specific electrical appliances associated with the switches $S_3$, $S_7$ and $S_{125}$ are applied from the frequency divider 203 to predetermined ones of the data select terminals 208a, 208 *a'*, . . . . 208*g* and 208*g'* of the first diode matrix 208 so that "0" appears at each of the output terminals of the NAND gates 223–3, 223–7 and 223–125 bearing the same suffixes as those of the normally closed switches $S_3$, $S_7$ and $S_{125}$ which are in the open position. Associated inverters 224–3, 224–7 and 224–125 invert "0" into "1" and apply same to a NOR gate 225. The output from the NOR gate 225 is then inverted by an inverter 226 with the result that a signal including pulses $\overline{P_3}$, $\overline{P_7}$ and $\overline{P_{125}}$ of "1" level as shown in FIG. 27(f) appears at the output terminal 208*i* in which these pulses occur at the same positions as those of the 3rd, 7th and 125th pulses counting from the 1st pulse of the time division pulse signal shown in FIG. 27(d). It will be understood that, in response to the opening of some of the normally closed switches $S_1$, $S_2$, . . . . $S_{127}$, the signals indicative of the open position of the switches and the corresponding pulse signals from the frequency divider 203 are applied to the predetermined ones of the data select terminals 208*a*, 208*a'*, . . . . 208*g* and 208*g'* of the first diode matrix 208 and the AND operation is carried out on these signals so that a signal including pulses of "0" level corresponding to the suffixes of the normally closed switches in the open position appears at the output terminal of the inverter 226, and hence at the output terminal 208*i* of the first diode matrix 208. The signal appearing at the output terminal 208*i* of the first diode matrix 208 will hereinafter be referred to as a level signal. The time division pulse signal delivered from the gate 202 is applied to the buffer circuit 209 which is composed of a transistor 209*a* and resistors 209*b*, 209*c* and 209*d* to be finally sent out to the conductor $200L_1$ from the collector of transistor 209*a*. The level signal delivered from the output terminal 208*i* of the first diode matrix 208 is applied to the buffer circuit 210 which is composed of a transistor 210*a* and resistors 210*b*, 210*c*, 210*d* and 210*e* to be finally sent out to the conductor $200L_2$ from the collector of transistor 210*a*.

Figure 28:
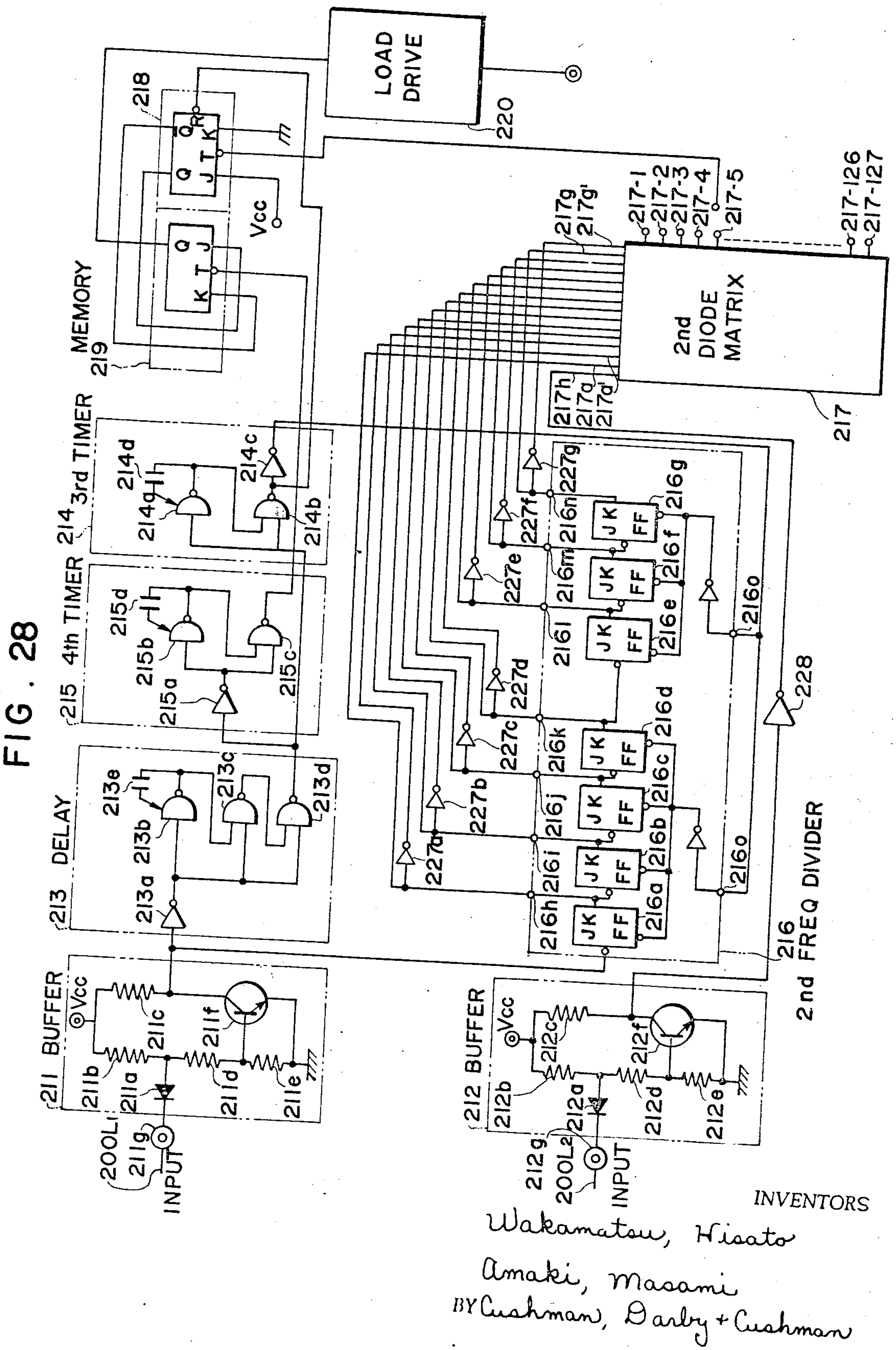
FIG. 28 is an electrical connection diagram showing the structure of a receiver in the system shown in FIGS. 24*a* and 24*b*.
Figure 29:
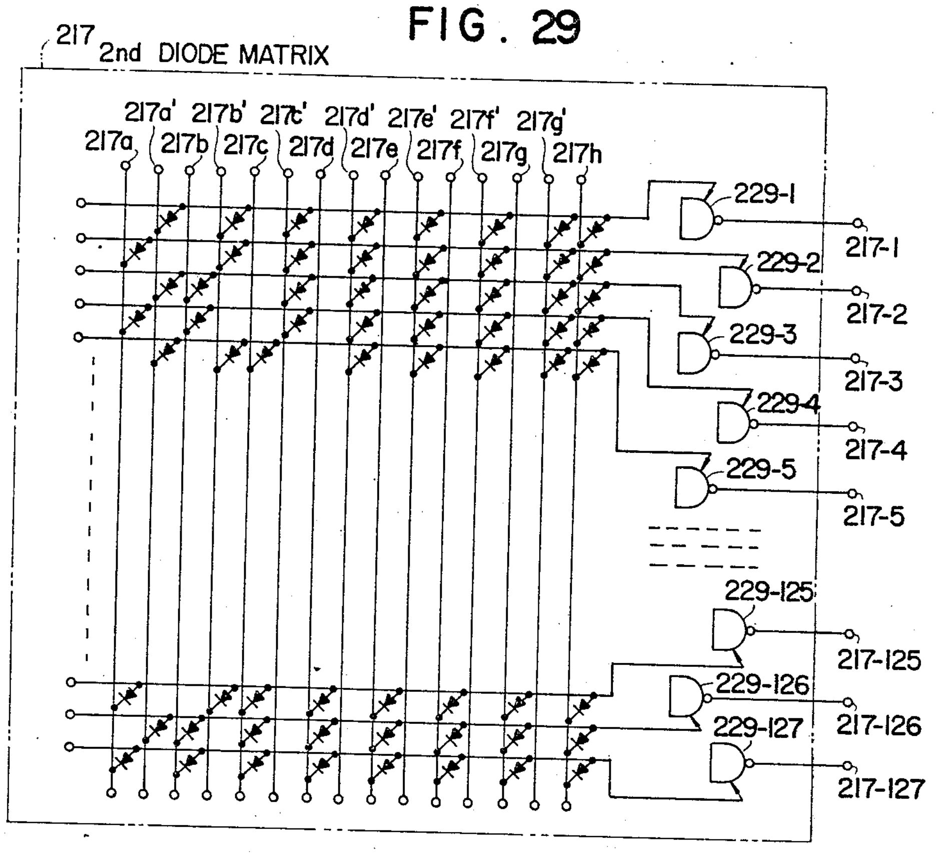
FIG. 29 is an electrical connection diagram showing the structure of a diode matrix in the receiver shown in FIG. 28.
Figure 36:
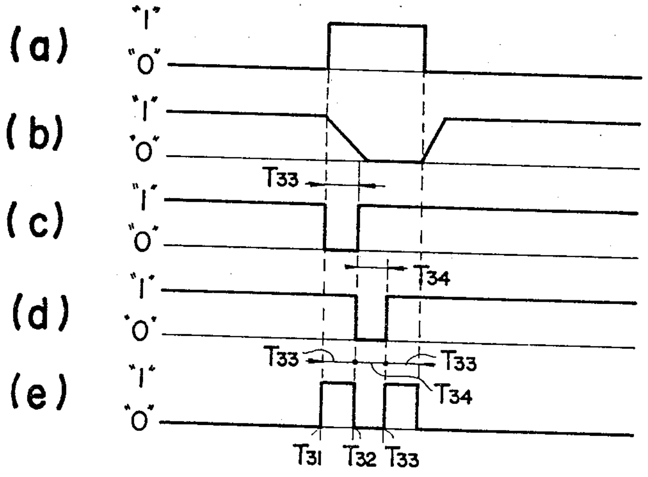
FIGS. 36(a) to 36(e) show voltage waveforms appearing at various parts of the analog-to-digital converters shown in FIG. 35*b*.
Figure 30:
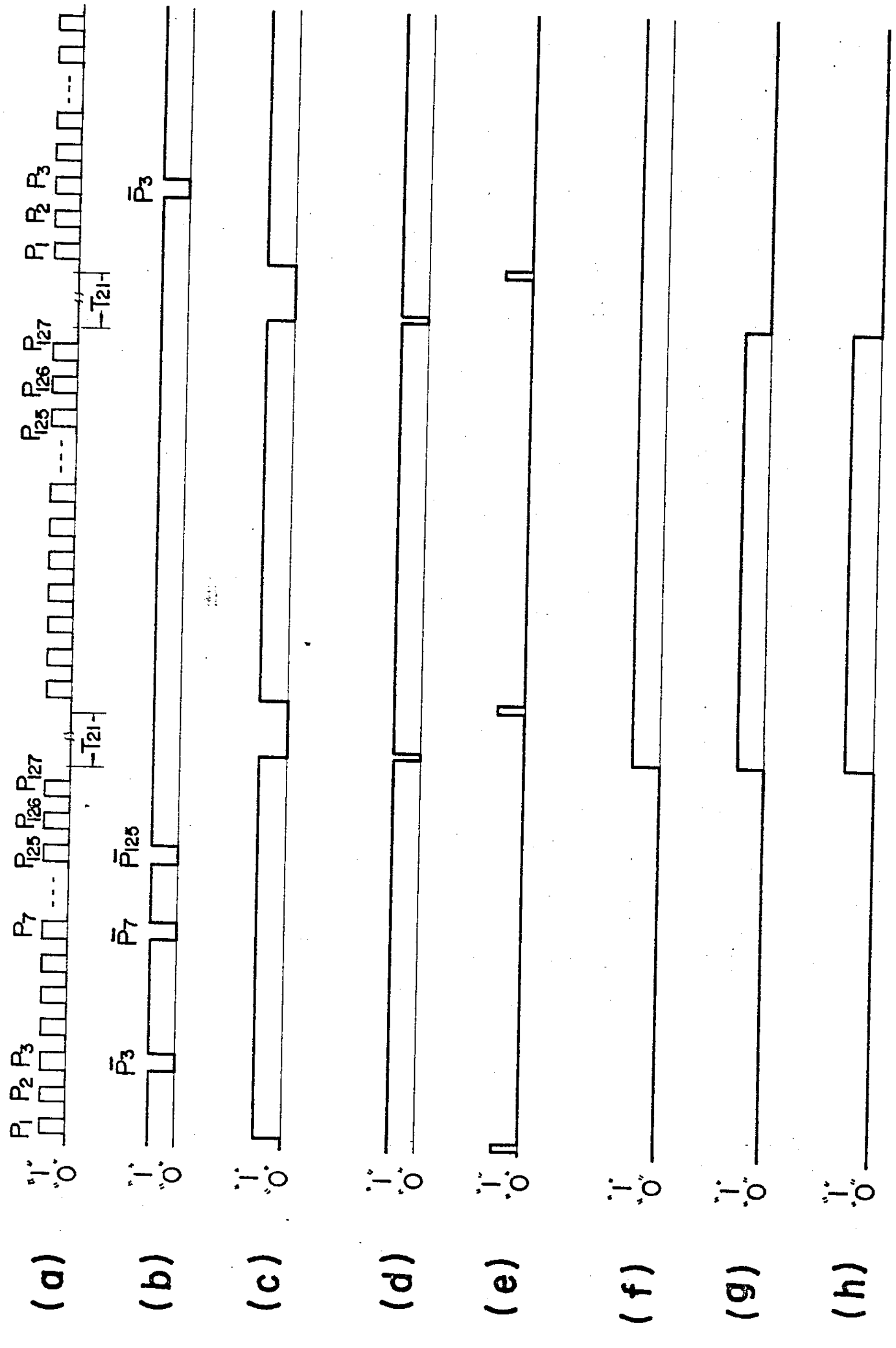
FIGS. 30(a) to 30(h) show voltage waveforms appearing at various parts of the receiver shown in FIG. 28.

Detailed structure and operation of the receiver 200B will next be described with reference to FIGS. 28, 29 and 30. The time division pulse signal and the level signal shown in FIGS. 27(d) and 27(f) are shown again in FIGS. 30(a) and 30(b) respectively. The time division pulse signal delivered from the buffer circuit 209 in the transmitter 200A is applied by way of the conductor $200L_1$ to the input terminal 211*g* of the buffer circuit 211 which is composed of a diode 211*a*, resistors 211*b*, 211*c*, 211*d*, and 211*e*, and a transistor 211*f*. The time division pulse signal derived from the collector of transistor 211f is applied to the delay circuit 213 which is composed of an inverter 213*a*, NAND gates 213*b*, 213*c* and 213*d*, and a capacitor 213*e* (0.0015 $\mu$ F). The output from the NAND gate 213*d* in the delay circuit 213 is a pulse signal as shown in FIG. 30(c) from which it will be seen that a "0" level appears in slightly delayed relation from the falling edge of the pulse $P_{127}$ in the time division pulse signal shown in FIG. 30(a). This pulse signal is applied to the fourth timer 215 which is composed of an inverter 215*a*, NAND gates 215*b* and 215*c*, and a capacitor 215*d* (150 pF). The output from the NAND gate 215*c* in the fourth timer 215 is a pulse signal as shown in FIG. 30(d) from which it will be seen that the signal includes a "0" level of short duration. This pulse signal is applied to the T terminal of the memory 219 described later. The output from the NAND gate 213d in the delay circuit 213 is applied to the third timer 214 which is composed of NAND gates 214*a* and 214*b*, an inverter 214*c* and a capacitor 214*d* (150pF). The output appearing from the inverter 214*c* in response to the application of the output from the NAND gate 213*d* to the NAND gates 214*a* and 214*b* is a pulse signal as shown in FIG. 30(e) from which it will be seen that the signal includes a pulse of short duration. This pulse signal is used to operate the second frequency divider 216 in synchronism with the transmitter 200A, and the signal appearing at the output of the NAND gate 214*b* whose phase is opposite to that of the signal shown in FIG. 30(e) is used to reset the memory 218 described later. The second frequency divider 216 is of the binary type using seven J-K flip-flops 216*a*, 216*b*, 216*c*, 216*d*, 216*e*, 216*f* and 216*g*. In response to the application of the time division pulse signal through the buffer circuit 211 to the second frequency divider 216, pulse signals whose frequencies are one-half, one-fourth, one-eighth, one-sixteenth, one thirty-second, one sixty-fourth and one one hundred and twenty-eighth respectively of the input frequency appear at output terminals 216*h*, 216*i*, 216*j*, 216*k*, 216*l*, 216*m* and 216*n* of the frequency divider 216. The pulse signals appearing at the output terminals 216*h*, 216*i*, 216*j*, 216*l*, 216*m* and 216*n* of the second frequency divider 216, and the signals obtained by inverting these pulse signals by respective inverters 227*a*, 227*b*, 227*c*, 227*d*, 227*e*, 227*f* and 227*g* are applied to data select terminals 217*a*, 217*a'*, 217*b*, 217*b'*, 217*c*, 217*c'*, 217*d*, 217*d'*, 217*e*, 217*e'*, 217*f*, 217*f'*, 217*g* and 217*g'* of the second diode matrix 217 respectively. On the other hand, the level signal is applied from the transmitter 200A through the buffer circuit 210 and the conductor $200L_2$ to the input terminal 212*g* of the buffer circuit 212 which is composed of a diode 212*a*, resistors 212*b*, 213*c*, 212*d* and 212*e* and a transistor 212*f*. The level signal derived from the collector of transistor 212*f* as the output from the buffer circuit 212 is inverted by the inverter 228 to be applied to another data select terminal 217*h* of the second diode matrix 217.

Suppose, for example, that the normally closed switches $S_3$, $S_7$ and $S_{125}$ are opened and a pulse signal including pulse $\overline{P_3}$, $\overline{P_7}$ and $\overline{P_{125}}$ as shown in FIG. 30(b) is applied to the input terminal 2129 of the buffer circuit 212. This pulse signal is applied from the buffer circuit 212 to the data select terminal 217*h* of the second diode matrix 217. In the meantime, the pulse signals corresponding to the pulses $\overline{P_3}$, $\overline{P_7}$ and $\overline{P_{125}}$ are delivered from the frequency divider 216 to be applied to predetermined ones of the data select terminals 217*a*, 217*a'*, . . . . 217*g* and 217*g'* of the second diode matrix 217. The signal applied to the data select terminal 217h and the signals applied to the predetermined ones of the data select terminals 217a, 217a', . . . . 217g and 217g' are subject to the AND operation, and "0" appears in order from the output terminals of NAND gates 229–3, 229–7 and 229–125 having the same suffixes as the suffixes of the pulses $\overline{P_3}$, $\overline{P_7}$ and $\overline{P_{125}}$ in the level signal. The "0" signal appearing at the output of, for example, the NAND gate 229–3, hence the output terminal 217–3 of the second diode matrix 217 is applied to the T terminal of the memory 218 consisting of a J-K flip-flop with the result that the output signals appearing at the output terminals Q and $\overline{Q}$ are inverted and "1" and "0" appear now at the respective output terminals Q and $\overline{Q}$. The signals appearing at the output terminals Q and $\overline{Q}$ are applied to the J and K terminals respectively of the memory 219 consisting of a J-K flip-flop so that "1" and "0" appear at the J and K terminals respectively of the memory 219. In response to the application of the output from the NAND gate 215c in the fourth timer 215 to the T terminal of the memory 219, "1" appears at the output terminal Q of the memory 219. The output terminal of the NAND gate 214b in the third timer 214 is connected to the reset terminal R of the memory 218. Thus, in response to the application of the resetting signal to the reset terminal R of the memory 218, the memory 218 is reset, and "0" and "1" appear now at the output terminals Q and $\overline{Q}$ respectively of the memory 218. As soon as the memory 218 is reset, the output from the third timer 214 is applied to the reset terminal 216o of the second frequency divider 216 to reset same. In the next cycle, "0" appears at the output terminal 217–3 of the second diode matrix 217 again and is applied to the T terminal of the memory 218 with the result that "1" and "0" appear at the output terminals Q and $\overline{Q}$ respectively of the memory 218. Thus, a continuous output of "1" level can be derived from the output terminal Q of the memory 219. This continuous signal is amplified by the amplifier in the load drive circuit 220 to energize the electrical appliance associated with the normally closed switch $S_3$. When the signal having appeared at the output terminal 217–3 of the second diode matrix 217 disappears, "0" and "1" appear at the respective output terminals Q and $\overline{Q}$ of the memory 218 again. In response to the application of the signal from the fourth timer 215 to the T terminal of the memory 219 in such a state of the memory 218, "0" appears now at the output terminal Q of the memory 219 and no signal is supplied to the load drive circuit 220. FIGS. 30(f), 30(g) and 30(h) show the waveforms of the outputs appearing at the output terminal Q of the memory 219 when the level signal shown in FIG. 30(b), in which "0" levels appear at the positions of the 3rd, 7th and 125th pulses in the time division pulse signal, is applied to the data select terminal 217h of the second diode matrix 217. It is to be understood that each of the output terminals 217–1, 217–2, . . . . 217–127 of the second diode matrix 217 is associated with a pair of memories (not shown) and a load drive circuit (not shown) which are the same in structure as the memories 218 and 219 and the load drive circuit 220 shown in FIG. 24(b) and operate in the same way as those illustrated.

Figure 31A:
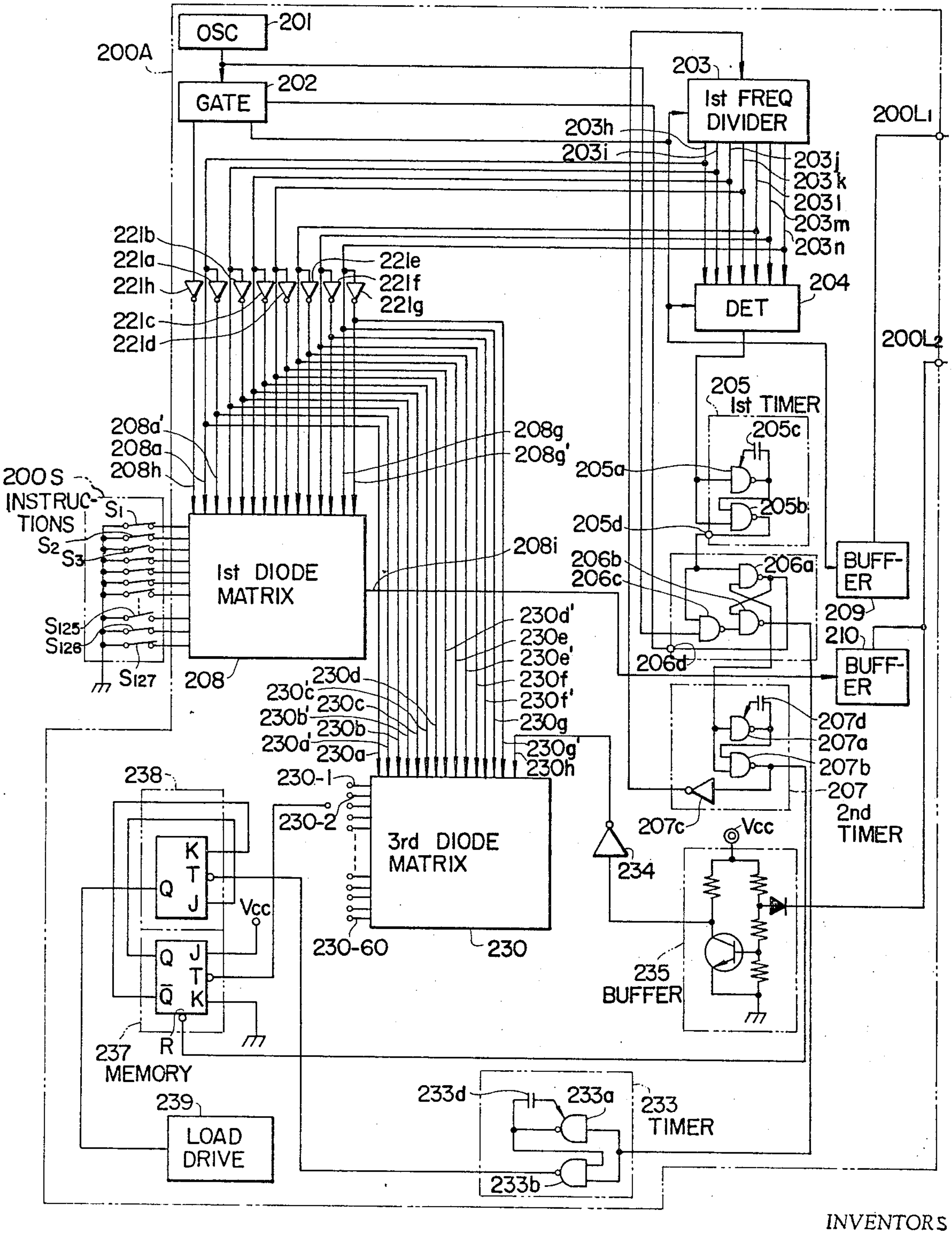
FIGS. 31*a* and 31*b* are electrical connection diagrams illustrating the manner of signal transmission from the receiver to the transmitter in the system shown in FIGS. 24*a* and 24*b*.
Figure 31B:
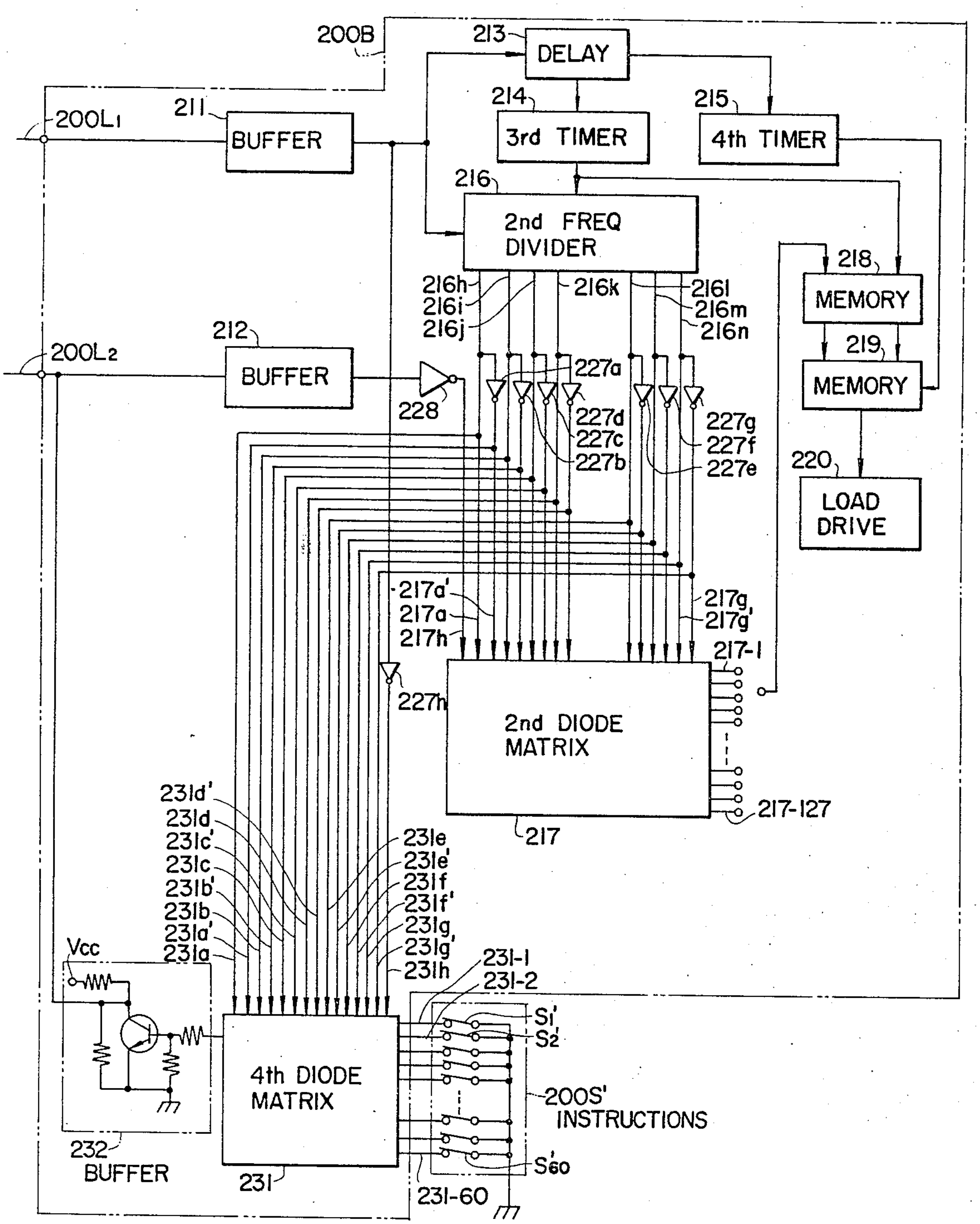

It is also possible to transmit signals from the receiver 200B to the transmitter 200A by effectively utilizing idle and available channesl in the time division pulse signal. This operation will be described with reference to FIGS. 31a and 31b. Referring to FIGS. 31a and 31b in which parts of the circuits illustrated in FIGS. 25 and 28 are shown by blocks and additional parts are shown in an electrical connection diagram, a third diode matrix 230 is disposed in the transmitter 200A separately from the first diode matrix 208. The third diode matrix 230 is substantially similar in structure and operation to the second diode matrix 217 in the receiver 200B shown in FIG. 29 and any detailed description as to the sturcture thereof is unnecessary. The thitd diode matrix 230 is provided with data select terminals 230a, 230a', . . . . 230g, 230g' and 230h and output terminals 230–1, 230–2, . . . . 230–60 which correspond to the data select terminals 217a, 217a', . . . . 217 g, 217g' and 217h and the output terminals 217–1, 217–2, . . . . 217–60 of the second diode matrix 217 respectively. The pulse signals appearing at the output terminals 203h, 203i, . . . . 203n of the first frequency divider 203 and the signals obtained by inverting these pulse signals by the respective inverters 221a, 221b, . . . . 221g are applied to the data select terminals 230a, 230a', . . . . 230g and 230g' of the third diode matrix 230 respectively. A fourth diode matrix 231 is disposed in the receiver 200B separately from the second diode matrix 217. The fourth diode matrix 231 is substantially similar in structure and operation to the first diode matrix 208 in the transmitter 200A shown in FIG. 26 and any detailed description as to the structure thereof is unnecessary. The number of channels is sixty if the number of idle and available channels in the first diode matrix 208 is, for example, 40. Switches $S_1'$, $S_2'$, . . . . $S_{60}'$ are connected to respective input terminals 231–1, 231–2, . . . . 231–60 of the fourth diode matrix 231 for driving associated loads. The fourth diode matrix 231 is provided with data select terminals 231a, 231a', . . . . 231g, 231g' and 231h and an output terminal 231i corresponding to the data select terminals 208a, 208a', . . . . 208g, 208g' and 208h and the output terminal 208i of the first diode matrix 208 respectively. The pulse signals appearing at the output terminals 216h, 216i, . . . . 216n of the second frequency divider 216 and the signals obtained by inverting these pulse signals by the respective inverters 227a, 227b, . . . . 227g are applied to the data select terminals 231a, 231a', . . . . 231g and 231g' of the fourth diode matrix 231 respectively. The data select terminal 231h of the fourth diode matrix 231 is connected through an inverter 227h to the collector of transistor 211f in the buffer circuit 211, while the output terminal 231i is connected through a buffer circuit 232 to the conductor $200L_2$. The buffer circuit 232 is similar in structure to the buffer circuit 210 in the transmitter 200A. The data select terminal 230h of the third diode matrix 230 is connected to the conductor $200L_2$ through an inverter 234 and a buffer circuit 235. The buffer circuit 235 is similar in structure to the buffer circuit 212 in the receiver 200B. Memories 237 and 238 each consisting of a J-K flip-flop are provided in the transmitter 200A and correspond to the memories 218 and 219 in the receiver 200B. The reset terminal R of the memory 237 is connected to the output terminal of the NAND gate 207b in the second timer 207, and the T terminal of the other memory 238 is connected through a timer 233 to the output terminal of the NAND gate 206b in the memory 206. The timer 233 is composed of NAND gates 233a and 233b, and a capacitor 233d. A load drive circuit 239 is connected to the output terminal Q of the memory 238. While only one pair of memories 237 and 238 and only one load drive circuit 239 are shown in FIG.

31*a*, it is to be understood that a pair of such memories and such a load drive circuit are provided for each of the output terminals 230–1, 230–2, . . . . 230–60 of the third diode matrix 230.

The operation of the system for transmitting the signals from the receiver 200B to the transmitter 200A in response to the opening of some of the normally closed switches $S_1'$, $S_2'$, . . . . $S_{60}'$ will now be described. The operating principle is similar to that described previously in regard to the transmission of the signals from the transmitter 200A to the receiver 200B. Suppose that some of the normally closed switches $S_1'$, $S_2'$, . . . . $S_{60}'$ are opened to deliver the signals for the actuation of the associated electrical appliances. These signals are applied to the fourth diode matrix 231 to which the pulse signals corresponding to the above signals are also applied from the second frequency divider 216 to predetermined ones of the data select terminals 231*a*, 231*a'*, . . . . 231*g* and 231*g'*. The AND operation is carried out in the fourth diode matrix 231 so that the level signal appearing at the output terminal 231*i* includes "0" levels at the same positions as the suffixes of the specific normally closed switches in the open position counting from the 1st pulse of the time division pulse signal appearing at the output of the buffer circuit 211. The level signal appearing at the output terminal 231*i* of the fourth diode matrix 231 is applied to the data select terminal 230*h* of the third diode matrix 230 through the buffer circuit 232, conductor 200$L_2$, buffer circuit 235 and inverter 234. The pulse signals corresponding to the selected ones of the normally closed switches $S_1'$, $S_2'$, . . . . $S_{60}'$ are applied to predetermined ones of the data select terminals 230*a*, 230*a'*, . . . . 230*g* and 230*g'* of the third diode matrix 230 from the frequency divider 203. Therefore, the AND operation is carried out on the signal applied to the data select terminal 230*h* and the corresponding pulse signals applied to the predetermined ones of the data select terminals 230*a*, 230*a'*, . . . . 230*g* and 230*g'*, with the result that "0" appears in order at the corresponding ones of the output terminals 230–1, 230–2, . . . . 230–60. In response to the appearance of "0," the memories 237 and 238 and the load drive circuits 239 are actuated to drive the associated loads in the same manner as when the level signal is transmitted from the transmitter 200A to the receiver 200B. In this manner, not only the signal transmission from the transmitter 200A to the receiver 200B but also the signal transmission from the receiver 200B to the transmitter 200A can be carried out.

Figure 32A:
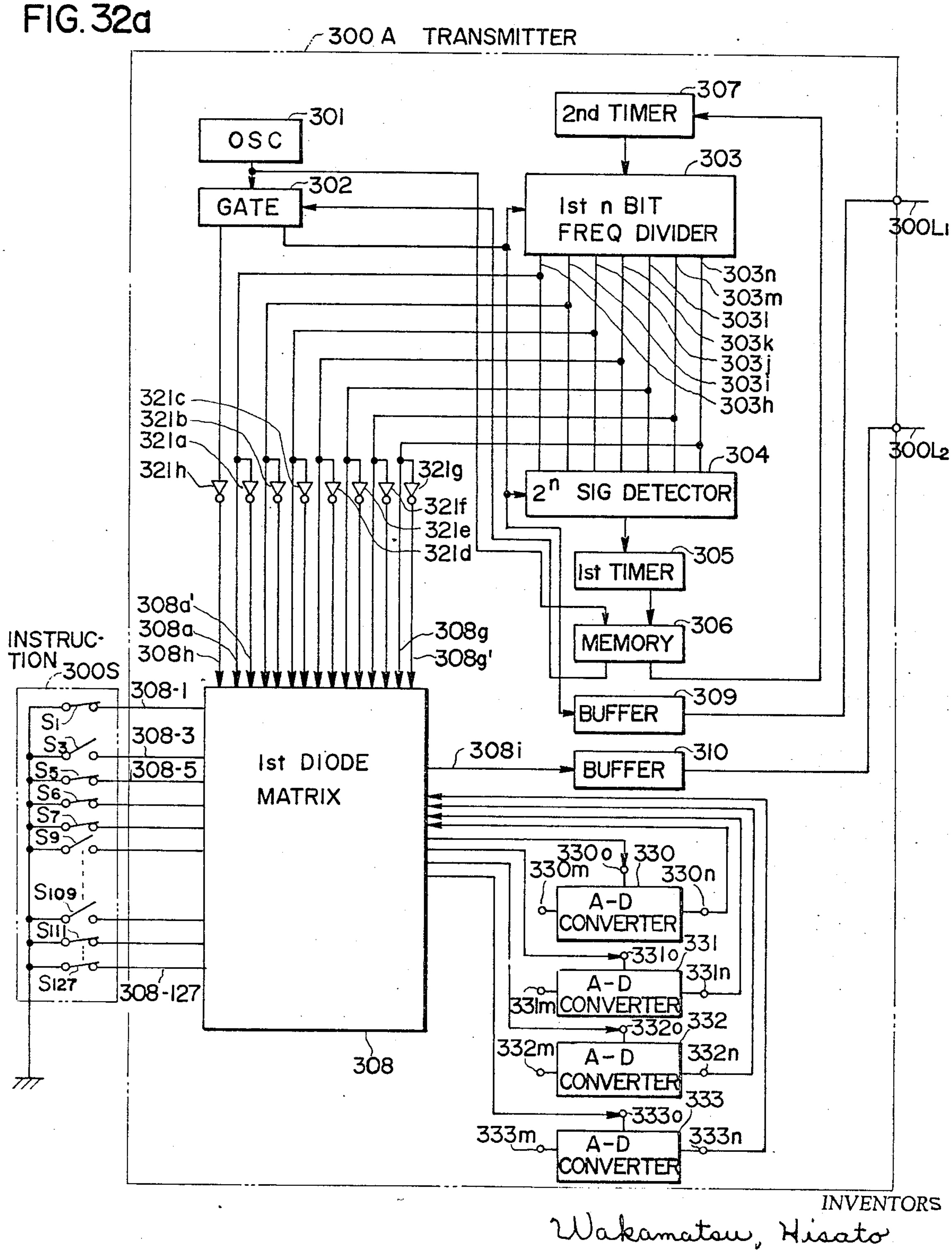
FIGS. 32*a* and 32*b* are block diagrams showing the general structure of a fourth embodiment of the present invention.
Figure 32B:
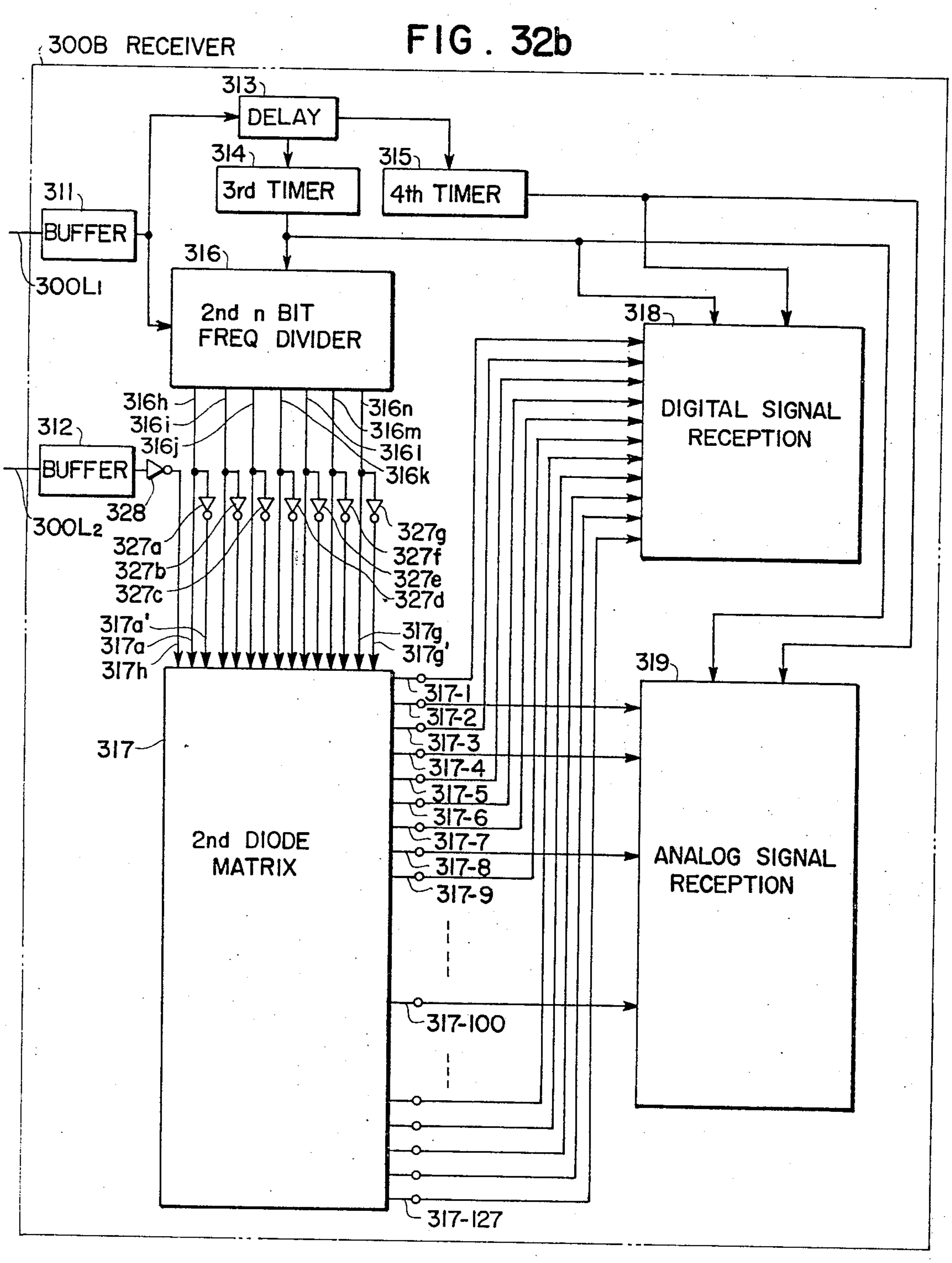

A fourth embodiment of the present invention will now be described with reference to FIGS. 32*a* to 41. FIGS. 32*a* and 32*b* are a block diagram showing the general structure of the fourth embodiment. Referring to FIG. 32*a*, an instruction signal generator 300S issues instructions for actuating various electrical appliances mounted on a vehicle and is shown herein as including 123 normally closed switches $S_1$, $S_3$, $S_5$, $S_6$, $S_7$, $S_9$, . . . . $S_{109}$, $S_{111}$, . . . . $S_{127}$ each associated with an electrical appliance. A transmitter 300A includes an oscillator 301 which generates a pulse signal having a constant frequency of, for example, 100 kHz. A gate 302 makes a gate action against the pulse signal generated by the oscillator 301. A first *n*-bit frequency divider 303 counts the number of pulses passed through the gate 302 thereby dividing the frequency. In the illustrated example, the frequency divider 303 is a 7-bit frequency divider. A $2^n$ signal detector 304 detects a $2^n$-th pulse, or the 128th pulse in the illustrated example, counting from the first pulse of the pulse signal generated by the oscillator 301. In response to the detection of the rising edge of the 128th pulse by the $2^n$ signal detector 304, a first timer 305 produces a pulse having a duration $T_{31}$ which may, for example, be ten times one cycle of the oscillation frequency of the oscillator 301. A memory 306 consisting of a flip-flop acts to close the gate 302 for a period of time which is equal to the duration $T_{31}$ of the pulse produced by the timer 305. A second timer 307 is actuated in response to the falling edge of the pulse of duration $T_{31}$ produced by the timer 305 to produce a pulse having a duration $T_{32}$ which is less than one cycle of the oscillation frequency of the oscillator 301 so that the first n-bit frequency divider 303 is reset by this pulse signal and starts its frequency dividing operation again when the gate 302 is opened next. Therefore, a time division pulse signal whose one cycle includes 127 pulses at a high voltage level or "1" and one pulse of duration $T_{31}$ at a low voltage level or "0" appears at the output terminal of the gate 302. The first *n*-bit frequency divider 303 delivers seven outputs, namely, seven signals obtained by dividing the oscillation frequency of the oscillator 301 to one-half, one-fourth, one-eighth one-sixteenth, one thirty-second, one sixty-fourth and one one hundred and twenty-eighth respectively. These signals are applied to a first diode matrix 308 to which the normally-closed switches $S_1$, $S_3$, $S_5$, $S_6$, $S_7$, $S_9$, . . . . $S_{109}$, $S_{111}$, . . . . $S_{127}$ in the instruction signal generator 300S are connected to apply instructions when they are opened so that the first diode matrix 308 carries out the AND operation on these signals. The pulse having the same suffix as the suffix of the opened one of the normally closed switches counting from the first one of the 127 pulses passed through the gate 302 is derived from the first diode matrix 308 as its output when the specific normally closed switch is opened for the purpose of actuating the associated electrical appliance. Buffer circuits 309, 310, 311 and 312 are provided to protect the circuits described above and circuits described later which are integrated so that these circuits may not be adversely affected by noises developed by other equipment. A plurality of analog-to-digital converters (A-D converters) 330, 331, 332 and 333 are connected to the first diode matrix 308 so that, in response to the application of a channel signal assigned for the transmission of an analog signal selected by the first diode matrix 308, the analog signal input can be converted into a digital signal within the channel width. The elements 301 to 310, 330, 331, 332 and 333 constitute the transmitter 300A.

Referring to FIG. 32b, a receiver 300B includes a delay circuit 313 which acts to slightly shorten the period of time $T_{31}$ following the 127 pulses above described. A third timer 314 acts to produce a pulse which has a duration shorter than one cycle of the oscillation frequency of the oscillator 301 and is in synchronism with the falling edge of the output from the delay circuit 313 so that a second frequency divider 316 can be operated in synchronism with the transmitter 300A. A fourth timer 315 produces a pulse of short duration during the period of time $T_{31}$ so as to check as to whether the normally closed switches in the instruction signal generator 300S are opened or not during the preceding one cycle (consisting of the 127 pulses plus the period of time $T_{31}$) of the time division pulse signal. The second *n*-bit frequency divider 316 divides the frequency of the pulse signal applied from the transmitter 300A by way of the buffer circuit 309, a conductor 300L$_1$ and the buffer circuit 311 to produce pulse signals whose frequencies are one-half, one-fourth, one-eighth, one-sixteenth, one thirty-second one sixty-fourth and one one hundred and twenty-eighth respectively of the original frequency. In the illustrated example, the frequency divider 316 is a 7-bit frequency divider. The output from the first diode matrix 308 in the transmitter 300A is applied by way of the buffer circuit 310, a conductor 300L$_2$, the buffer circuit 312 and an inverter 328 to a second diode matrix 317 to which the outputs from the second *n*-bit frequency divider 316 are also applied so that the second diode matrix 317 carries out the AND operation on these inputs. The pulse having the same suffix as the suffix of the opened one of the normally-closed switches $S_1$, $S_3$, $S_5$, $S_6$, $S_7$, $S_9$, . . . . $S_{109}$, $S_{111}$ . . . . $S_{127}$ and the digital signal obtained by the A-D conversion in the transmitter 300A are detected by the second diode matrix 317. A digital signal receiving circuit 318 drives a load or loads associated with the opened one or ones of the normally closed switches $S_1$, $S_3$, $S_5$, $S_6$, $S_7$, $S_9$, . . . . $S_{109}$ , $S_{111}$, . . . . $S_{127}$ in response to the application of the signal or signals selected by the second diode matrix 317. An analog signal receiving circuit 319 drives a load or loads in response to the application of the A-D converted digital signal or signals selected by the second diode matrix 317. The elements 311 to 319 constitute the receiver 300B.

Figure 33:
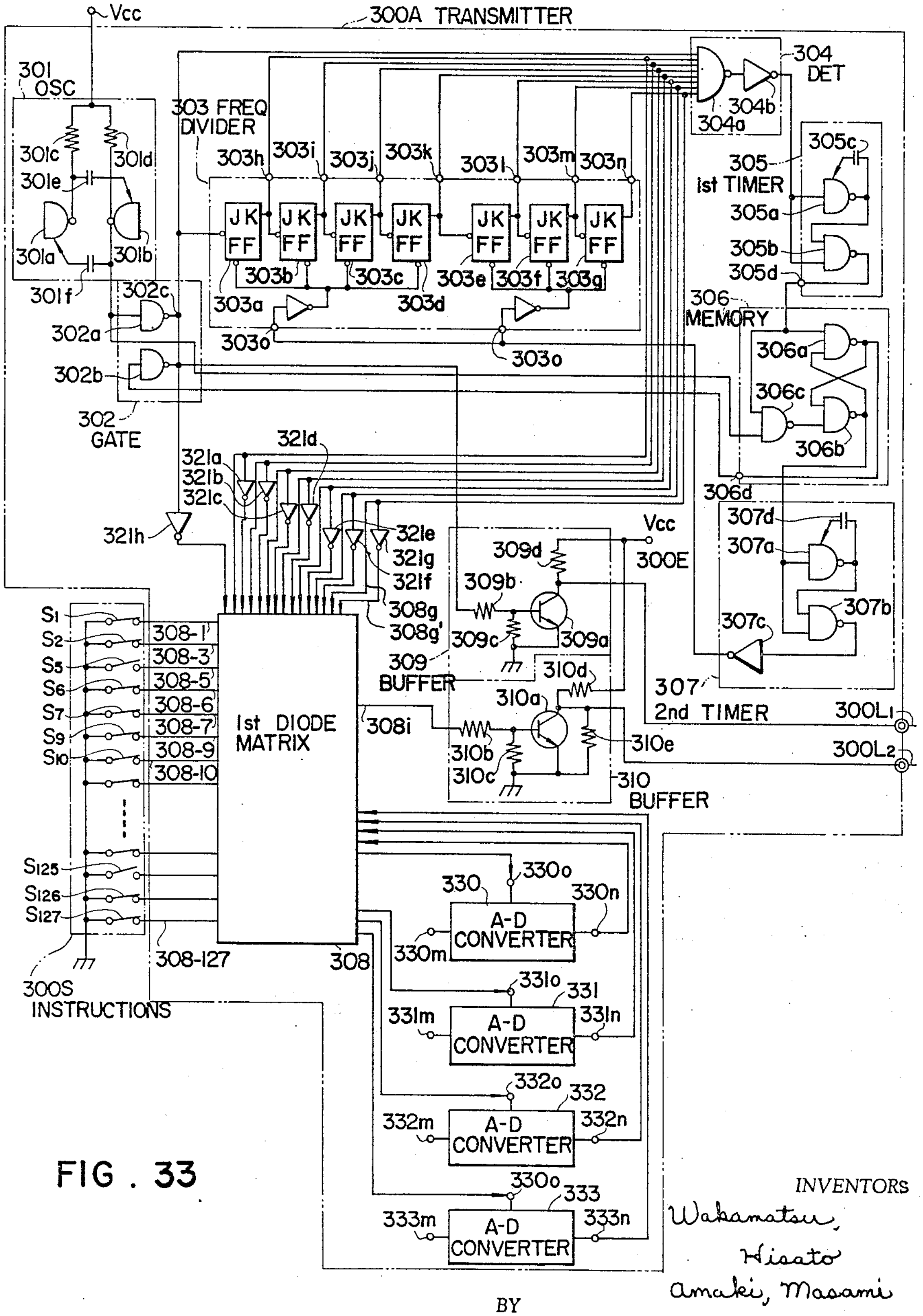
FIG. 33 is an electrical connection diagram showing the structure of a transmitter in the system shown in FIGS. 32*a* and 32*b*.
Figure 34:
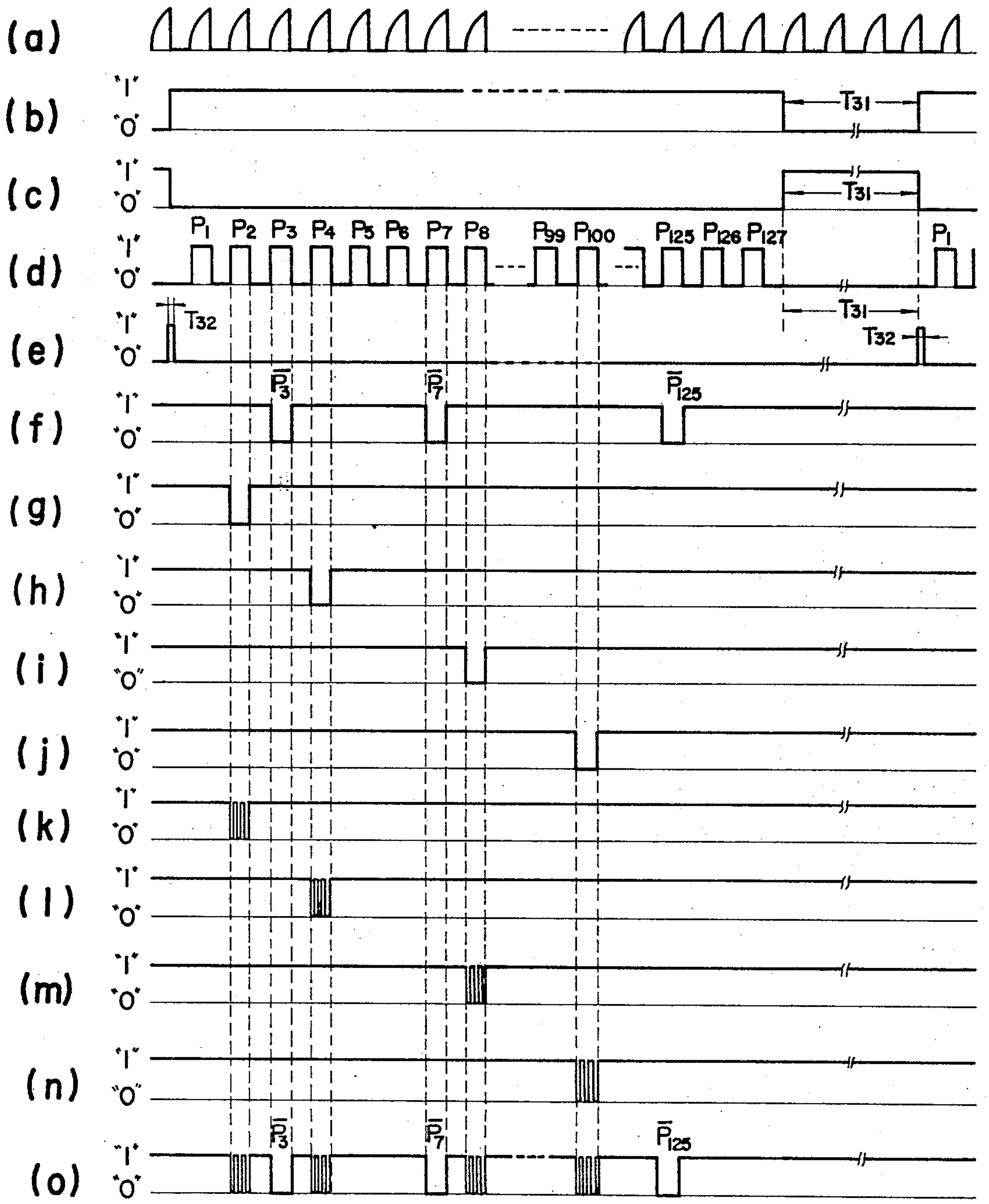
FIGS. 34(a) to 34(o) show voltage waveforms appearing at various parts of the transmitter shown in FIG. 33.

Detailed structure and operation of the system shown in FIGS. 32*a* and 32*b* will be described with reference to FIGS. 33 to 41. Referring first to FIG. 33 showing the structure of the instruction signal generator 300S and transmitter 300A, the oscillator 301 is in the form of an astable multivibrator which is composed of NAND gates 301*a* and 301*b*, resistors 301*c* and 301*d* (1 k Ω), and capacitor 301*e* and 301*f* (1,000 pF). The oscillator 301 generates a pulse signal of constant frequency having a waveform as shown in FIG. 34(a) and its oscillation frequency is, for example, 100 kH$_z$. The gate 302 consists of a pair of NAND gates 302*a* and 302*b*. When the gate 302 is open, it shapes the waveform of the output pulse signal of the oscillator 301 to apply same to the first 7-bit frequency divider 303. The frequency divider 303 is of the binary type using seven J-K flip-flops 303*a*, 303*b*, 303*c*, 303*d*, 303*e*, 303*f* and 303*g*, and pulse signals whose frequencies are one-half, one-fourth, one-eighth, one-sixteenth, one thirty-second, one sixty-fourth and one one hundred and twenty-eighth of the input pulse signal appear at respective output terminals 303*h*, 303*i*, 303*j* 303*k*, 303*l*, 303*m* and 303*n*. These pulse signals and the time division pulse signal from the gate 302 are applied to the $2^n$ signal detector 304 which is composed of a NAND gate 304*a* and an inverter 304*b*. The output from the $2^n$ signal detector 304 is applied to the first timer 305 which is composed of NAND gates 305*a* and 305*b* and a capacitor 305*c* (0.001 μF.) In response to the application of the output from the $2^n$ signal detector 304 to the NAND gates 305*a* and 305*b*, a pulse signal having a waveform as shown in FIG. 34(b) appears at the output terminal 305*d* of the first timer 305. In the pulse signal shown in FIG. 34(b), a "0" level persists over a period of time $T_{31}$ after the $2^n$ signal detector 304 has detected the rising edge of the 128th pulse of the pulse output from the oscillator 301 and "0" has been delivered therefrom. This pulse signal is applied to the memory 306 which is composed of NAND gates 306*a*, 306*b* and 306*c* constituting an R-S flip-flop. In response to the application of the pulse signal to the NAND gates 306*a* and 306*c*, a signal in which a "1" level persists over the period of time $T_{31}$ as seen in FIG. 34(c) appears at the output terminal 306*d* of the NAND gate 306*a*. In response to the application of "1" thus appearing to the NAND gate 302*b* in the gate 302, "0" appears from the NAND gate 302*b* and thus the application of the pulse signal from the oscillator 301 to the first frequency divider 303 is interrupted during this period of time as seen in FIG. 34(d). It will thus be seen that one cycle of the time division pulse signal appearing at the output terminal 302*c* of the gate 302 includes 127 pulses $P_1$, $P_2$, . . . . $P_{127}$ and is spaced apart by the period of time $T_{31}$ from the next cycle. The pulses $P_1$, $P_2$, . . . . $P_{127}$ in the time division signal are used to control respective loads. For example, the pulses $P_1$, $P_3$, $P_5$ to $P_7$, $P_9$ to $P_{109}$ and $P_{111}$ to $P_{127}$ corresponding to the normally closed switches $S_1$, $S_3$, $S_5$ to $S_7$, $S_9$ to $S_{109}$ and $S_{111}$ to $S_{127}$ respectively are assigned to loads including lamps and motors which are controlled by digital signals delivered in response to the opening of these normally closed switches, while the pulses $P_2$, $P_4$, $P_8$ and $P_{100}$ are assigned to loads including a speedmeter and oil level gauge which are controlled by analog signals. The width of the channel allotted to each load is equal to the width of each pulse in the pulse signal. In the present embodiment, the channel width is 0.038 milliseconds.

Figure 35A:
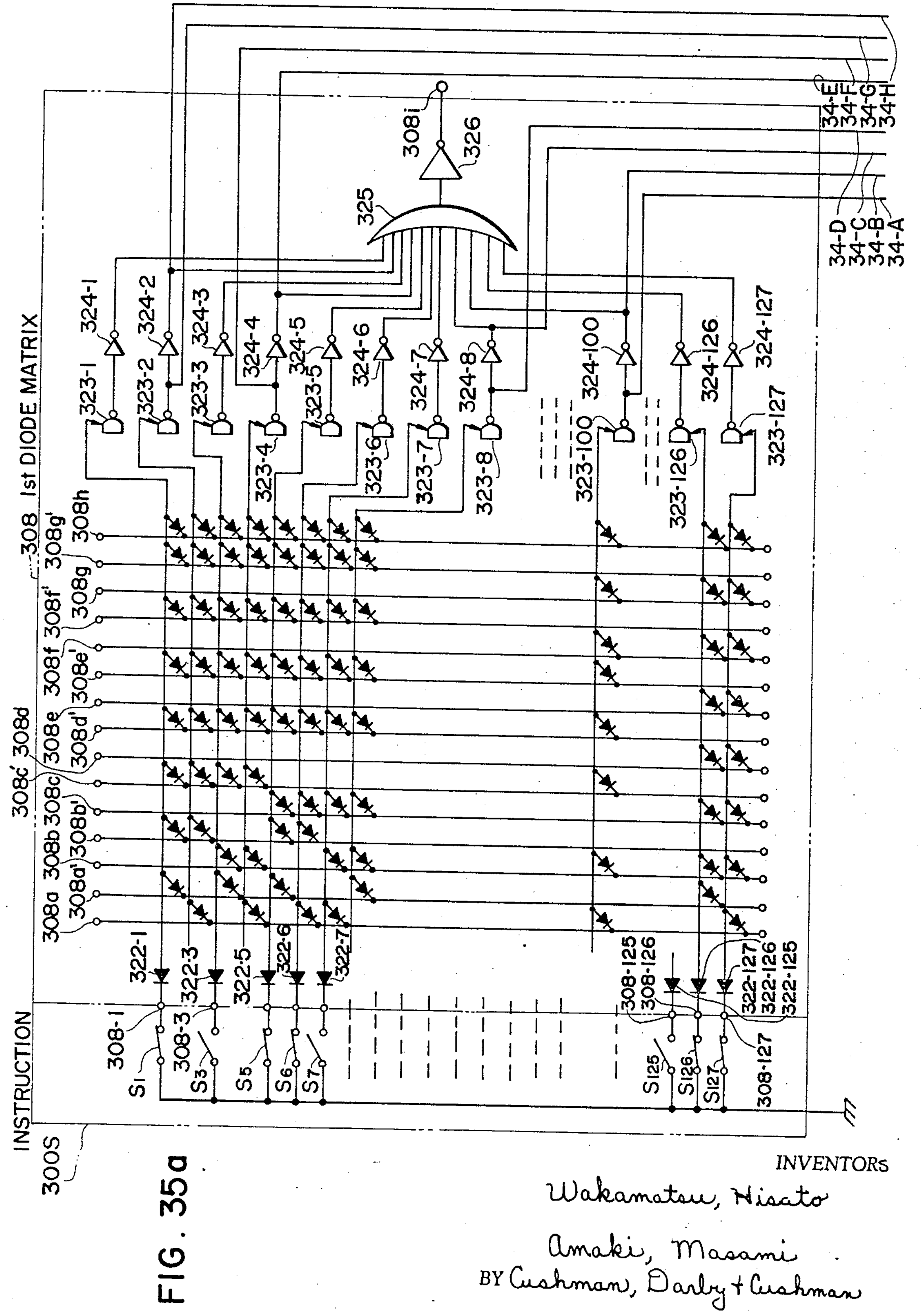
FIGS. 35*a* and 35*b* are electrical connection diagrams showing the structure of a diode matrix and analog-to-digital converters in the transmitter shown in FIG. 33.
Figure 35B:
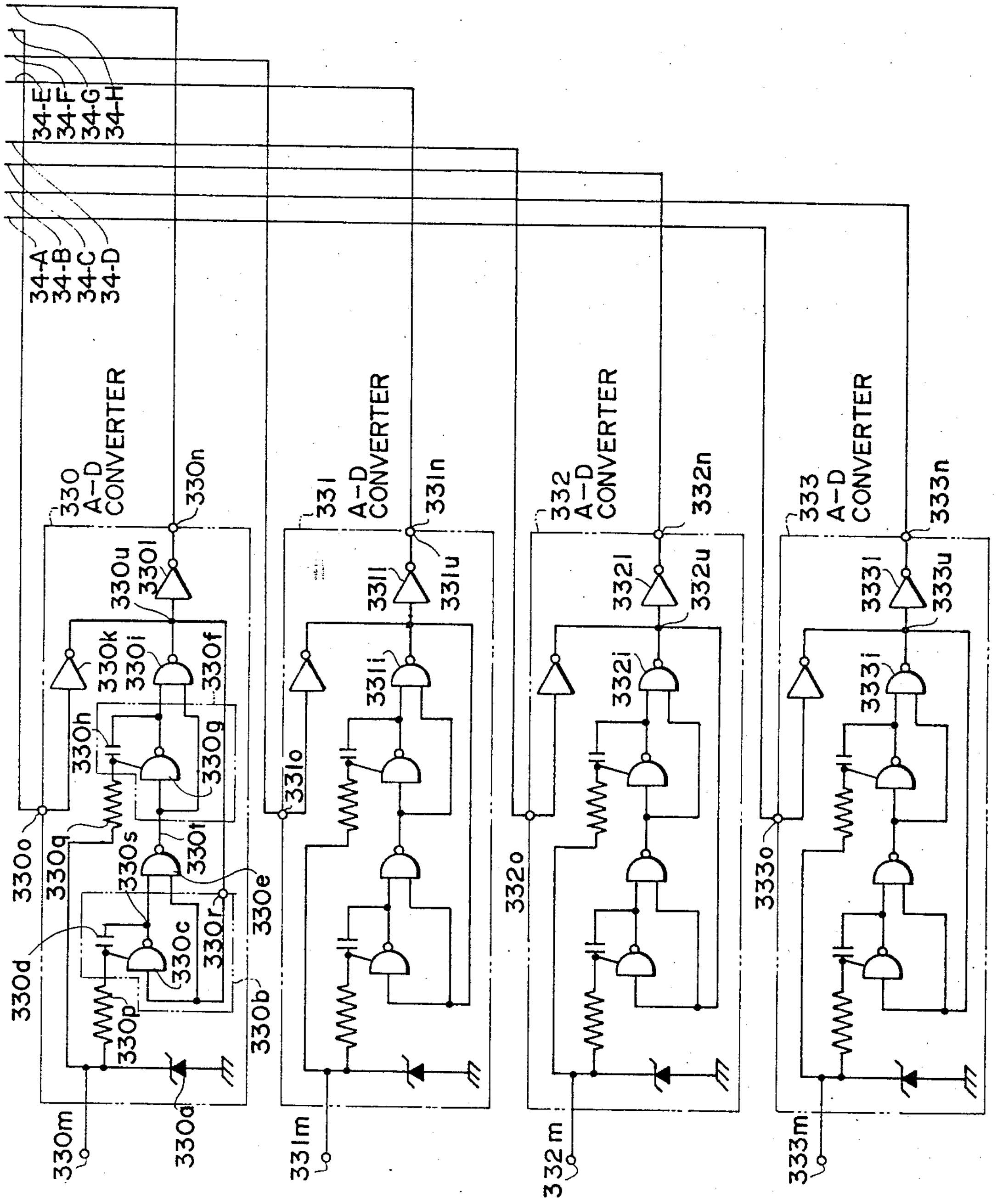

The output from the NAND gate 306*b* in the memory 306 is applied to the second timer 307 which is composed of NAND gates 307*a* and 307*b*, an inverter 307*c* and a capacitor 307*d* (150 pF). In response to the application of the output from the NAND gate 306*b*, the second timer 307, hence the inverter 307*c* therein delivers a pulse of very short duration $T_{32}$ as seen in FIG. 34(e), and this pulse is applied to the reset terminal 303*o* of the first frequency divider 303 to reset the frequency divider 303. The first frequency divider 303 starts its frequency dividing operation again from the 1st pulse $P_1$ in the next cycle of the time division pulse signal shown in FIG. 34(d). The pulse signals appearing at the output terminals 303*h*, 303*i*, 303*j*, 303*k*, 303*l*, 303*m* and 303*n* of the first frequency divider 303, and the signals obtained by inverting these signals by respective inverters 321*a*, 321*b*, 321*c*, 321*d*, 321*e*, 321*f* and 321*g* are applied to data select terminals 308*a*, 308*a'*, 308*b*, 308*b'*, 308*c*, 308 *c'*, 308*d*, 308*d'*, 308*e*, 308*e'*, 308*f*, 308*f'*, and 308*g* and 308*g'* respectively of the first diode matrix 308. Detailed structure of the first diode matrix 308 and A-D converters 330, 331, 332 and 333 is shown in FIGS. 35*a* and 35*b*. Further, the time division pulse signal appearing at the output terminal of the NAND gate 302a in the gate 302 is applied through an inverter 321h to another data select terminal 308*h* of the first diode matrix 308. The 123 normally-closed switches $S_1$, $S_3$, $S_5$, $S_6$, $S_7$, $S_9$, . . . . $S_{109}$, $S_{111}$. . . . $S_{127}$ are connected through diodes 322–1, 322–3, 322–5, 322–6, 322–7, 322–9, . . . . 322–109, 322–111, . . . . 322–127 to input terminals 308–1, 308–3, 308–5, 308–6, 308–7, 308–9, . . . . 308–109, 308–111, . . . . 308–127 of the first diode matrix 308 respectively, and these input terminals 308–1, 308–3, . . . . 308–127 are connected to the expander terminal of respective NAND gates 323–1, 323–3, . . . . 323–127 having the same suffixes as those of the input terminals.

Suppose, for example, that the normally closed switches $S_3$, $S_7$ and $S_{125}$ are opened for the purpose of actuating the associated electrical appliances. In this case, the pulse signals corresponding to the specific electrical appliances associated with the normally closed switches $S_3$, $S_7$ and $S_{125}$ are applied from the frequency divider 303 to predetermined ones of the data select terminals 308*a*, 308*a'*, . . . . *308g* and 308*g'* of the first diode matrix 308 so that "0" appears at each of the output terminals of the NAND gates 323–3, 323–7 and 323–125 bearing the same suffixes as those of the normally closed switches $S_3$, $S_7$ and $S_{125}$ which are in the open position. Associated inverters 324–3, 324–7 and 324–125 invert "0" into "1" and apply same to a NOR gate 325. The output from the NOR gate 325 is then inverted by an inverter 326 with the result that a signal including pulses $\overline{P_3}$, $\overline{P_7}$ and $\overline{P_{125}}$ of "0" level as shown in FIG. 34(f) appears at the output terminal 308*i* in which these pulses occur at the same positions as those of the 3rd, 7th and 125th pulses counting from the 1st pulse of the time division pulse signal shown in FIG. 34(d). It will be understood that, in response to the opening of some of the normally closed switches $S_1$, $S_3$, $S_5$, $S_6$, $S_7$, $S_9$, . . . . $S_{109}$, $S_{111}$ . . . . $S_{127}$, the digital signals indicative of the open position of the switches and the corresponding pulse signals from the frequency divider 303 are applied to the predetermined ones of the data select terminals 308*a*, 308*a'*, . . . . 308*g* and 308*g'* of the first diode matrix 308 and the AND operation is carried out on these signals so that a signal including pulses of "0" level corresponding to the suffixes of the normally closed switches in the open position appears at the output terminal of the inverter 326, hence the output terminal 308*i* of the first diode matrix 308.

Transmission of analog signals will next be described. The A-D converters 330, 331, 332 and 333 are provided for the 2nd, 4th, 8th and 100th pulses in the time division pulse signal, hence the 2nd, 4th, 8th and 100th channels. The structure of these A-D converters 330, 331, 332 and 333 is basically the same except that they differ from each other in their internal constants. The structure of the A-D converter 330 will be described with reference to FIG. 35*b* as the representative of the A-D converters. The A-D converter 330 consists of a Zener diode 330*a*, an integrator 330*b* composed of a NAND gate 330*c* and a capacitor 330*d*, a NAND gate 330*e*, an integrator 330*f* composed of a NAND gate 330*g* and a capacitor 330*h*, a NAND gate 330*i*, inverters 330*k* and 330*l*, an analog signal input terminal 330*m*, an output terminal 330*n*, a channel signal input terminal 330*o*, and resistors 330*p* and 330*q*. The analog signal applied to the input terminal 330*m* has a voltage level of, for example, 0 to 5 volts. The channel signal input terminal 330*o* is connected to the output terminal of the NAND gate 323–2 belonging to the 2nd channel in the first diode matrix 308, and the output terminal 330*n* is connected to the output terminal of the inverter 324–2 belonging to the 2nd channel in the first diode matrix 308. The remaining A-D converters 331, 332 and 333 are similarly arranged. Analog signals are applied to their input terminals 331*m*, 332*m* and 333*m*, and their channel signal input terminals 331*o*, 332*o* and 333*o* are connected to the output terminals of the NAND gates 323–4, 323–8 and 323–100 belonging to the corresponding channels in the first diode matrix 308, while their output terminals 331*n*, 332*n* and 333*n* are connected to the output terminals of the inverters 324–4, 324–8 and 324–100 belonging to the corresponding channels in the first diode matrix 308 respectively.

The operation of the A-D converter 330 in the absence of any analog signal to the analog signal input terminal 330*m* thereof will now be described. Rectangular pulses are produced by the action of the integrators 330*b* and 330*f* and NAND gates 330*e* and 330*i*. More precisely, in response to the application of "0" to the input terminal 330*r* of the integrator 330*b*, "1" appears at the output terminal 330*s* of the integrator 330*b* and "1" appears at the output terminal 330*t* of the NAND gate 330*e*. When, in such a state, "1" as shown in FIG. 36(a) is applied to the input terminal 330*r* of the integrator 330*b*, the capacitor 330*d* makes an integrating operation so that the voltage appearing at the output terminal 330*s* is gradually reduced as shown in FIG. 36(b) depending on the time constant which is determined by the capacitance of the capacitor 330*d* and the internal resistance of the NAND gate 330*c*. Thus, "0" appears at the output terminal 330t of the NAND gate 330e between time $t_{31}$ at which the integrating operation is started and time $t_{32}$ at which the integrating operation is almost completed as shown in FIG. 36(c), and the period of time $T_{33}$ during which "0" appears is determined by the time constant above described. The integrator 330*f* and the NAND gate 330*i* operate in a manner similar to the integrator 330*b* and the NAND gate 330*e*. Thus, the integrator 330*f* starts its integrating operation as soon as the input applied from the output terminal 331t of the NAND gate 330*e* changes from "0" to "1," and "0" appears at the output terminal 330*u* of the NAND gate 330*i* between time $t_{32}$ at which the integrating operation is started and time $t_{33}$ at which time integrating operation is almost completed as shown in FIG. 36(d), and the period of time $T_{34}$ during which "0" appears is determined by the time constant which is determined by the capacitance of the capacitor 330*h* and the internal resistance of the NAND gate 330*g*. Due to the fact that the output terminal 330*u* of the NAND gate 330*i* is connected to the input terminal 330*r* of the integrator 330*b*, the above operation is repeated so that rectangular pulses whose pulse interval is $T_{33} + T_{34}$ as seen in FIG. 36(e) are produced successively. In the present embodiment, the capacitors 330*d* and 330*h* of 390 pF were employed to produce high-frequency rectangular pulses of 150 kHz. It was found that the rectangular pulses were not produced until "1" was applied to the input terminal 330*r* of the integrator 330*b*.

In response to the detection of the 2nd pulse $P_2$ representative of the 2nd channel by the first diode matrix 308, a signal as shown in FIG. 34(g) in which a "0" level persists over a period of time equal to the width of the pulse $P_2$ appears at the output terminal of the NAND gate 323–2 in the first diode matrix 308, hence the channel signal input terminal 330*o* of the A-D converter 330. Similarly, when the first diode matrix 308 detects the pulses $P_4$, $P_8$ and $P_{100}$ corresponding to the 4th, 8th and 100th channels, signals as shown in FIGS. 34(h), 34(i) and 34(j) in which a "0" level persists over a period of time equal to the pulse width appear at the output terminals of the NAND gates 323–4, 323–8 and 323–100 connected to the channel signal input terminals 331*o*, 332*o* and 333*o* of the A-D converters 331, 332 and 333 respectively.

The signal shown in FIG. 34(g) is applied from the output terminal of the NAND gate 323–2 in the first diode matrix 308 to the channel signal input terminal 330*o* of the A-D converter 330, and the "0" level in the signal is inverted by the inverter 330*k* to produce the waveform shown in FIG. 36(a). As soon as the input applied to the channel signal input terminal 330*o* changes from "1" to "0," "1" is applied to the input terminal 330*r* of the integrator 330b and the generation of the high-frequency rectangular pulses is started. The generation of the high-frequency rectangular pulses is ceased as soon as the input applied to the channel signal input terminal 330*o* changes from "0" to "1." It will thus be seen that the rectangular pulses are produced during the period of time equal to the width of the 2nd channel. when an analog signal is applied to the analog signal input terminal 330*m* of the A-D converter 330 during the period of time in which the rectangular pulses are generated, this analog signal is applied through the resistors 330*p* and 330*q* (5.6 kΩ) to the capacitors 330*d* and 330*h* to vary the charge-discharge time of these capacitors 330*d* and 330*h* thereby varying the oscillation frequency. Thus, the analog signal applied to the input terminal 330*m* of the A-D converter 330 is converted into digital high-frequency pulses within the channel width of the 2nd channel as shown in FIG. 34(k). Similarly, analog signals applied to the input terminals 331*m*, 332*m* and 333*m* of the A-D converters 331, 332 and 333 are converted into digital high-frequency pulses within the channel width of the 4th, 8th and 100th channels as shown in FIGS. 34(*l*), 34(*m*) and 34(*n*) respectively. The high-frequency pulse signals appearing at the output terminals 330*u*, 331*u*, 332*u* and 333*u* of the NAND gates 330*i*, 331*i*, 332*i* and 333*i* in the A-D converters 330, 331, 332 and 333 are then inverted by the inverters 330*l*, 331*l*, 332*l* and 333*l* respectively. Subsequently, the inverted signals are applied to the NOR gate 325 through the inverters 324–2, 324–4, 324–8 and 324–100 in the first diode matrix 308, and the output from the NOR gate 325 is inverted by the inverter 326 to obtain at the output terminal 308 a composite signal as shown in FIG. 34(o) which signal is the combination of the signal shown in FIG. 34(f) and the high-frequency pulse signals shown in FIGS. 34(k), 34(l), 34(m) and 34(n). The signal appearing at the output terminal 308*i* of the first diode matrix 308 will hereinafter be called a level signal. The time division pulse signal delivered from the gate 302 is applied to the buffer circuit 309 which is composed of a transistor 309*a* and resistors 309*b*, 309*c* and 309*d* to be finally sent out to the conductor $300L_1$ from the collector of transistor 309*a*. The level signal delivered from the output terminal 308*i* of the first diode matrix 308 is applied to the buffer circuit 310 which is composed of a transistor 310a and resistros 310*b*, 310*c*, 310*d* and 310*e* to be finally sent out to the conductor $300L_2$ from the collector of transistor 310*a*.

Figure 37:
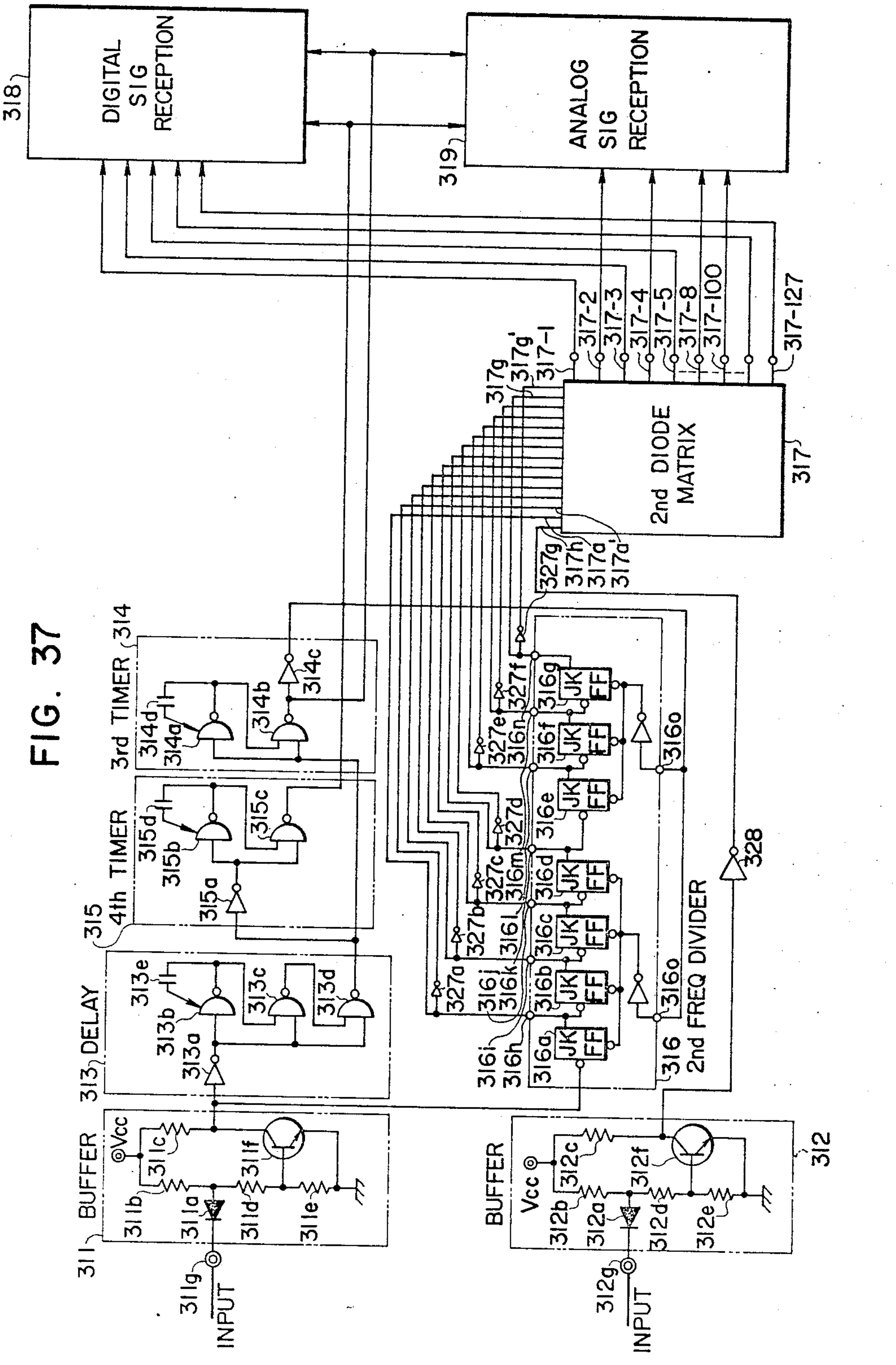
FIG. 37 is an electrical connection diagram showing the structure of a receiver in the system shown in FIGS. 32*a* and 32*b*.
Figure 38:
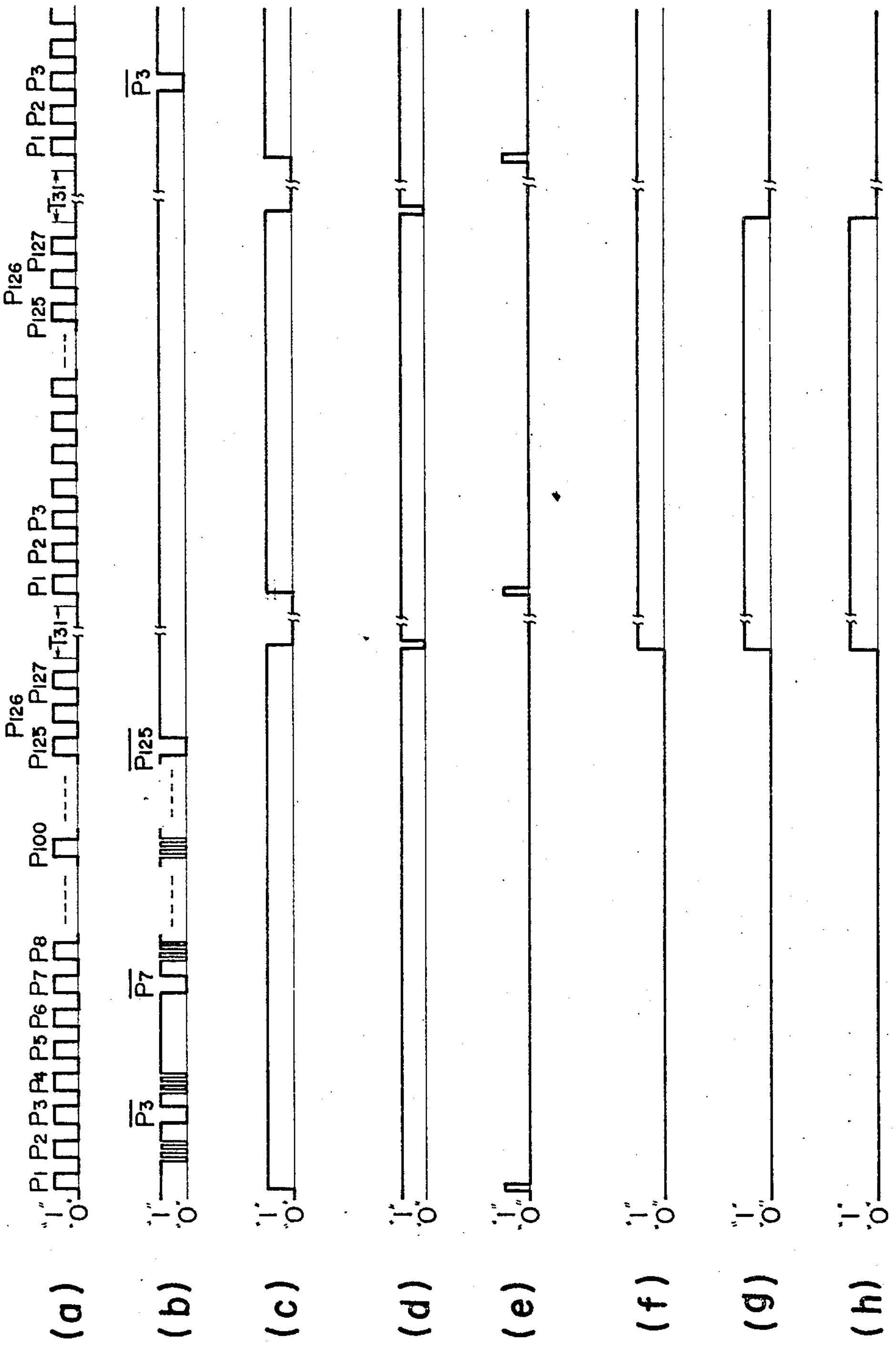
FIGS. 38(a) to 38(h) show voltage waveforms appearing at various parts of the receiver shown in FIG. 37.

Detailed structure and operation of the receiver 300B will next be described with reference to FIGS. 37 and 38. The time division pulse signal and the level signal shown in FIGS. 34(d) and 34(o) are shown again in FIGS. 38(a) and 38(b) respectively. The time division pulse signal delivered from the buffer circuit 309 in the transmitter 300A is applied by way of the conductor $300L_1$ to the input terminal 311*g* of the buffer circuit 311 which is composed of a diode 311*a*, resistors 311*b*, 311*c*, 311*d* and 311*e*, and a transistor 311*f*. The time division pulse signal derived from the collector of transistor 311*f* is applied to the delay circuit 313 which is composed of an inverter 313*a*, NAND gates 313b, 313c and 313*d*, and a capacitor 313*e* (0.0015 μF). The output from the NAND gate 313*d* in the delay circuit 313 is a pulse signal as shown in FIG. 38(c) from which it will be seen that a "0" level appears in slightly delayed relation from the falling edge of the pulse $P_{127}$ in the time division pulse signal shown in FIG. 38(a). This pulse signal is applied to the fourth timer 315 which is composed of an inverter 315*a*, NAND gates 315*b* and 315*c*, and a capacitor 315*d* (150 pF). The output from the NAND gate 315*c* in the fourth timer 315 is a pulse signal as shown in FIG. 38(d) from which it will be seen that the signal includes a "0" level of short duration. This pulse signal is applied to the T terminal of the memory 319 described later. The output from the NAND gate 313*d* in the delay circuit 313 is applied to the third timer 314 which is composed of NAND gates 314a and 314b, an inverter 314*c* and a capacitor 314*d* (150 pF). The output appearing from the inverter 314*c* in response to the application of the output from the NAND gate 313*d* to the NAND gates 314*a* and 314*b* is a pulse signal as shown in FIG. 38(e) from which it will be seen that the signal includes a "1" level of short duration. This pulse signal is used to operate the second frequency divider 316 in synchronism with the transmitter 300A, and the signal appearing at the output of the NAND gate 314*b* and whose phase is opposite to that of the signal shown in FIG. 38(e) is used to reset the memory 318 described later. The second frequency divider 316 is of the binary type using seven J-K flip-flops 316*a*, 316*b*, 316*c*, 316*d*, 316*e*, 316*f* and 316*g*. In response to the application of the time division pulse signal through the buffer circuit 311 to the second frequency divider 316, pulse signals whose frequencies are one-half, one-fourth, one-eighth, one-sixteenth, one thirty-second, one sixty-fourth and one one-hundred twenty-eighth respectively of the input frequency appear at output terminals 316*h*, 316*i*, 316*j*, 316*k*, 316*l*, 316*m* and 316*n* of the second frequency divider 316. The pulse signals appearing at the output terminals 316*h*, 316*i*, 316*j*, 316*k*, 316*l*, 316*m* and 316*n* of the second frequency divider 316, and the signals obtained by inverting these pulse signals by respective inverters 327*a*, 327*b*, 327*c*, 327*d*, 327*e*, 327*f* and 327*g* are applied to data select terminals 317*a*, 317*a'*, 317*b*, 317*b'*, 317*c*, 317*c'*, 317*d*, 317*d'*, 317*e*, 317*e'*, 317*f*, 317*f'*, 317*g* and 317*g'* of the second diode matrix 317 respectively. On the other hand, the level signal is applied from the transmitter 300A through the buffer circuit 310 and the conductor $300L_2$ to the input terminal 312*g* of the buffer circuit 312 which is composed of a diode 312*a*, resistors 312*b*, 312*c*, 312*d* and 312*e*, and a transistor 312*f*. The level signal derived from the collector of transistor 312*f* as the output from the buffer circuit 312 is inverted by the inverter 328 to be applied to another data select terminal 317*h* of the second diode matrix 317. The structure of the second diode matrix 317 is exactly the same as that shown in FIG. 29 and the most significant digit of the reference numerals shown in FIG. 29 may be merely changed from 2 to 3.

Figure 39:
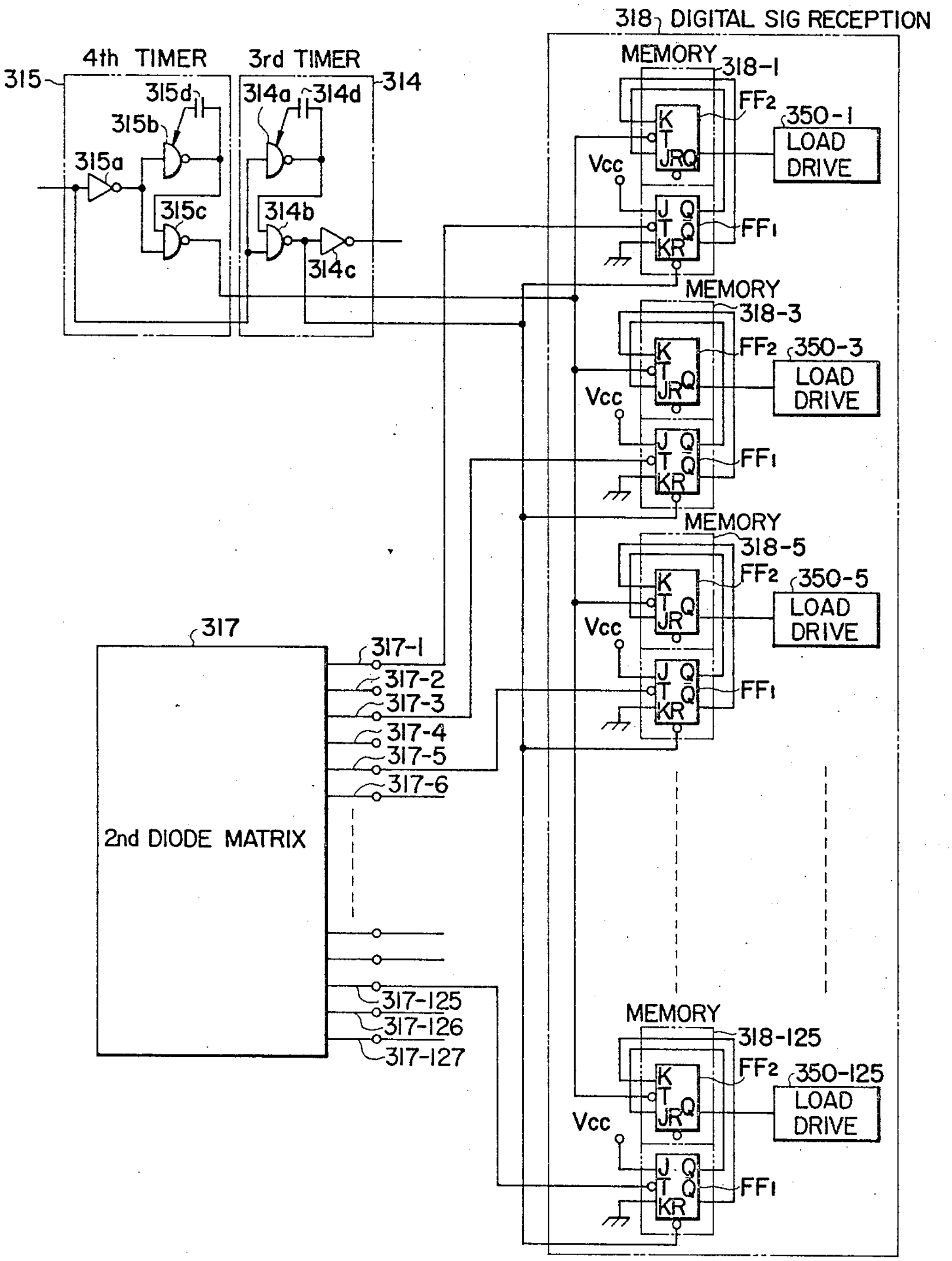
FIG. 39 is an electrical connection diagram showing the structure of a digital signal receiving circuit in the receiver shown in FIG. 37.

Suppose, for example, that the normally closed switches $S_3$, $S_7$ and $S_{125}$ are opened and a pulse signal including the pulses $\overline{P_3}$, $\overline{P_7}$ and $\overline{P_{125}}$ as shown in FIG. 38(b) is applied to the input terminal 312*g* of the buffer circuit 312. This pulse signal is applied from the buffer circuit 312 to the data select terminal 317*h* of the second diode matrix 317. In the meantime, the pulse signals corresponding to the pulses $\overline{P_3}$, $\overline{P_7}$ and $\overline{P_{125}}$ are delivered from the frequency divider 316 to be applied to predetermined ones of the data select terminals 317*a*, 317*a'*, . . . . 317*g* and 317*g'* of the second diode matrix 317. The signal applied to the data select terminal 317*h* and the signals applied to the predetermined ones of the data select terminals 317*a*, 317*a'*, . . . . 317*g* and 317*g'* are subject to the AND operation, and "0" appears in order from the output terminals of the NAND gates 329–3, 329–7 and 329–125 having the same suffixes as the suffixes of the pulses $\overline{P_3}$, $\overline{P_7}$ and $\overline{P_{125}}$ in the level signal. The "0" signal appearing at the output of, for example, the NAND gate 329–3, hence the output terminal 317–3 of the second diode matrix 317 is applied to the T terminal of a J-K flip-flop $FF_1$ in a memory 318–3 as shown in FIG. 39 with the result that the output signals appearing at the output terminals Q and $\overline{Q}$ of the flip-flop $FF_1$ are inverted and "1" and "0" appear now at the respective output terminals Q and $\overline{Q}$. The signals appearing at the output terminals Q and $\overline{Q}$ are applied to the J and K terminals respectively of a J-K flip-flop $FF_2$ in the memory 318–3 so that "1" and "0" appear at the J and K terminals respectively of the J-K flip-flop $FF_2$. In response to the application of the output from the NAND gate 315*c* in the fourth timer 315 to the T terminal of the flip-flop $FF_2$, "1" appears at the output terminal Q of the flip-flop $FF_2$. The output terminal of the NAND gate 314b in the third timer 314 is connected to the reset terminal R of the flip-flop $FF_1$. Thus, in response to the application of the resetting signal to the reset terminal R of the flip-flop $FF_1$, the flip-flop $FF_1$ is reset, and "0" and "1" appear at the output terminals Q and $\overline{Q}$ respectively of the flip-flop $FF_1$. As soon as the flip-flop $FF_1$ is reset, the output from the third timer 314 is applied to the reset terminal 316*o* of the second frequency divider 316 to reset same. In the next cycle, "0" appears at the output terminal 317–3 of the second diode matrix 317 again and is applied to the T terminal of the flip-flop $FF_1$ with the result that "1" and "0" appear at the output terminals Q and $\overline{Q}$ respectively of the flip-flop $FF_1$. Thus, a continuous output of "1" level can be derived from the output terminal Q of the flip-flop $FF_2$. This continuous signal is amplified by the amplifier in a load drive circuit 350–3 to energize the electrical appliance associated with the normally closed switch $S_3$. When the signal having appeared at the output terminal 317–3 of the second diode matrix 317 disappears, "0" and "1" appear at the respective output terminals Q and $\overline{Q}$ of the flip-flop $FF_1$ again. In response to the application of the signal to the T terminal of the flip-flop $FF_2$ from the fourth timer 315 in such a state of the memory 318–3, "0" appears now at the output terminal Q of the flip-flop $FF_2$ and no signal is supplied to the load drive circuit 350–3. The remaining output terminals 317–1, 317–5, 317–6, 317–7, 317–9, . . . . 317–109, 317–111, . . . . 317–127 of the second diode matrix 317 are associated with respective memories 318–1, 318–5, 318–6, 318–7, 318–9, . . . . 318–109, 318–111, . . . . 318–127 similar to the memory 318–3 and with respective load drive circuits 350–1, 350–5, 350–6, 350–7, 350–9, . . . . 350–109, 350–111, . . . . 350–127 similar to the load drive circuit 350–3. FIGS. 38(*f*), 38(*g*) and 38(*h*) show the waveforms of the outputs appearing at the output terminals Q of the flip-flops $FF_2$ in the memories 318–3, 318–7 and 318–125 when the level signal shown in FIG. 38(b), in which "0" levels appear at the positions of the 3rd, 7th and 125th pulses in the time division pulse signal, is applied to the data select terminal 317th of the second diode matrix 317.

Figure 40A:
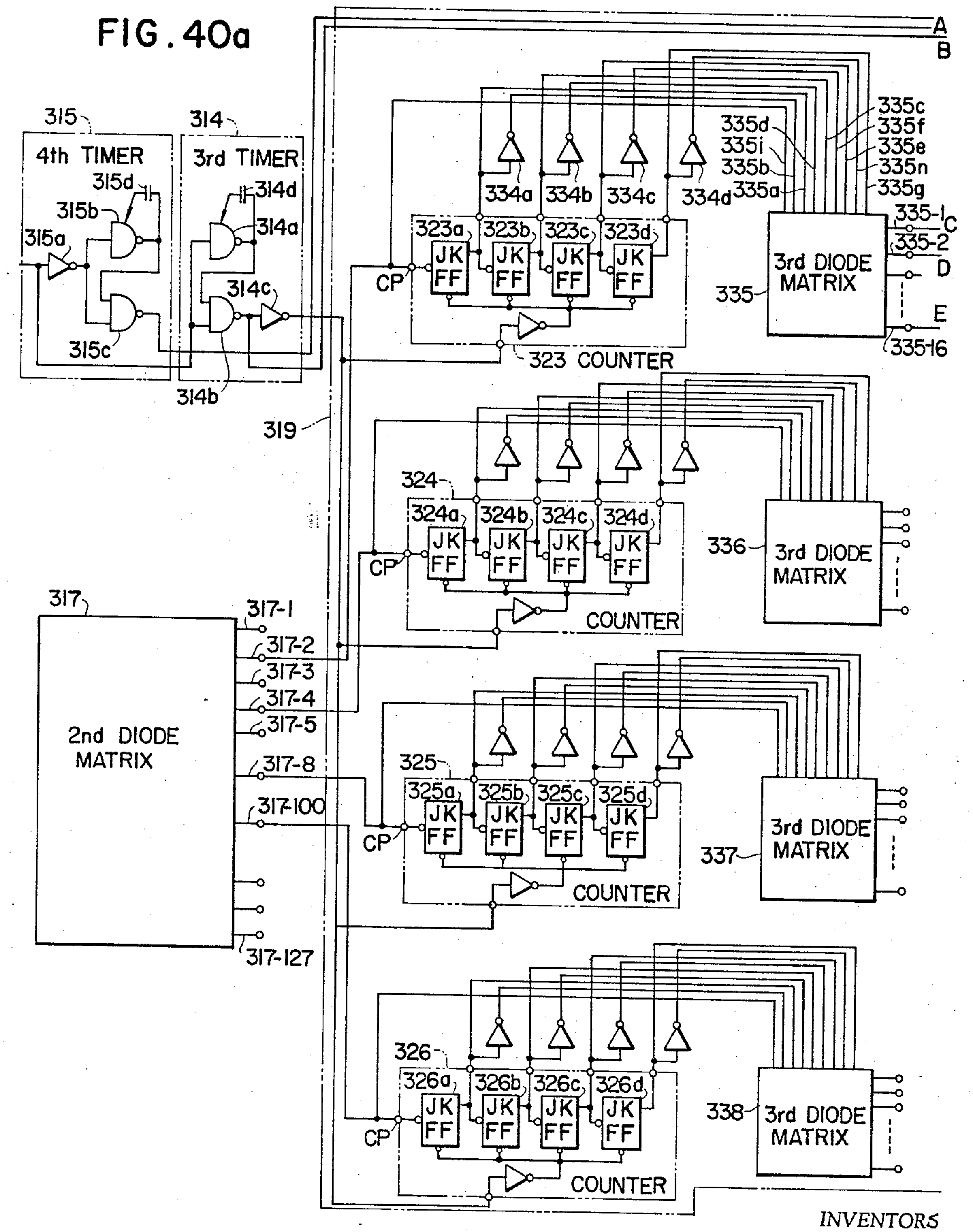
FIGS. 40*a*, 40*b* and 41 are electrical connection diagrams showing the structure of two forms of an analog signal receiving circuit in the receiver shown in FIG. 37.
Figure 40B:
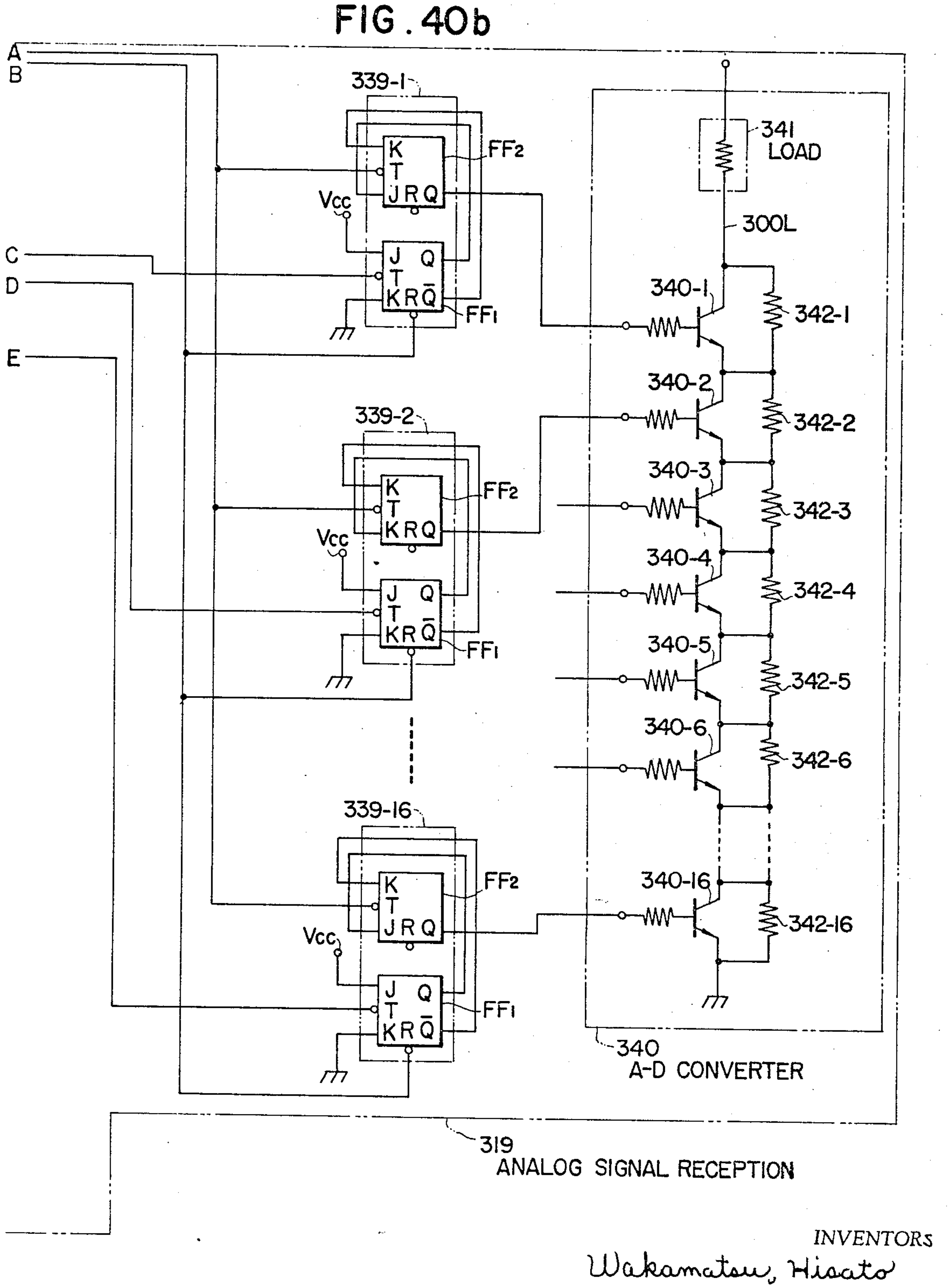
Figure 41:
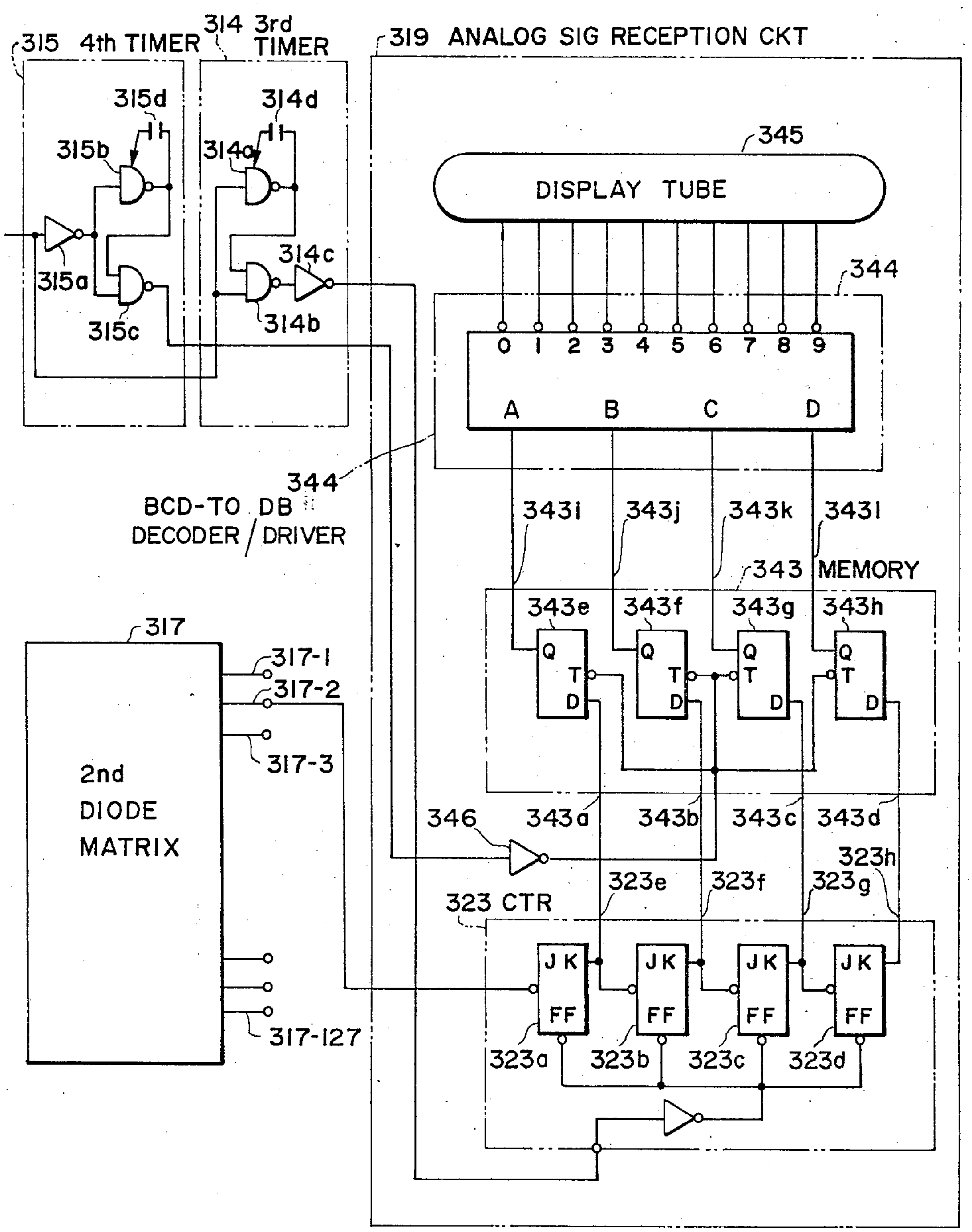

Detailed structure and operation of elements for driving the loads in response to the application of the A-D converted signals from the transmitter 300A will be described with reference to FIGS. 40(a) and 40(b). Referring to FIGS. 40(a) and 40(b), the high-frequency pulse signals shown in FIGS. 34(k), 34(l), 34(m) and 34(n) which have been subjected to A-D conversion in the transmitter 300A appear individually at the respective output terminals 317–2, 317–4, 317–8 and 317–100 of the second diode matrix 317. These high-frequency pulse signals are applied to the respective clock pulse terminals CP of counters 323, 324, 325 and 326 each consisting of four J-K flip-flops 323*a*, 323*b*, 323*c*, 323*d*; 324*a*, 324*b*, 324*c*, 324*d*; 325*a*, 325*b*, 325*c*, 325*d*; and 326*a*, 326*b*, 326*c*, 326*d*. These counters 323, 324, 325 and 326 are reset by the same resetting signal as that applied from the third timer 314 to reset the second frequency divider 316 and are kept in the reset state before the input is applied thereto. The frequency of the pulse signals appearing at the output terminals 317–2, 317–4, 317–8 and 317–100 of the second diode matrix 317 is divided into one-half, one-fourth, one-eighth and one-sixteenth of the original frequency by the respective counters 323, 324, 325 and 326. Suppose that an analog signal of 2 volts is applied to the input terminal 330*m* of the A-D converter 330 in the transmitter 300A, and six high-frequency pulses appear within the width of the 2nd channel as shown in FIG. 34(k). The pulse signal shown in FIG. 34(k) is transmitted to the receiver 300B. In the receiver 300B, this pulse signal is derived from the output terminal 317–2 of the second diode matrix 317 and is applied to the counter 323 to be subject to frequency division therein. The signals delivered from the counter 323 and the signals obtained by inverting the signals by inverters 334*a*, 334*b*, 334*c* and 334*d* are applied to data select terminals 335*a*, 335*b*, 335*c*, 335*d*, 335*e*, 335*f*, 335*g* and 335*h* of a third diode matrix 335, while at the same time, the pulse signal appearing at the output terminal 317–2 of the second diode matrix 317 is applied directly to another data select terminal 335*i* of the third diode matrix 335. As a result, pulse signals of constant period appear at output terminals 335–1, 335–2, 335–3, 335–4, 335–5 and 335–6 of the third diode matrix 335, while signals of "1" level appear at other output terminals 335–7, 335–8, . . . . 335–16 of the third diode matrix 335. The third diode matrix 335 is substantially similar in structure to the second diode matrix 317 except that the former has nine data select terminals and sixteen output terminals. When the signals appearing at the output terminals 335–1, 335–2, . . . . 335–16 of the third diode matrix 335 are applied to J-K flip-flops $FF_1$ in respective memories 339–1, 339–2, . . . . 339–16, "1" appears at each of the output terminals Q of J-K flip-flops $FF_2$ in the memories 339–1, 339–2, 339–3, 339–4, 339–5 and 339–6, while "0" appears at each of the output terminals Q of J-K flip-flops $FF_2$ in the other memories 339–7, 339–8, . . . . 339–16. The memories 339–1, 339–2, . . . . 339–16 are the same in structure and operation as the memories 318–1, 318–3, . . . . , and the resetting signal and timing signal are applied thereto from the third and fourth timers 314 and 315 respectively as in the case of the memories 318–1, 318–3, . . . . . . Due to the appearance of "1" at the output terminals Q of the flip-flops $FF_2$ in the memories 339–1, 339–2, . . . . 339–6, six transistors 340–1, 340–2, 340–3, 340–4, 340–5 and 340–6 among sixteen transistors in an A-D converter 340 conduct to short-circuit respective resistors 342–1, 342–2, 342–3, 342–4, 342–5 and 342–6 connected across the collector and emitter of these transistors. As a result, the potential at one end 300L of a load 341 is reduced and a current corresponding to the difference between the power supply voltage and the voltage at one end 300L of the load 341 flows through the load 341. This current value increases with the increase in the number of conducting ones among the transistors 340–1, 340–2, . . . . 340–16. The resistors 342–1, 342–2, 342–3, . . . . 342–16 connected across the collector and emitter of the transistors 340–1, 340–2, 340–3, . . . . 340–16 have an equal resistance value. The current supplied to the load 341 is controlled depending on the pulse signal appearing at the output terminal 317–2 of the second diode matrix 317 so as to operate the load 341 in an analog fashion. Similarly, the pulse signal appearing at the output terminals 317–4, 317–8 and 317–100 of the second diode matrix 317 are utilized to operate the counters 324, 325 and 326, third diode matrices 336, 337 and 338, memories (not shown) similar to the memories 339–1, . . . . 339–16 and A-D converters (not shown) similar to the A-D converter 340 respectively for driving the associated loads in an analog fashion.

The digital signals appearing at the output terminals 317–2, 317–4, 317–8 and 317–100 of the second diode matrix 317 may be utilized for energizing a display tube for the digital display of numerals. Consider now the digital signal appearing at the output terminal 317–2 of the second diode matrix 317 shown in FIG. 41. Since the digital signal is a pulse signal including six pulses when the analog signal is 2 volts as described previously, the outputs appearing at the output terminals 323*e*, 323*f*, 323*g* and 323*h* of the counter 323 are represented by 0, 1, 1, 0. These outputs are applied to the input terminals 343*a*, 343*b*, 343*c* and 343*d* of a memory 343, and the timing signal appearing at the output of the NAND gate 315*c* in the fourth timer 315 is inverted by an inverter 346 and is applied to the T terminal of each of flip-flops 343*e*, 343*f*, 343*g* and 343*h* in the memory 343 so that the flip-flops 343 *e*, 343*f*, 343*g* and 343*h* store the information 0, 1, 1, 0. The memory 343 is in the form of a known 4-bit bistable latch circuit. Then, the binary information appearing at the output terminals 343*i*, 343*j*, 343*k* and 343*l* of the memory 343 is converted into decimal information by a bcd-to-decimal decoder/driver 344, and the decimal information is applied to a display tube 345 for digitally displaying the numeral on the display tube 345. Similarly, the digital signals appearing at the output terminals 317–4, 317–8 and 317–100 of the second diode matrix 317 may be displayed on individual display tubes in a manner as above described.

The A-D converters 330, 331, 332 and 333 are very convenient for attaining the desired synchronism with the channel signal since they produce a rectangular waveform as soon as the channel signal is applied thereto. However, the A-D converters may be of various known types including one which compares the analog signal input with a saw-tooth waveform generated by a saw-tooth oscillator for converting the analog input into a pulse signal. Similarly, the A-D converters in the receiver 300B may be of various known types including one which utilizes the charge and discharge of two capacitors.

We claim:

1. An electrical wiring system comprising a transmitter including an oscillator for generating a pulse signal of constant frequency, means for producing a time division pulse signal in response to the application of the pulse signal from said oscillator, and a first logic circuit having means for assigning respective channels to a plurality of signals to be transmitted in response to the application of said time division pulse signal, means for discriminating the occurrence within predetermined channels of on-off signals instructing the operation of some of electrically operated loads, and gate means for delivering from the single output terminal a signal including a series of the instruction signals separated from each other in respect to time and a receiver including a second logic circuit having means for assigning respective channels to the plurality of signals in response to the application of said time division pulse signal from said transmitter by way of a first conductor and discriminating the signals corresponding to said channels in the signal arriving from the output terminal of said first logic circuit by way of a second conductor.

2. An electrical wiring system comprising a transmitter including an oscillator for generating a pulse signal of constant frequency, means for producing a time division pulse signal in response to the application of the pulse signal from said oscillator, and a first logic circuit having means for assigning respective channels to a plurality of signals to be transmitted in response to the application of said time division pulse signal, a plurality of A-D converters for converting information of analog quantities to be transmitted into corresponding digital signals lying within predetermined channels, and gate means for delivering from a single output terminal a signal including a series of the digital output signals of said A-D converters separated from each other in respect of time, and a receiver including a second logic circuit having means for assigning respective channels to the plurality of signals in response to the application of said time division pulse signal from said transmitter by way of a first conductor and discriminating the signals corresponding to said channels in the signal arriving from the output terminal of said first logic circuit by way of a second conductor.

3. An electrical wiring system comprising a transmitter including an oscillator for generating a pulse signal of constant frequency, means for producing a time division pulse signal in response to the application of the pulse signal from said oscillator, and a first logic circuit having means for assigning respective channels to a plurality of signals to be transmitted in response to the application of said time division pulse signal, means for discriminating the occurrence within predetermined channels of on-off signals instructing the operation of some of electrically operated loads, a plurality of A-D converters for converting information of analog quantities to be transmitted into corresponding digital signals lying within predetermined channels, and gate means for delivering from the single output terminal a signal including a series of output signals of said discriminating means and the output signals of said A-D converters separated from each other in respect of time, and a receiver including a second logic circuit having means for assigning respective channels to the plurality of signals in response to the application of said time division pulse signal from said transmitter by way of a first conductor and discriminating the signals corresponding to said channels in the signal arriving from the output terminal of said first logic circuit by way of a second conductor.

4. An electrical wiring system comprising a transmitter including an oscillator for generating a pulse signal of constant frequency, means for producing a time division pulse signal in response to the application of the pulse signal from said oscillator, and a first logic circuit having a first frequency divider for dividing the frequency of said time division pulse signal, and a first multiplexer for selecting the outputs from said first frequency divider thereby assigning channels, diseriminating the occurrence within predetermined channels of a plurality of signals to be transmitted and delivering from the single output terminal a signal including a series of the signals separated from each other in respect of time, and a receiver including a second logic circuit having a second frequency divider for dividing the frequency of said time division pulse signal transmitted from said transmitter, and a second multiplexer for selecting the outputs from said second frequency divider thereby assigning channels and discriminating the signals corresponding to said channels in the signal arriving from said first logic circuit.

5. An electrical wiring system comprising a transmitter including an oscillator for generating a pulse signal of constant frequency, means for producing a time division pulse signal in response to the application of the pulse signal from said oscillator, and a first logic circuit having a first frequency divider for dividing the frequency of said time division pulse signal, and a first diode matrix for selecting the outputs from said first frequency divider thereby assigning channels, discriminating the occurrence within predetermined channels of a plurality of signals to be transmitted and delivering from the single output terminal a signal including a series of the signals separated from each other in respect of time, and a receiver including a second logic circuit having a second frequency divider for dividing the frequency of said time division pulse signal transmitted from said transmitter, and a second diode matrix for selecting the outputs from said second frequency divider thereby assigning channels and discriminating the signals corresponding to said channels in the signal arriving from said first logic circuit.

6. An electrical wiring system as claimed in claim 2, in which each said A-D converter comprises a first integrator including an integrating capacitor, a second integrator including an integrating capacitor, a first logical gate for delivering an output signal in response to the application thereto of the input to said first integrator and the integrated output from said first integrator, and a second logical gate for delivering an output signal in response to the application thereto of the input to said second integrator and the integrated output from said second integrator, the output terminal of said first logical gate being connected to the input terminal of said second integrator and to one of the input terminals of said second logical gate, and the output terminal of said second logical gate being connected to the input terminal of said first integrator and to one of the input terminals of said first logical gate, and an analog signal to be transmitted is applied to said integrating capacitors in said first and second integrators through respective resistors.

* * * * *